US010841433B2

(12) United States Patent
Paschini et al.

(10) Patent No.: US 10,841,433 B2
(45) Date of Patent: Nov. 17, 2020

(54) SYSTEM AND METHOD FOR DISTRIBUTING PERSONAL IDENTIFICATION NUMBERS OVER A COMPUTER NETWORK

(75) Inventors: Miles Paschini, Rancho Santa Fe, CA (US); Marshall Rose, Sacramento, CA (US)

(73) Assignee: EWI HOLDINGS, INC., Pleasanton, CA (US)

(*) Notice: Subject to any disclaimer, the term of this patent is extended or adjusted under 35 U.S.C. 154(b) by 0 days.

(21) Appl. No.: 12/711,211

(22) Filed: Feb. 23, 2010

(65) Prior Publication Data

US 2010/0299733 A1 Nov. 25, 2010

Related U.S. Application Data

(63) Continuation of application No. 10/821,405, filed on Apr. 9, 2004, now abandoned, which is a (Continued)

(51) Int. Cl.
*G06Q 10/00* (2012.01)
*H04M 15/00* (2006.01)
(Continued)

(52) U.S. Cl.
CPC .......... *H04M 15/68* (2013.01); *G06Q 10/087* (2013.01); *G06Q 30/0601* (2013.01);
(Continued)

(58) Field of Classification Search
CPC .... H04M 15/68; G06Q 10/087; G06Q 30/601
(Continued)

(56) References Cited

U.S. PATENT DOCUMENTS 4,359,631 A 11/1982 Lockwood et al.
4,567,359 A 1/1986 Lockwood
(Continued)

FOREIGN PATENT DOCUMENTS

DE 4017264 A1 12/1991
EP 0863537 A1 9/1998
(Continued)

OTHER PUBLICATIONS

Foreign communication from a related counterpart application—Australian Examination Report, Application No. 2011203954, dated Nov. 28, 2014, 4 pages.
(Continued)

*Primary Examiner* — Patrick McAtee
*Assistant Examiner* — John M Winter
(74) *Attorney, Agent, or Firm* — Barnes & Thornburg LLP

(57) ABSTRACT

The present invention comprises a system and method for managing an inventory of PINs in a PIN distribution network. The distribution network includes a hub coupled to a one or more servers and each of the servers is coupled to at least one client terminal. The system includes a hub for dynamically allocating PINs of the inventory among the servers so as to substantially maintain a quantity of PINs at each server at a desired level for each server. Additionally, the hub acquires additional PINs in response to at least one PIN in the inventory being distributed to at least one user from at least one of the client terminals. In variations, the hub maintains centralized databases and synchronizes the centralized databases with corresponding databases at each server.

6 Claims, 30 Drawing Sheets

Related U.S. Application Data continuation-in-part of application No. 10/316,603, filed on Dec. 10, 2002, now Pat. No. 7,522,716, which is a continuation of application No. 09/619,392, filed on Jul. 19, 2000, now Pat. No. 6,526,130.

(51) Int. Cl.
  *G06Q 10/08* (2012.01)
  *G06Q 30/06* (2012.01)
  *H04M 17/00* (2006.01)

(52) U.S. Cl.
  CPC ........... *H04M 15/59* (2013.01); *H04M 17/00* (2013.01); *H04M 17/20* (2013.01); *H04M 2017/25* (2013.01); *H04M 2017/2593* (2013.01); *H04M 2215/0196* (2013.01)

(58) Field of Classification Search
  USPC .................................................. 705/72, 39
  See application file for complete search history.

(56) References Cited

U.S. PATENT DOCUMENTS

| | | | |
|---|---|---|---|
| RE32,115 | E | 4/1986 | Lockwood et al. |
| 4,694,397 | A | 9/1987 | Grant et al. |
| 4,951,196 | A | 8/1990 | Jackson |
| 5,220,501 | A | 6/1993 | Lawlor et al. |
| 5,291,017 | A | 3/1994 | Wang et al. |
| 5,309,355 | A | 5/1994 | Lockwood |
| 5,334,823 | A | 8/1994 | Noblett et al. |
| 5,350,906 | A * | 9/1994 | Brody et al. .................. 235/379 |
| 5,468,958 | A | 11/1995 | Franzen et al. |
| 5,477,038 | A | 12/1995 | Levine et al. |
| 5,500,514 | A | 3/1996 | Veeneman et al. |
| 5,534,683 | A | 7/1996 | Rankl et al. |
| 5,557,516 | A | 9/1996 | Hogan |
| 5,569,917 | A | 10/1996 | Buttrill, Jr. et al. |
| 5,576,951 | A | 11/1996 | Lockwood |
| 5,577,100 | A | 11/1996 | McGregor et al. |
| 5,577,109 | A | 11/1996 | Stimson et al. |
| 5,578,808 | A | 11/1996 | Taylor |
| 5,621,787 | A | 4/1997 | McKoy et al. |
| 5,645,434 | A | 7/1997 | Leung |
| 5,650,604 | A | 7/1997 | Marcous et al. |
| 5,689,100 | A | 11/1997 | Carrithers et al. |
| 5,693,941 | A | 12/1997 | Barlow et al. |
| 5,696,908 | A | 12/1997 | Muehlberger et al. |
| 5,701,301 | A | 12/1997 | Weisser, Jr. |
| 5,714,755 | A | 2/1998 | Wells et al. |
| 5,722,067 | A | 2/1998 | Fougnies et al. |
| 5,744,787 | A | 4/1998 | Teicher |
| 5,748,737 | A | 5/1998 | Daggar |
| 5,763,878 | A | 6/1998 | Franzen |
| 5,778,313 | A | 7/1998 | Fougnies |
| 5,796,832 | A | 8/1998 | Kawan |
| 5,812,773 | A | 9/1998 | Norin |
| 5,815,657 | A | 9/1998 | Williams et al. |
| 5,826,185 | A | 10/1998 | Wise et al. |
| 5,828,740 | A | 10/1998 | Khue et al. |
| 5,845,259 | A | 12/1998 | West et al. |
| 5,854,975 | A | 12/1998 | Fougnies et al. |
| 5,868,236 | A | 2/1999 | Rademacher |
| 5,884,292 | A | 3/1999 | Baker et al. |
| 5,892,827 | A | 4/1999 | Beach et al. |
| 5,897,625 | A | 4/1999 | Gustin et al. |
| 5,903,633 | A | 5/1999 | Lorsch |
| 5,937,396 | A | 5/1999 | Konya |
| 5,915,007 | A | 6/1999 | Klapka |
| 5,920,847 | A | 7/1999 | Kolling et al. |
| 5,943,424 | A | 8/1999 | Berger et al. |
| 5,953,398 | A | 9/1999 | Hill |
| 5,969,318 | A | 10/1999 | Mackenthun |
| 5,945,653 | A | 11/1999 | Walker et al. |
| 5,984,180 | A | 11/1999 | Albrecht |
| 5,987,438 | A | 11/1999 | Nakano et al. |
| 5,991,380 | A | 11/1999 | Bruno et al. |
| 5,991,381 | A | 11/1999 | Bouanaka et al. |
| 5,991,413 | A | 11/1999 | Arditi et al. |
| 5,991,749 | A | 11/1999 | Morrill, Jr. |
| 5,991,809 | A | 11/1999 | Kriegsman |
| 6,000,608 | A | 12/1999 | Dorf |
| 6,012,048 | A | 1/2000 | Gustin et al. |
| 6,035,025 | A | 3/2000 | Hanson |
| 6,044,360 | A | 3/2000 | Picciallo |
| 6,049,774 | A | 4/2000 | Romanath |
| 6,058,300 | A | 5/2000 | Hanson |
| 6,064,990 | A | 5/2000 | Goldsmith |
| 6,081,791 | A | 6/2000 | Clark |
| 6,081,840 | A | 6/2000 | Zhao |
| 6,157,823 | A | 12/2000 | Fougnies et al. |
| 6,169,975 | B1 | 1/2001 | White et al. |
| 6,182,138 | B1 | 1/2001 | Aoki |
| 6,185,545 | B1 | 2/2001 | Resnick et al. |
| 6,188,752 | B1 | 2/2001 | Lesley |
| 6,191,699 | B1 | 2/2001 | Sawada |
| 6,209,032 | B1 | 3/2001 | Dutcher et al. |
| 6,264,104 | B1 | 7/2001 | Jenkins et al. |
| 6,269,343 | B1 | 7/2001 | Pallakoff |
| 6,289,319 | B1 | 9/2001 | Lockwood |
| 6,289,320 | B1 | 9/2001 | Drummond et al. |
| 6,294,780 | B1 | 9/2001 | Wells et al. |
| 6,299,062 | B1 | 10/2001 | Hwang |
| 6,315,195 | B1 | 11/2001 | Ramachandran |
| 6,317,754 | B1 | 11/2001 | Peng |
| 6,320,947 | B1 | 11/2001 | Joyce et al. |
| 6,323,980 | B1 | 11/2001 | Bloom |
| 6,327,363 | B1 | 12/2001 | Henderson et al. |
| 6,330,978 | B1 | 12/2001 | Molano et al. |
| 6,386,457 | B1 | 5/2002 | Sorie |
| 6,453,162 | B1 | 9/2002 | Gentry |
| 6,467,684 | B2 | 10/2002 | Fite et al. |
| 6,502,191 | B1 | 12/2002 | Smith et al. |
| 6,510,983 | B2 | 1/2003 | Horowitz et al. |
| 6,526,130 | B1 | 2/2003 | Paschini |
| 6,526,275 | B1 | 2/2003 | Calbert |
| 6,574,617 | B1 | 6/2003 | Immerman et al. |
| 6,581,827 | B2 | 6/2003 | Welton |
| 6,596,990 | B2 | 7/2003 | Kasten et al. |
| 6,615,189 | B1 | 9/2003 | Phillips et al. |
| 6,628,766 | B1 * | 9/2003 | Hollis et al. ............... 379/114.2 |
| 6,651,885 | B1 | 9/2003 | Arias |
| 6,742,023 | B1 | 5/2004 | Fanning et al. |
| 6,827,260 | B2 | 12/2004 | Stoutenburg |
| 6,829,596 | B1 | 12/2004 | Frazee |
| 6,842,749 | B2 | 1/2005 | Zara et al. |
| 6,910,053 | B1 | 6/2005 | Pauly et al. |
| 6,934,529 | B2 | 8/2005 | Bagoren et al. |
| 6,965,667 | B2 | 11/2005 | Trabandt et al. |
| 6,973,172 | B1 | 12/2005 | Bitove et al. |
| 6,999,943 | B1 | 2/2006 | Johnson et al. |
| 7,006,993 | B1 | 2/2006 | Cheong et al. |
| 7,031,693 | B2 | 4/2006 | Ohrstrom et al. |
| 7,069,251 | B1 | 6/2006 | Bartz et al. |
| 7,083,084 | B2 | 8/2006 | Graves et al. |
| 7,089,209 | B1 | 8/2006 | Kolls |
| 7,092,916 | B2 | 8/2006 | Diveley et al. |
| 7,103,575 | B1 | 9/2006 | Linehan |
| 7,106,843 | B1 | 9/2006 | Gainsboro et al. |
| 7,118,030 | B2 | 10/2006 | Phillips et al. |
| 7,127,426 | B1 | 10/2006 | Coyle |
| 7,131,578 | B2 | 11/2006 | Paschini |
| 7,131,582 | B2 | 11/2006 | Welton |
| 7,191,939 | B2 | 3/2007 | Beck et al. |
| 7,197,662 | B2 | 3/2007 | Bullen et al. |
| 7,206,769 | B2 | 4/2007 | Laurent et al. |
| 7,209,890 | B1 | 4/2007 | Peon et al. |
| 7,210,620 | B2 | 5/2007 | Jones |
| 7,210,624 | B1 * | 5/2007 | Birjandi et al. ............... 235/385 |
| 7,216,091 | B1 | 5/2007 | Blandina et al. |
| 7,248,855 | B2 | 7/2007 | Joyce et al. |
| 7,280,644 | B2 | 10/2007 | Tamari et al. |
| 7,280,645 | B1 | 10/2007 | Allen et al. |
| 7,325,722 | B2 | 2/2008 | Hosnedl et al. |

(56) References Cited

U.S. PATENT DOCUMENTS

| | | | |
|---|---|---|---|
| 7,333,955 B2 | 2/2008 | Desbiens | |
| 7,363,265 B2 | 4/2008 | Horgan | |
| 7,401,049 B2 | 7/2008 | Hobbs et al. | |
| 7,404,011 B2* | 7/2008 | Hansmann | G06F 17/30569 |
| | | | 707/999.102 |
| 7,433,212 B2 | 10/2008 | Igarashi et al. | |
| 7,440,922 B1 | 10/2008 | Kempkes et al. | |
| 7,454,200 B2 | 11/2008 | Cai et al. | |
| 7,477,731 B2 | 1/2009 | Tamari et al. | |
| 7,529,563 B1 | 5/2009 | Pitroda | |
| 7,562,051 B1 | 7/2009 | Donner | |
| 7,574,376 B1 | 8/2009 | Berman et al. | |
| 7,578,439 B2 | 8/2009 | Graves et al. | |
| 7,580,859 B2 | 8/2009 | Economy et al. | |
| 7,580,892 B1 | 8/2009 | Blosser et al. | |
| 7,581,674 B2 | 9/2009 | Cohen et al. | |
| 7,603,316 B1 | 10/2009 | Fife et al. | |
| 7,607,574 B2 | 10/2009 | Kingsborough et al. | |
| 7,613,284 B2 | 11/2009 | New | |
| 7,614,549 B2 | 11/2009 | Hogg et al. | |
| 7,617,152 B2 | 11/2009 | Chai et al. | |
| 7,630,926 B2 | 12/2009 | Chakiris et al. | |
| 7,647,627 B2 | 1/2010 | Maida-Smith et al. | |
| 7,669,758 B2 | 3/2010 | Erikson | |
| 7,707,113 B1 | 4/2010 | DiMartino et al. | |
| 7,739,162 B1 | 6/2010 | Pettay et al. | |
| 7,740,170 B2 | 6/2010 | Singh et al. | |
| 7,797,233 B2 | 9/2010 | Sobek | |
| 7,813,822 B1 | 10/2010 | Hoffberg | |
| 7,822,640 B2 | 10/2010 | Arthur et al. | |
| 7,865,432 B2 | 1/2011 | Doran et al. | |
| 7,890,422 B1 | 2/2011 | Hirka et al. | |
| 7,891,563 B2 | 2/2011 | Oder, II et al. | |
| 7,909,242 B2 | 3/2011 | Paschini et al. | |
| 7,922,082 B2 | 4/2011 | Muscato | |
| 7,925,531 B1 | 4/2011 | Cunningham et al. | |
| 7,945,238 B2 | 5/2011 | Baker et al. | |
| 7,945,512 B2 | 5/2011 | Scipioni et al. | |
| 7,966,496 B2 | 6/2011 | Ellmore | |
| 7,991,694 B2 | 8/2011 | Takayama | |
| 8,020,754 B2 | 9/2011 | Schwarz, Jr. | |
| 8,041,338 B2 | 10/2011 | Chen et al. | |
| 8,060,413 B2 | 11/2011 | Castell et al. | |
| 8,090,792 B2 | 1/2012 | Dubnicki et al. | |
| 8,095,113 B2 | 1/2012 | Kean et al. | |
| 8,109,436 B1 | 2/2012 | Hopkins, III | |
| 8,135,640 B2 | 3/2012 | Bayne | |
| 8,195,565 B2 | 6/2012 | Bishop et al. | |
| 8,245,910 B2 | 8/2012 | Sullivan et al. | |
| 8,271,343 B2 | 9/2012 | Schorr et al. | |
| 8,297,498 B2 | 10/2012 | Vriheas et al. | |
| 8,306,912 B2 | 11/2012 | Galit | |
| 8,321,270 B2 | 11/2012 | Antonucci | |
| 8,341,045 B2 | 12/2012 | Kravitz et al. | |
| 8,355,982 B2 | 1/2013 | Hazel et al. | |
| 8,359,239 B1 | 1/2013 | Cook et al. | |
| 8,371,502 B1 | 2/2013 | Galit et al. | |
| 8,458,016 B1 | 6/2013 | Medina, III et al. | |
| 8,472,594 B2 | 6/2013 | New et al. | |
| 8,479,980 B2 | 7/2013 | Paschini et al. | |
| 8,523,054 B2 | 9/2013 | Yankovich et al. | |
| 8,595,074 B2 | 11/2013 | Sharma et al. | |
| 8,626,617 B1 | 1/2014 | Bhatt | |
| 8,682,715 B1 | 3/2014 | Cedeno | |
| 8,762,236 B1 | 6/2014 | Shirey et al. | |
| 8,768,817 B2 | 7/2014 | Takeo et al. | |
| 9,031,880 B2 | 5/2015 | Bishop et al. | |
| 9,542,553 B1 | 1/2017 | Burger et al. | |
| 9,558,484 B2 | 1/2017 | Paschini et al. | |
| 9,852,414 B2 | 12/2017 | Llach | |
| 2001/0001321 A1 | 5/2001 | Resnick et al. | |
| 2001/0021927 A1 | 9/2001 | Laurent et al. | |
| 2001/0027446 A1 | 10/2001 | Metcalfe | |
| 2001/0037291 A1 | 11/2001 | Allen, II | |
| 2001/0039535 A1 | 11/2001 | Tsiounis et al. | |
| 2001/0042784 A1 | 11/2001 | Fite et al. | |
| 2002/0008198 A1 | 1/2002 | Kasten et al. | |
| 2002/0010659 A1* | 1/2002 | Cruse et al. | 705/28 |
| 2002/0046122 A1 | 4/2002 | Barber et al. | |
| 2002/0059114 A1 | 5/2002 | Cockrill et al. | |
| 2002/0077973 A1* | 6/2002 | Ronchi et al. | 705/39 |
| 2002/0099667 A1 | 7/2002 | Diamandis et al. | |
| 2002/0116280 A1 | 8/2002 | Boies et al. | |
| 2002/0128938 A1 | 9/2002 | Schofield et al. | |
| 2002/0138358 A1 | 9/2002 | Scheer | |
| 2002/0152124 A1 | 10/2002 | Guzman et al. | |
| 2002/0152175 A1 | 10/2002 | Armstrong et al. | |
| 2002/0156696 A1 | 10/2002 | Teicher | |
| 2002/0161650 A1 | 10/2002 | Buchanan et al. | |
| 2002/0165820 A1 | 11/2002 | Anvekar | |
| 2002/0169648 A1 | 11/2002 | Zara et al. | |
| 2002/0174034 A1 | 11/2002 | Au et al. | |
| 2002/0181600 A1 | 12/2002 | Matsuura et al. | |
| 2002/0188510 A1 | 12/2002 | Arias | |
| 2003/0014360 A1 | 1/2003 | Arditti et al. | |
| 2003/0020947 A1 | 1/2003 | Brewster et al. | |
| 2003/0028481 A1 | 2/2003 | Flitcroft | |
| 2003/0046231 A1 | 3/2003 | Wu | |
| 2003/0046249 A1 | 3/2003 | Wu | |
| 2003/0050041 A1 | 3/2003 | Wu | |
| 2003/0050043 A1 | 3/2003 | Ohrstrom et al. | |
| 2003/0177028 A1 | 3/2003 | Cooper et al. | |
| 2003/0083946 A1 | 5/2003 | Nishiyama | |
| 2003/0095646 A1 | 5/2003 | Paschini | |
| 2003/0110104 A1 | 6/2003 | King et al. | |
| 2003/0126064 A1 | 7/2003 | Foran | |
| 2003/0126075 A1 | 7/2003 | Mascavage, III | |
| 2003/0144910 A1 | 7/2003 | Flaherty et al. | |
| 2003/0145205 A1 | 7/2003 | Sarcanin | |
| 2003/0191945 A1 | 10/2003 | Keech | |
| 2003/0200179 A1 | 10/2003 | Kwan | |
| 2003/0200465 A1 | 10/2003 | Bhat et al. | |
| 2003/0212595 A1 | 11/2003 | Antonucci | |
| 2003/0236755 A1 | 12/2003 | Dagelet | |
| 2004/0010440 A1 | 1/2004 | Lenard et al. | |
| 2004/0011866 A1 | 1/2004 | Saad | |
| 2004/0019571 A1 | 1/2004 | Hurwitz et al. | |
| 2004/0031847 A1 | 2/2004 | Sorenson et al. | |
| 2004/0049598 A1 | 3/2004 | Tucker et al. | |
| 2004/0054603 A1 | 3/2004 | Clinesmith et al. | |
| 2004/0066228 A1 | 4/2004 | Lennartson et al. | |
| 2004/0077334 A1 | 4/2004 | Joyce et al. | |
| 2004/0078332 A1 | 4/2004 | Ferguson et al. | |
| 2004/0086098 A1 | 5/2004 | Craft | |
| 2004/0088250 A1 | 5/2004 | Bartter et al. | |
| 2004/0095604 A1 | 5/2004 | Meyerhofer | |
| 2004/0118914 A1 | 6/2004 | Smith et al. | |
| 2004/0128508 A1 | 7/2004 | Wheeler et al. | |
| 2004/0133511 A1 | 7/2004 | Smith et al. | |
| 2004/0153410 A1 | 8/2004 | Nootebos et al. | |
| 2004/0172367 A1 | 9/2004 | Chavez | |
| 2004/0185827 A1 | 9/2004 | Parks | |
| 2004/0205023 A1 | 10/2004 | Hafer et al. | |
| 2004/0210489 A1* | 10/2004 | Jackson et al. | 705/22 |
| 2004/0215560 A1 | 10/2004 | Amalraj et al. | |
| 2004/0218741 A1 | 11/2004 | Welton | |
| 2004/0230489 A1 | 11/2004 | Goldthwaite et al. | |
| 2004/0254891 A1 | 12/2004 | Blinn et al. | |
| 2005/0008132 A1 | 1/2005 | Paschini et al. | |
| 2005/0010452 A1 | 1/2005 | Lusen | |
| 2005/0018824 A1 | 1/2005 | Richardson | |
| 2005/0027655 A1 | 2/2005 | Sharma et al. | |
| 2005/0038714 A1 | 2/2005 | Bonet et al. | |
| 2005/0038718 A1 | 2/2005 | Barnes et al. | |
| 2005/0086168 A1 | 4/2005 | Alvarez et al. | |
| 2005/0114215 A1 | 5/2005 | Tramontano et al. | |
| 2005/0123112 A1* | 6/2005 | New | G06Q 20/12 |
| | | | 379/114.2 |
| 2005/0138127 A1 | 6/2005 | Jain | |
| 2005/0192893 A1 | 9/2005 | Keeling et al. | |
| 2005/0229003 A1 | 10/2005 | Paschini et al. | |
| 2005/0234822 A1 | 10/2005 | VanFleet et al. | |
| 2006/0026073 A1 | 2/2006 | Kenny, Jr. et al. | |
| 2006/0043171 A1 | 3/2006 | New et al. | |

(56) References Cited

U.S. PATENT DOCUMENTS

| | | |
|---|---|---|
| 2006/0045244 A1 | 3/2006 | New |
| 2006/0064344 A1 | 3/2006 | Lidow |
| 2006/0074783 A1 | 4/2006 | Agarwal et al. |
| 2006/0074799 A1 | 4/2006 | Averyt et al. |
| 2006/0078100 A1 | 4/2006 | Risafi et al. |
| 2006/0124732 A1 | 6/2006 | Dentlinger |
| 2006/0129419 A1 | 6/2006 | Flaxer et al. |
| 2006/0175394 A1 | 8/2006 | Caven et al. |
| 2006/0184613 A1 | 8/2006 | Stienessen et al. |
| 2006/0202012 A1 | 9/2006 | Grano et al. |
| 2006/0242087 A1 | 10/2006 | Naehr et al. |
| 2006/0248017 A1 | 11/2006 | Koka et al. |
| 2006/0253335 A1 | 11/2006 | Keena et al. |
| 2006/0269722 A1 | 11/2006 | Yamada |
| 2007/0023504 A1 | 2/2007 | Blankenship et al. |
| 2007/0073586 A1 | 3/2007 | Dev et al. |
| 2007/0090183 A1 | 4/2007 | Hursta et al. |
| 2007/0101351 A1 | 5/2007 | Bagsby et al. |
| 2007/0125838 A1 | 6/2007 | Law et al. |
| 2007/0125840 A1 | 6/2007 | Law et al. |
| 2007/0198437 A1 | 8/2007 | Eisner et al. |
| 2007/0210152 A1 | 9/2007 | Read |
| 2007/0255662 A1 | 11/2007 | Tumminaro |
| 2007/0272743 A1 | 11/2007 | Christie et al. |
| 2007/0276765 A1 | 11/2007 | Hazel et al. |
| 2007/0293309 A1 | 12/2007 | Jorasch et al. |
| 2008/0040284 A1 | 2/2008 | Hazel et al. |
| 2008/0059302 A1 | 3/2008 | Fordyce, III et al. |
| 2008/0059379 A1 | 3/2008 | Ramaci et al. |
| 2008/0078831 A1 | 4/2008 | Johnson et al. |
| 2008/0099551 A1 | 5/2008 | Harper et al. |
| 2008/0114696 A1 | 5/2008 | Singh et al. |
| 2008/0147546 A1 | 6/2008 | Weichselbaumer et al. |
| 2008/0147552 A1 | 6/2008 | Morsillo et al. |
| 2008/0162360 A1 | 7/2008 | Bantz et al. |
| 2008/0169344 A1 | 7/2008 | Huh |
| 2008/0177655 A1 | 7/2008 | Zalik |
| 2008/0189214 A1 | 8/2008 | Mueller et al. |
| 2008/0195499 A1 | 8/2008 | Meredith et al. |
| 2008/0208748 A1 | 8/2008 | Ozment et al. |
| 2008/0222417 A1 | 9/2008 | Downes et al. |
| 2008/0223920 A9 | 9/2008 | Duke |
| 2008/0228637 A1 | 9/2008 | Scipioni et al. |
| 2008/0255992 A1 | 10/2008 | Lin |
| 2008/0270246 A1 | 10/2008 | Chen |
| 2008/0270253 A1 | 10/2008 | Huang |
| 2008/0288405 A1 | 11/2008 | John |
| 2008/0319914 A1 | 12/2008 | Carrott |
| 2009/0030836 A1 | 1/2009 | Blandina et al. |
| 2009/0031407 A1 | 1/2009 | Kuang |
| 2009/0037326 A1 | 2/2009 | Chitti et al. |
| 2009/0037333 A1 | 2/2009 | Flitcroft et al. |
| 2009/0048953 A1 | 2/2009 | Hazel et al. |
| 2009/0048963 A1 | 2/2009 | Bishop et al. |
| 2009/0050688 A1 | 2/2009 | Kon et al. |
| 2009/0084842 A1 | 4/2009 | Vriheas et al. |
| 2009/0106160 A1 | 4/2009 | Skowronek |
| 2009/0119190 A1 | 5/2009 | Realini |
| 2009/0164320 A1 | 6/2009 | Galit |
| 2009/0177563 A1 | 7/2009 | Bernstein et al. |
| 2009/0234751 A1 | 9/2009 | Chan et al. |
| 2009/0254441 A1 | 10/2009 | Ahlers et al. |
| 2009/0288012 A1 | 11/2009 | Hertel et al. |
| 2009/0299841 A1 | 12/2009 | Bishop et al. |
| 2009/0319348 A1 | 12/2009 | Khosravy et al. |
| 2009/0319784 A1 | 12/2009 | Faith et al. |
| 2009/0327067 A1 | 12/2009 | Berger et al. |
| 2010/0036743 A1 | 2/2010 | Tamari et al. |
| 2010/0043008 A1 | 2/2010 | Marchand |
| 2010/0057580 A1 | 3/2010 | Raghunathan |
| 2010/0076877 A1 | 3/2010 | Lenahan et al. |
| 2010/0094674 A1 | 4/2010 | Marriner et al. |
| 2010/0114731 A1 | 5/2010 | Kingston et al. |
| 2010/0114773 A1 | 5/2010 | Skowronek |
| 2010/0125510 A1 | 5/2010 | Smith et al. |
| 2010/0154027 A1 | 6/2010 | Sobel et al. |
| 2010/0200652 A1 | 8/2010 | Wolfe et al. |
| 2010/0260388 A1 | 10/2010 | Garrett et al. |
| 2010/0268645 A1 | 10/2010 | Martino et al. |
| 2010/0293093 A1 | 11/2010 | Karpenko |
| 2010/0299194 A1 | 11/2010 | Snyder et al. |
| 2010/0299195 A1 | 11/2010 | Nix et al. |
| 2010/0299221 A1 | 11/2010 | Paschini et al. |
| 2010/0325006 A1 | 12/2010 | White |
| 2011/0035446 A1 | 2/2011 | Goermer et al. |
| 2011/0041006 A1 | 2/2011 | Fowler |
| 2011/0068170 A1 | 3/2011 | Lehman |
| 2011/0099055 A1 | 4/2011 | Khalil |
| 2011/0101093 A1 | 5/2011 | Ehrensvärd |
| 2011/0125645 A1 | 5/2011 | Benkert et al. |
| 2011/0131275 A1 | 6/2011 | Maida-Smith et al. |
| 2011/0161229 A1 | 6/2011 | Mastrangelo et al. |
| 2011/0208656 A1 | 8/2011 | Alba et al. |
| 2011/0218911 A1 | 9/2011 | Spodak |
| 2011/0226620 A1 | 9/2011 | Tadayoni-Rebek et al. |
| 2011/0231272 A1 | 9/2011 | Englund et al. |
| 2011/0302646 A1 | 12/2011 | Ronda et al. |
| 2011/0307377 A1 | 12/2011 | Nelsen et al. |
| 2012/0150553 A1 | 6/2012 | Wade |
| 2012/0221468 A1 | 8/2012 | Kumnick et al. |
| 2012/0259718 A1 | 10/2012 | Miller et al. |
| 2012/0265681 A1 | 10/2012 | Ross |
| 2012/0317028 A1 | 12/2012 | Ansari |
| 2013/0010941 A1 | 1/2013 | New et al. |
| 2013/0013510 A1 | 1/2013 | Ansari |
| 2013/0018783 A1 | 1/2013 | Ansari |
| 2013/0018793 A1 | 1/2013 | Wong et al. |
| 2013/0030941 A1 | 1/2013 | Meredith et al. |
| 2013/0036019 A1 | 2/2013 | Tamari et al. |
| 2013/0036048 A1 | 2/2013 | Campos et al. |
| 2013/0041768 A1 | 2/2013 | Llach |
| 2013/0054470 A1 | 2/2013 | Campos et al. |
| 2013/0066735 A1 | 3/2013 | Llach |
| 2013/0091060 A1 | 4/2013 | Kundu |
| 2013/0117138 A1 | 5/2013 | Hazel et al. |
| 2013/0185214 A1 | 7/2013 | Azen et al. |
| 2013/0191136 A1 | 7/2013 | Apshago et al. |
| 2013/0191213 A1 | 7/2013 | Beck et al. |
| 2013/0262316 A1 | 10/2013 | Hruska |
| 2013/0268437 A1 | 10/2013 | Desai et al. |
| 2013/0304642 A1 | 11/2013 | Campos |
| 2014/0019352 A1 | 1/2014 | Shrivastava |
| 2014/0025519 A1 | 1/2014 | Thomas |
| 2014/0143089 A1 | 5/2014 | Campos et al. |
| 2014/0214656 A1 | 7/2014 | Williams et al. |
| 2014/0344149 A1 | 11/2014 | Campos |
| 2015/0302394 A1 | 10/2015 | Harper |
| 2015/0348018 A1 | 12/2015 | Campos et al. |
| 2017/0236117 A1 | 8/2017 | Paschini et al. |

FOREIGN PATENT DOCUMENTS

| | | |
|---|---|---|
| EP | 1286317 A2 | 2/2003 |
| EP | 1829352 A2 | 9/2007 |
| EP | 1829354 A2 | 9/2007 |
| EP | 2521999 A1 | 11/2012 |
| GB | 2215897 A | 9/1989 |
| GB | 2287565 A | 9/1995 |
| JP | 5225221 A | 9/1993 |
| JP | 10174009 | 6/1998 |
| JP | 410155040 | 6/1998 |
| JP | 11259576 | 9/1999 |
| JP | 2003016368 A | 1/2003 |
| KR | 20020020773 A | 3/2002 |
| WO | WO 9641462 | 12/1996 |
| WO | 9746961 A1 | 12/1997 |
| WO | 9847112 | 10/1998 |
| WO | 0111857 | 2/2001 |
| WO | 0116905 A1 | 3/2001 |
| WO | 03071386 | 8/2003 |
| WO | 03083792 A2 | 10/2003 |
| WO | 2004107280 A2 | 12/2004 |
| WO | 2004107280 A3 | 12/2004 |
| WO | 2006062832 A2 | 6/2006 |

(56) References Cited

FOREIGN PATENT DOCUMENTS

| | | | |
|---|---|---|---|
| WO | 2006062832 A3 | 6/2006 |
| WO | 2006062842 A2 | 6/2006 |
| WO | 2006062842 A3 | 6/2006 |
| WO | 2007127729 A2 | 11/2007 |
| WO | 2008008671 A2 | 1/2008 |
| WO | 2011085241 A1 | 7/2011 |
| WO | 2011159571 A1 | 12/2011 |
| WO | 2011159579 A2 | 12/2011 |
| WO | 2011159579 A3 | 12/2011 |
| WO | 2012027664 A1 | 3/2012 |
| WO | 2012166790 A1 | 12/2012 |
| WO | 2013123438 A1 | 8/2013 |
| WO | 2014081822 A2 | 5/2014 |
| WO | 2014081822 A3 | 5/2014 |
| WO | 2014107594 A2 | 7/2014 |
| WO | 2014107594 A3 | 7/2014 |

OTHER PUBLICATIONS

Foreign communication from a related counterpart application—Search Report, European Application No. 11732229.7, dated Dec. 8, 2014, 8 pages.
Foreign communication from a related counterpart application—Mexican Office Action, Application No. MX/a/2012/007926, dated Nov. 21, 2014, 10 pages.
Office Action dated Dec. 22, 2014 (31 pages), U.S. Appl. No. 12/538,083, filed Aug. 7, 2009.
Office Action (Final) dated Jan. 14, 2015 (38 pages), U.S. Appl. No. 13/704,084, filed Dec. 13, 2012.
Office Action dated Jan. 5, 2015 (72 pages), U.S. Appl. No. 14/452,829, filed Aug. 6, 2014.
Office Action (Final) dated Feb. 4, 2015 (16 pages), U.S. Appl. No. 13/619,226, filed Sep. 14, 2012.
Office Action (Final) dated Mar. 5, 2015 (43 pages), U.S. Appl. No. 13/621,331, filed Sep. 17, 2012.
Office Action dated Mar. 17, 2015 (80 pages), U.S. Appl. No. 13/483,711, filed May 30, 2012.
Advisory Action dated Apr. 3, 2015 (3 pages), U.S. Appl. No. 13/704,084, filed Dec. 13, 2012.
Filing receipt and specification for patent application entitled "System and Method for Electronic Prepaid Account Replenishment," by Miles Paschini, et al., filed Mar. 2, 2015 as U.S. Appl. No. 14/636,092.
Foreign communication from a related counterpart application—International Preliminary Report on Patentability, PCT/US2012/039981, dated Dec. 2, 2013, 31 pages.
Office Action (Final) dated Mar. 18, 2015 (18 pages), U.S. Appl. No. 13/619,176, filed Sep. 14, 2012.
Office Action (Final) dated Apr. 7, 2015 (23 pages), U.S. Appl. No. 12/538,083, filed Aug. 7, 2009.
Advisory Action dated Apr. 14, 2015 (3 pages), U.S. Appl. No. 13/619,226, filed Sep. 14, 2012.
Advisory Action dated May 21, 2015 (6 pages), U.S. Appl. No. 13/621,331, filed Sep. 17, 2012.
Foreign communication from a related counterpart application—Mexican Office Action, Application No. MX/a/2013/013903, dated Apr. 23, 2015, 9 pages.
Office Action (Final) dated May 6, 2015 (13 pages), U.S. Appl. No. 14/106,494, filed Dec. 13, 2013.
Office Action (Final) dated Jun. 2, 2015 (33 pages), U.S. Appl. No. 13/520,849, filed Jul. 6, 2012.
Office Action (Final) dated Jun. 3, 2015 (32 pages), U.S. Appl. No. 10/821,815, filed Apr. 9, 2004.
Patent application entitled "System and Method of Registering Stored-Value Cards into Electronic Wallets," by Tomas Ariel Campos, et al., filed Aug. 15, 2014 as U.S. Appl. No. 14/379,210.
Office Action (Final) dated Jun. 9, 2015 (26 pages), U.S. Appl. No. 14/085,394, filed Nov. 20, 2013.
Office Action (Final) dated Jun. 18, 2015 (32 pages), U.S. Appl. No. 13/617,751, filed Sep. 14, 2012.
Filing receipt and specification for provisional patent application entitled "Endless Endcap," by Tomas Ariel Campos, filed Nov. 20, 2012 as U.S. Appl. No. 61/728,597.
Foreign communication from a related counterpart application—Australian Examination Report, Application No. 2011293250, dated Jun. 2, 2014, 3 pages.
Foreign communication from a related counterpart application—International Search Report and Written Opinion, PCT/US2014/010206, dated Jun. 23, 2014, 10 pages.
Foreign communication from a related counterpart application—International Search Report and Written Opinion, PCT/US2013/070991, dated May 22, 2014, 11 pages.
Office Action dated Jul. 15, 2014 (19 pages), U.S. Appl. No. 13/619,176, filed Sep. 14, 2012.
Office Action dated Jul. 31, 2014 (38 pages), U.S. Appl. No. 13/621,331, filed Sep. 17, 2012.
Office Action dated Aug. 6, 2014 (30 pages), U.S. Appl. No. 13/704,084, filed Dec. 13, 2012.
Foreign communication from a related counterpart application—Mexican Office Action, Application No. MX/a/2012/007926, dated Nov. 26, 2013, 14 pages.
Foreign communication from a related counterpart application—Mexican Office Action, Application No. MX/a/2012/007926, dated Apr. 25, 2014, 11 pages.
Office Action dated Sep. 26, 2014 (31 pages), U.S. Appl. No. 13/520,849, filed Jul. 6, 2012.
Office Action dated Oct. 1, 2014 (16 pages), U.S. Appl. No. 10/821,815, filed Apr. 9, 2004.
Office Action dated Sep. 15, 2014 (63 pages), U.S. Appl. No. 13/619,226, filed Sep. 14, 2012.
Foreign communication from a related counterpart application—International Search Report and Written Opinion, PCT/US2013/026501, dated Jun. 19, 2013, 15 pages.
Foreign communication from a related counterpart application—International Preliminary Report on Patentability, PCT/US2013/026501, dated Aug. 19, 2014, 12 pages.
Foreign communication from a related counterpart application—Examination Report, New Zealand Application No. 605666, dated Nov. 3, 2014, 4 pages.
Office Action dated Nov. 13, 2014 (12 pages), U.S. Appl. No. 12/786,403, filed May 24, 2010.
Notice of Allowance dated Oct. 24, 2014 (18 pages), U.S. Appl. No. 13/914,360, filed Jun. 10, 2013.
Office Action dated Nov. 19, 2014 (27 pages), U.S. Appl. No. 13/617,751, filed Sep. 14, 2012.
Office Action dated Dec. 4, 2014 (61 pages), U.S. Appl. No. 14/085,394, filed Nov. 20, 2013.
Office Action dated Dec. 5, 2014 (12 pages), U.S. Appl. No. 14/106,494, filed Dec. 13, 2013.
Foreign communication from a related counterpart application—Examination Report, New Zealand Application No. 605612, dated Nov. 18, 2014, 4 pages.
Foreign communication from a related counterpart application—Examination Report, Australian Application No. 2011268018, dated Nov. 24, 2014, 4 pages.
Foreign communication from a related counterpart application—Examination Report, Australian Application No. 2011268026, dated Nov. 26, 2014, 4 pages.
Office Action dated Jun. 29, 2015 (37 pages), U.S. Appl. No. 13/704,084, filed Dec. 13, 2012.
Advisory Action dated Jul. 9, 2015 (8 pages), U.S. Appl. No. 12/538,083, filed Aug. 7, 2009.
Office Action dated Jul. 15, 2015 (8 pages), U.S. Appl. No. 13/619,176, filed Sep. 14, 2012.
Foreign communication from a related counterpart application—International Preliminary Report on Patentability, PCT/US2014/010206, dated Jul. 7, 2015, 7 pages.
Foreign communication from a related counterpart application—International Preliminary Report on Patentability, PCT/US2013/070991, dated May 26, 2015, 8 pages.

(56) References Cited

OTHER PUBLICATIONS

Advisory Action dated Jul. 24, 2015 (13 pages), U.S. Appl. No. 14/106,494, filed Dec. 13, 2013.
Advisory Action dated Aug. 19, 2015 (3 pages), U.S. Appl. No. 14/085,394, filed Nov. 20, 2013.
Office Action dated Jul. 29, 2015 (36 pages), U.S. Appl. No. 14/452,829, filed Aug. 6, 2014.
Office Action dated Oct. 5, 2015 (17 pages), U.S. Appl. No. 13/520,849, filed Jul. 6, 2012.
Office Action dated Oct. 5, 2015 (15 pages), U.S. Appl. No. 13/617,751, filed Sep. 14, 2012.
Advisory Action dated Sep. 23, 2015 (4 pages), U.S. Appl. No. 10/821,815, filed Apr. 9, 2004.
Office Action dated Dec. 31, 2015 (17 pages), U.S. Appl. No. 10/821,815, filed Apr. 9, 2004.
Office Action (Final) dated Sep. 9, 2015 (73 pages), U.S. Appl. No. 12/786,403, filed May 24, 2010.
Advisory Action dated Dec. 16, 2015 (3 pages), U.S. Appl. No. 12/786,403, filed May 24, 2010.
Office Action dated Sep. 15, 2015 (78 pages), U.S. Appl. No. 14/636,092, filed Mar. 2, 2015.
Office Action dated Oct. 2, 2015 (20 pages), U.S. Appl. No. 12/538,083, filed Aug. 7, 2009.
Office Action (Final) dated Jan. 13, 2016 (45 pages), U.S. Appl. No. 13/704,084, filed Dec. 13, 2012.
Office Action dated Sep. 29, 2015 (104 pages), U.S. Appl. No. 13/819,469, filed Jul. 1, 2013.
Office Action dated Oct. 1, 2015 (29 pages), U.S. Appl. No. 13/619,226, filed Sep. 14, 2012.
Office Action dated Nov. 5, 2015 (111 pages), U.S. Appl. No. 13/857,048, filed Apr. 4, 2013.
Office Action dated Nov. 17, 2015 (15 pages), U.S. Appl. No. 14/085,394, filed Nov. 20, 2013.
Office Action dated Feb. 2, 2016 (106 pages), U.S. Appl. No. 14/213,448, filed Mar. 14, 2014.
Office Action (Final) dated Apr. 20, 2016 (27 pages), U.S. Appl. No. 13/617,751, filed Sep. 14, 2012.
Office Action dated Apr. 25, 2016 (31 pages), U.S. Appl. No. 12/538,083, filed Aug. 7, 2009.
Examiner's Answer dated Mar. 30, 2016 (6 pages), U.S. Appl. No. 14/106,494, filed Dec. 13, 2013.
Advisory Action dated Mar. 23, 2016 (4 pages), U.S. Appl. No. 13/704,084, filed Dec. 13, 2012.
Office Action (Final) dated Apr. 26, 2016 (29 pages), U.S. Appl. No. 13/819,469, filed Jul. 1, 2013.
Office Action (Final) dated Mar. 24, 2016 (26 pages), U.S. Appl. No. 14/452,829, filed Aug. 6, 2014.
Office Action (Final) dated Mar. 8, 2016 (26 pages), U.S. Appl. No. 13/619,226, filed Sep. 14, 2012.
Office Action (Final) dated May 9, 2016 (26 pages), U.S. Appl. No. 14/085,394, filed Nov. 20, 2013.
Office Action (Final) dated Aug. 8, 2016 (31 pages), U.S. Appl. No. 10/821,815, filed Apr. 9, 2004.
Office Action (Final) dated Jan. 29, 2016 (21 pages), U.S. Appl. No. 13/619,176, filed Sep. 14, 2012.
Advisory Action dated Jul. 27, 2016 (3 pages), U.S. Appl. No. 13/819,469, filed Jul. 1, 2013.
Office Action (Final) dated Jul. 12, 2016 (36 pages), U.S. Appl. No. 13/483,711, filed May 30, 2012.
Office Action (Final) dated May 18, 2016 (32 pages), U.S. Appl. No. 13/857,048, filed Apr. 4, 2013.
Advisory Action dated Aug. 10, 2016 (3 pages), U.S. Appl. No. 13/857,048, filed Apr. 4, 2013.
Advisory Action dated Jul. 15, 2016 (3 pages), U.S. Appl. No. 14/085,394, filed Nov. 20, 2013.
Office Action (Final) dated Jul. 28, 2016 (40 pages), U.S. Appl. No. 14/213,448, filed Mar. 14, 2014.

Filing receipt and specification for patent application entitled "System and Method for Electronic Prepaid Account Replenishment," by Miles Paschini, et al., filed Dec. 19, 2016 as U.S. Appl. No. 15/383,680.
Filing receipt and specification for provisional patent application entitled "Mimicking Post-Paid User Experience with Stored-Value Card Accounts," by Richard Gotlieb, filed Oct. 26, 2015 as U.S. Appl. No. 62/246,126.
Filing receipt and specification for patent application entitled "Systems and Methods for Mimicking Post-Paid User Experience with Stored-Value Card Accounts," by Richard Gotlieb, filed Oct. 26, 2016 as U.S. Appl. No. 15/335,086.
Advisory Action dated Dec. 15, 2016 (3 pages), U.S. Appl. No. 13/520,849, filed Jul. 6, 2012.
Office Action dated Jan. 11, 2017 (27 pages), U.S. Appl. No. 10/821,815, filed Apr. 9, 2004.
Advisory Action dated Mar. 1, 2017 (3 pages), U.S. Appl. No. 12/538,083, filed Aug. 7, 2009.
Office Action (Final) dated Jan. 13, 2017 (21 pages), U.S. Appl. No. 13/619,176, filed Sep. 14, 2012.
Advisory Action dated Mar. 21, 2017 (3 pages), U.S. Appl. No. 13/619,176, filed Sep. 14, 2012.
Office Action dated Mar. 20, 2017 (31 pages), U.S. Appl. No. 13/819,469, filed Jul. 1, 2013.
Office Action (Final) dated Dec. 22, 2016 (13 pages), U.S. Appl. No. 13/483,711, filed May 30, 2012.
Advisory Action dated Mar. 17, 2017 (3 pages), U.S. Appl. No. 13/483,711, filed May 30, 2012.
Office Action dated Mar. 7, 2017 (131 pages), U.S. Appl. No. 14/147,330, filed Oct. 4, 2016.
Office Action (Final) dated Apr. 4, 2017 (85 pages), U.S. Appl. No. 13/704,084, filed Dec. 13, 2012.
Office Action (Final) dated Sep. 26, 2016 (37 pages), U.S. Appl. No. 13/520,849, filed Jul. 6, 2012.
Advisory Action dated Oct. 20, 2016, (3 pages), U.S. Appl. No. 10/821,815, filed Apr. 9, 2004.
Examiner's Answer dated Oct. 19, 2016 (9 pages), U.S. Appl. No. 12/786,403, filed May 24, 2010.
Notice of Allowance dated Sep. 29, 2016 (7 pages), U.S. Appl. No. 14/636,092, filed Mar. 2, 2015.
Office Action (Final) dated Nov. 29, 2016 (25 pages), U.S. Appl. No. 12/538,083, filed Aug. 7, 2009.
Office Action dated Oct. 19, 2016 (54 pages), U.S. Appl. No. 13/704,084, filed Dec. 13, 2012.
Advisory Action dated Oct. 13, 2016 (3 pages), U.S. Appl. No. 13/483,711, filed May 30, 2012.
Examiner's Answer dated Nov. 25, 2016 (16 pages), U.S. Appl. No. 13/619,226, filed Sep. 14, 2012.
Office Action dated Nov. 2, 2016 (33 pages), U.S. Appl. No. 13/857,048, filed Apr. 4, 2013.
Office Action dated Sep. 30, 2016 (27 pages), U.S. Appl. No. 14/085,394, filed Nov. 20, 2013.
Advisory Action dated Oct. 19, 2016 (3 pages), U.S. Appl. No. 14/213,448, filed Mar. 14, 2014.
Office Action dated Nov. 28, 2016 (39 pages), U.S. Appl. No. 14/213,448, filed Mar. 14, 2014.
Office Action dated Apr. 20, 2017 (30 pages), U.S. Appl. No. 13/520,849, filed Jul. 6, 2012.
Notice of Allowance dated Sep. 18, 2017 (12 pages), U.S. Appl. No. 13/520,849, filed Jul. 6, 2012.
Office Action dated May 30, 2017 (40 pages), U.S. Appl. No. 13/617,751, filed Sep. 14, 2012.
Office Action (Final) dated Oct. 16, 2017 (16 pages), U.S. Appl. No. 13/617,751, filed Sep. 14, 2012.
Advisory Action dated Aug. 1, 2016 (2 pages), U.S. Appl. No. 13/617,751, filed Sep. 14, 2012.
Office Action (Final) dated Jul. 11, 2017 (26 pages), U.S. Appl. No. 10/821,815, filed Apr. 9, 2004.
Advisory Action dated Sep. 20, 2017, (3 pages), U.S. Appl. No. 10/821,815, filed Apr. 9, 2004.
Office Action dated May 18, 2017 (10 pages), U.S. Appl. No. 15/383,680, filed Dec. 19, 2016.

(56) References Cited

OTHER PUBLICATIONS

Office Action (Final) dated Sep. 6, 2017 (5 pages), U.S. Appl. No. 15/383,680, filed Dec. 19, 2016.
Notice of Allowance dated Oct. 10, 2017 (7 pages), U.S. Appl. No. 15/383,680, filed Dec. 19, 2016.
Office Action dated Jun. 29, 2017 (26 pages), U.S. Appl. No. 12/538,083, filed Aug. 7, 2009.
Office Action (Final) dated Jan. 2, 2018 (25 pages), U.S. Appl. No. 12/538,083, filed Aug. 7, 2009.
Office Action dated Jul. 20, 2017 (21 pages), U.S. Appl. No. 13/619,176, filed Sep. 14, 2012.
Advisory Action dated Jun. 16, 2017 (5 pages), U.S. Appl. No. 13/704,084, filed Dec. 13, 2012.
Office Action dated Nov. 13, 2017 (82 pages), U.S. Appl. No. 13/704,084, filed Dec. 13, 2012.
Office Action (Final) dated Aug. 31, 2017 (27 pages), U.S. Appl. No. 13/819,469, filed Jul. 1, 2013.
Advisory Action dated Nov. 7, 2017 (3 pages), U.S. Appl. No. 13/819,469, filed Jul. 1, 2013.
Office Action dated Nov. 20, 2017 (24 pages), U.S. Appl. No. 13/483,711, filed May 30, 2012.
Office Action (Final) dated Jun. 27, 2017 (27 pages), U.S. Appl. No. 14/147,330, filed Jan. 3, 2014.
Advisory Action dated Sep. 20, 2017 (3 pages), U.S. Appl. No. 14/147,330, filed Jan. 3, 2014.
Office Action dated Apr. 3, 2017 (38 pages), U.S. Appl. No. 14/452,829, filed Aug. 6, 2014.
Office Action (Final) dated Oct. 17, 2017 (21 pages), U.S. Appl. No. 14/452,829, filed Aug. 6, 2014.
Advisory Action dated Dec. 8, 2017 (3 pages), U.S. Appl. No. 14/452,829, filed Aug. 6, 2014.
Office Action dated Sep. 29, 2017 (21 pages), U.S. Appl. No. 14/379,210, filed Aug. 15, 2014.
Office Action (Final) dated May 17, 2017 (45 pages), U.S. Appl. No. 13/857,048, filed Apr. 4, 2013.
Office Action (Final) dated Feb. 15, 2017 (23 pages), U.S. Appl. No. 14/085,394, filed Nov. 20, 2013.
Advisory Action dated Apr. 21, 2017 (3 pages), U.S. Appl. No. 14/085,394, filed Nov. 20, 2013.
Office Action dated Sep. 29, 2017 (24 pages), U.S. Appl. No. 14/085,394, filed Nov. 20, 2013.
Office Action dated Mar. 16, 2017 (131 pages), U.S. Appl. No. 14/205,065, filed Mar. 11, 2014.
Office Action (Final) dated Sep. 7, 2017 (34 pages), U.S. Appl. No. 14/205,065, filed Mar. 11, 2014.
Advisory Action dated Nov. 16, 2017 (3 pages), U.S. Appl. No. 14/205,065, filed Mar. 11, 2014.
Office Action (Final) dated May 5, 2017 (49 pages), U.S. Appl. No. 14/213,448, filed Mar. 14, 2014.
Advisory Action dated Jul. 10, 2017 (3 pages), U.S. Appl. No. 14/213,448, filed Mar. 14, 2014.
Office Action dated Sep. 5, 2017 (21 pages), U.S. Appl. No. 14/213,448, filed Mar. 14, 2014.
Filing receipt and specification for provisional patent application entitled "Systems and Methods for Proxy Card and/or Wallet Redemption Card Transactions," by Tushar Vaish, et al., filed Mar. 11, 2013 as U.S. Appl. No. 61/776,594.
Filing receipt and specification for provisional patent application entitled "Systems and Methods for Proxy Card and/or Wallet Redemption Card Transactions," by Pranav Sheth, et al., filed Mar. 13, 2013 as U.S. Appl. No. 61/779,334.
Filing receipt and specification for patent application entitled "Systems and Methods for Proxy Card and/or Wallet Redemption Card Transactions," by Tomas Mel Campos, et al., filed Mar. 11, 2014 as U.S. Appl. No. 14/205,065.
Foreign communication from a related counterpart application— Invitation to Pay Additional Fees, PCT/US2014/010206, dated Mar. 27, 2014, 2 pages
Office Action dated May 19, 2014 (52 pages), U.S. Appl. No. 14/106,494, filed Dec. 13, 2013.

Bernkopf, Mark, "Electronic Cash and Monetary Policy," http://ojphi.org/htbin/cgiwrap/bin/ojs/index.php/fm/article/viewFile/465/822, May 6, 1996, pp. 1-6, vol. 1, No. 1, First Monday.
Browne, F. X., et al., "Payments Technologies, Financial Innovation, and Laissez-Faire Banking," The Cato Journal, http://www.cato.org/pubs/journal/cj15n1-6.html, Spring/Summer 1995, 12 pages, vol. 15, No. 1, Cato Institute.
Business Wire entitled "Easy Wireless Unveils Its New Internet Powered Accessory Express Kiosk Station," Feb. 25, 2000, pp. 1-2, West.
Visa press release entitled "Visa Unveils Next Generation Electronic Payments and Services," http://corporate.visa.com/newsroom/press-releases/press1124.jsp, May 11, 2011, 3 pages.
Congressional Budget Office Study entitled "Emerging Electronic Methods for Making Retail Payments," Jun. 1996, 63 pages, The Congress of the United States.
Filing receipt and specification for provisional patent application entitled "System for Processing, Activating and Redeeming Value Added Prepaid Cards," by Teri Llach, filed Jan. 8, 2010 as U.S. Appl. No. 61/293,413.
Filing receipt and specification for provisional patent application entitled "Efficient Stored-Value Card Transactions," by Ansar Ansari, filed Jun. 14, 2010 as U.S. Appl. No. 61/354,469.
Filing receipt and specification for provisional patent application entitled "Efficient Stored-Value Card Transactions," by Ansar Ansari, filed Jun. 14, 2010 as U.S. Appl. No. 61/354,470.
Filing receipt and specification for provisional patent application entitled "System and Method for Configuring Risk Tolerance in Transaction Cards," by Arindam Kundu, filed Jun. 14, 2010 as U.S. Appl. No. 61/354,474.
Filing receipt and specification for provisional patent application entitled "System and Method for Configuring Risk Tolerance in Transaction Cards," by Arindam Kundu, filed Jun. 30, 2010 as U.S. Appl. No. 61/360,326.
Filing receipt and specification for provisional patent application entitled "Efficient Stored-Value Card Transactions," by Ansar Ansari, filed Jun. 30, 2010 as U.S. Appl. No. 61/360,327.
Filing receipt and specification for provisional patent application entitled "Prepaid Card with Savings Feature," by Kellie D. Harper, filed Aug. 27, 2010 as U.S. Appl. No. 61/377,800.
Filing receipt and specification for provisional patent application entitled "System for Payment via Electronic Wallet," by Tomas Ariel Campos, filed May 31, 2011 as U.S. Appl. No. 61/491,791.
Filing receipt and specification for provisional patent application entitled "System for Payment via Electronic Wallet," by Tomas Ariel Campos, filed May 31, 2011 as U.S. Appl. No. 61/491,813.
Filing receipt and specification for provisional patent application entitled "System, Method, and Apparatus for Creating and Distributing a Transaction Credit," by Ansar Ansari, filed Jun. 13, 2011 as U.S. Appl. No. 61/496,397.
Filing receipt and specification for provisional patent application entitled "System, Method, and Apparatus for Creating and Distributing a Transaction Credit," by Ansar Ansari, filed Jun. 13, 2011 as U.S. Appl. No. 61/496,404.
Filing receipt and specification for provisional patent application entitled "Stored-Value Card Transaction Systems and Methods," by Ansar Ansari, filed Aug. 31, 2011 as U.S. Appl. No. 61/529,813.
Filing receipt and specification for provisional patent application entitled "Universal Interactive eGift Registration Button aka the Digital Sticker," by Tomas Ariel Campos, filed Feb. 15, 2012 as U.S. Appl. No. 61/599,249.
Filing receipt and specification for provisional patent application entitled "Universal Interactive eGift Registration Button aka the Digital Sticker," by Tomas Ariel Campos, filed Feb. 22, 2012 as U.S. Appl. No. 61/601,911.
Filing receipt and specification for provisional patent application entitled "eWallet with QR Code," by Tomas Ariel Campos, filed Apr. 4, 2012 as U.S. Appl. No. 61/620,173.
Filing receipt and specification for provisional patent application entitled System for Manging CW Information in Electronic Wallet, by Tushar Vaish, filed Jan. 3, 2012 as U.S. Appl. No. 61/748,679.

(56) References Cited

OTHER PUBLICATIONS

Filing receipt and specification for provisional patent application entitled "System and Method for Providing a Security Code," by Tushar Vaish, et al., filed Mar. 15, 2013 as U.S. Appl. No. 61/799,500.
Filing receipt and specification for provisional patent application entitled "System and Method for Using QR Codes in Conjunction with Electronic Stored-Value Cards," by Tomas Mel Campos, et al., filed Mar. 15, 2013 as U.S. Appl. No. 61/800,704.
Filing receipt and specification for patent application entitled "Transaction Processing Platform for Facilitating Electronic Distribution of Plural Prepaid Services," by Roni Dolev Tamari, et al., filed Dec. 18, 2008 as U.S. Appl. No. 12/338,854.
Filing receipt and specification for patent application entitled "System and Method for Using Intelligent Codes to Add a Stored-Value Card to an Electronic Wallet," by Tomas Ariel Campos, filed Apr. 4, 2013 as U.S. Appl. No. 13/857,048.
Filing receipt and specification for patent application entitled "System and Method for Electronic Prepaid Account Replenishment," by Miles Paschini, filed Jun. 10, 2013 as U.S. Appl. No. 13/914,360.
Foreign communication from a related counterpart application—Communication, European Application No. 05825880.7, dated Jun. 27, 2011, 1 page.
Foreign communication from a related counterpart application—Communication, European Application No. 05852818.3, dated May 11, 2009, 1 page.
Foreign communication from a related counterpart application—International Preliminary Examination Report, PCT/US2004/015658, dated Mar. 17, 2006, 6 pages.
Foreign communication from a related counterpart application—International Preliminary Report on Patentability, PCT/US2005/043705, dated Jun. 13, 2007, 6 pages.
Foreign communication from a related counterpart application—International Preliminary Report on Patentability, PCT/US2005/043756, dated Jun. 13, 2007, 6 pages.
Foreign communication from a related counterpart application—International Search Report and Written Opinion, PCT/US2011/020570, dated Mar. 7, 2011, 11 pages.
Foreign communication from a related counterpart application—International Preliminary Report on Patentability, PCT/US2011/020570, dated Jul. 10, 2012, 8 pages.
Foreign communication from a related counterpart application—International Search Report and Written Opinion, PCT/US2012/039981, dated Nov. 5, 2012, 35 pages.
Foreign communication from a related counterpart application—Invitation to Pay Additional Fees, PCT/US2012/039981, dated Aug. 28, 2012, 2 pages.
Foreign communication from a related counterpart application—International Search Report and Written Opinion, PCT/US2011/039996, dated Oct. 24, 2011, 8 pages.
Foreign communication from a related counterpart application—International Preliminary Report on Patentability, PCT/US2011/039996, dated Dec. 14, 2012, 7 pages.
Foreign communication from a related counterpart application—International Search Report and Written Opinion, PCT/US2011/040055, dated Jan. 27, 2012, 12 pages.
Foreign communication from a related counterpart application—International Preliminary Report on Patentability, PCT/US2011/040055, dated Dec. 14, 2012, 8 pages.
Foreign communication from a related counterpart application—Invitation to Pay Additional Fees, PCT/US2011/040055, dated Nov. 16, 2011, 2 pages.
Foreign communication from a related counterpart application—International Search Report and Written Opinion, PCT/US2011/049338, dated Jan. 24, 2012, 7 pages.
Foreign communication from a related counterpart application—International Preliminary Report on Patentability, PCT/US2011/049338, dated Mar. 5, 2013, 6 pages.
Foreign communication from a related counterpart application—Invitation to Pay Additional Fees, PCT/US2013/026501, dated Apr. 16, 2013, 2 pages.

Harrop, Peter, "The Electronic Purse," IEE Review, Jun. 1992, pp. 227-231, IEE.
Kreyer, Nina, et al., "Standardized Payment Procedures as Key Enabling Factor for Mobile Commerce," Preceedings of the Third International Conference on E-Commerce and Web Technologies, 2002, pp. 400-409, Springer-Verlag Berlin Heidelberg.
Levy, Steven, "E-Money (That's What I Want)," Wired, 1994, 11 pages, © The Condé Nast Publications Inc., © Wired Digital, Inc.
Lilge, Manfred, "Evolution of Prepaid Service Towards a Real-Time Payment System," 2001, pp. 195-198, IEEE.
Lin, Yi-Bing, et al., "Mobile Prepaid Phone Services," IEEE Personal Communications, Jun. 2000, pp. 6-14, IEEE.
"Model 5008C Eight Selection Card Vending Machine," http://www.vendapin.com/5008.html, downloaded from Internet on May 9, 2013, 1 page.
Office Action dated Jul. 31, 2013 (13 pages), U.S. Appl. No. 13/520,849, filed Jul. 6, 2012.
U.S. Appl. No. 12/573,810 Non-Final Rejection dated Dec. 21, 2010.
Wenninger, John, et al., "The Electronic Purse," Current Issues in Economics and Finance, Apr. 1995, pp. 1-5 plus one information page, vol. 1, No. 1, Federal Reserve Bank of New York.
Advisory Action dated Apr. 12, 2013 (3 pages), U.S. Appl. No. 10/821,815, filed Apr. 9, 2004.
Advisory Action dated Apr. 19, 2012 (3 pages), U.S. Appl. No. 10/821,815, filed Apr. 9, 2004.
Advisory Action dated Apr. 28, 2009 (3 pages), U.S. Appl. No. 10/821,815, filed Apr. 9, 2004.
Office Action (Final) dated Jan. 25, 2013 (15 pages), U.S. Appl. No. 10/821,815, filed Apr. 9, 2004.
Office Action dated Jul. 16, 2012 (15 pages), U.S. Appl. No. 10/821,815, filed Apr. 9, 2004.
Office Action (Final) dated Feb. 1, 2012 (15 pages), U.S. Appl. No. 10/821,815, filed Apr. 9, 2004.
Advisory Action dated Apr. 11, 2013 (3 pages), U.S. Appl. No. 12/786,403, filed May 24, 2010.
Advisory Action dated May 8, 2012 (2 pages), U.S. Appl. No. 12/786,403, filed May 24, 2010.
Office Action (Final) dated Jan. 16, 2013 (15 pages), U.S. Appl. No. 12/786,403, filed May 24, 2010.
Office Action dated Jun. 6, 2012 (14 pages), U.S. Appl. No. 12/786,403, filed May 24, 2010.
Office Action (Final) dated Feb. 14, 2012 (13 pages), U.S. Appl. No. 12/786,403, filed May 24, 2010.
Office Action dated Mar. 14, 2013 (9 pages), U.S. Appl. No. 13/619,425, filed Sep. 14, 2012.
Advisory Action dated Mar. 12, 2013 (3 pages), U.S. Appl. No. 12/538,083, filed Aug. 7, 2009.
Office Action (Final) dated Dec. 28, 2012 (12 pages), U.S. Appl. No. 12/538,083, filed Aug. 7, 2009.
Office Action dated Apr. 9, 2012 (19 pages), U.S. Appl. No. 12/538,083, filed Aug. 7, 2009.
Office Action dated Jan. 16, 2013 (6 pages), U.S. Appl. No. 13/619,176, filed Sep. 14, 2012.
Advisory Action dated Jun. 6, 2013 (3 pages), U.S. Appl. No. 13/495,986, filed Jun. 13, 2012.
Office Action (Final) dated Mar. 25, 2013 (13 pages), U.S. Appl. No. 13/495,986, filed Jun. 13, 2012.
Office Action dated Dec. 11, 2012 (15 pages), U.S. Appl. No. 13/495,986, filed Jun. 13, 2012.
Advisory Action dated May 31, 2013 (3 pages), U.S. Appl. No. 13/619,226, filed Sep. 14, 2012.
Office Action (Final) dated Mar. 25, 2013 (13 pages), U.S. Appl. No. 13/619,226, filed Sep. 14, 2012.
Office Action dated Dec. 11, 2012 (15 pages), U.S. Appl. No. 13/619,226, filed Sep. 14, 2012.
Panurach, Patiwat, "Money in Electronic Commerce: Digital Cash, Electronic Fund Transfer, and Ecash," Communications of the ACM, Jun. 1996, pp. 45-50, vol. 39, No. 6, ACM.
Patent Application entitled "Systems and Methods for Distributing Personal Identification Numbers (PINs) Over Computer Networks," by Miles Paschini, filed Apr. 16, 2009 as U.S. Appl. No. 12/425,259.

(56) References Cited

OTHER PUBLICATIONS

Patent application entitled "Prepaid Card with Saving Feature," by Kellie D. Harper, filed Feb. 27, 2013 as U.S. Appl. No. 13/819,469.
Provisional patent application entitled "System and Method for Electronic Prepaid Account Replenishment," by Miles Paschini, filed May 28, 2003 as U.S. Appl. No. 60/473,685.
Smart Card Alliance Report PT-03002, "Contactless Payment and the Retail Point of Sale: Applications, Technologies and Transaction Models," Mar. 2003, pp. 1-50.
Ter Maat, Mike, "The economics of e-cash," IEEE Spectrum, Feb. 1997, pp. 68-73, IEEE.
"The future of money: hearing before the Subcommittee on Domestic and International Monetary Policy of the Committee on Banking and Financial Services, House of Representatives, One Hundred Fourth Congress, first session," The Future of Money, Part 4, http://www.archive.org/stream/futureofmoneyhea04unit/futureofmoneyhea04unit_djvu.txt, Jun. 11, 1996, 5 pages.
Office Action dated Aug. 6, 2013 (37 pages), U.S. Appl. No. 12/538,083, filed Aug. 7, 2009.
AFX-Asia, Focus, Company News, "Tata Hydro-Electric Q2 to Spet net profit 265.8 min rupees vs 212.4", Oct. 28, 1999, pp. 9-9.
Ameritech Corp., "Ameritech debuts its prepaid cellular," Abstract, RCE Radio Communications Report 15, No. 31 (1996), ref. 7, Ameritech & ATM, PINs, or Prepaid Cards. 1994-1997, Lexis/Nexis Database.
Ameritech Corp., et al., "Ameritech in Prepaid Card Venture," Abstract, American Banker CLX, No. 205 (1995), ref. 9, Ameritech & ATM, PINs, or Prepaid Cards. 1994-1997, Lexis/Nexis Database.
Ameritech Corp., et al., "Phone cards meet ATMs," Abstract, Bank Technology News 8, No. 12 (1995), ref. 8, Ameritech & ATM, PINs, or Prepaid Cards. 1994-1997, Lexis/Nexis Database.
Beach et al., Abstract, U.S. Pat. No. 5,892,827, Apr. 1999, ref. 7, Catalina Marketing—1994-1997. Lexis/Nexis Database.
Business Wire, Inc., Focus, Business Editors, "Easy Wireless Unveils Its Revolutionary Pre-Paid PIN Dispensing Kiosk; Wireless 2000", Feb. 28, 2000, p. 3.
Business Wire, Inc., Focus, Business Editors, "The Winner's Edge. com Announces Purchase Agreement", Nov. 1, 1999, pp. 5-6.
"Card Briefs: Sprint is using EDS for phone-card plan," Abstract, American Banker, Section: Credit/Debit/ATMs; p. 19, (1995), ref. 4, EDS (Electronic Data Systems)—1994-1997. Lexis/Nexis Database.
Derfler, "How Networks Work", Bestseller Edition, 1996, Ziff-Davis Press, Emeryville, CA, all pages.
EP Application 05852818 European Extended Search Report dated Jan. 22, 2009.
Gill, Lynn A. et al., In Situ Optimization of the Electrode Geometry of the Quadrupole Ion Trap, International Journal of Mass Spectrometry 188 (1999) p. 87-93.
Gralla, "How the Internet Works", Millennium Edition, 1999, Que Corporation, Indianapolis, IN, all pages.
Innovative Telecom Corporation, Abstract, "Innovative Telecom Corporation Receives Contacts from Nynex t Provide Prepaid Phone Card Services," PR Newswire, (1995) Section: Financial News, ref. 4, Innovative Telecom—1994-1997. Lexis/Nexis Database.
"Innovative Telecom Corp., and Catalina Marketing Corporation to Make Prepaid Long Distance Certificates Available to 120 Million Shoppers," Abstract, PR Newswire, (1995), Section: Financial News; ref. 4, Catalina Marketing—1994-1997. Lexis/Nexis Database.
Knowles, Francine, "ATMs to Dispense Calling Cards; Ameritech, Cash Station in Venture," Abstract, Financial Section, Chicago Sun-Times, Oct. 18, 1995, ref. 1, Ameritech & ATM, PINs, or Prepaid Cards. 1994-1997, Lexis/Nexis Database.
"Loose Change," Abstract, U.S. Banker (1995), National Edition, Section USB News; Industry, p. 12, ref. 1, EDS (Electronic Data Systems)—1994-1997. Lexis/Nexis Database.
Marcous, et al., Abstract, U.S. Pat. No. 5,650,604, Jul. 1997, Electronic Data Systems Corp., ref. 10, EDS (Electronic Data Systems)—1994-1997. Lexis/Nexis Database.
Mexican Patent Application MX/a/2007/006924 Office Action dated Jul. 28, 2010.
Muller, "Desktop Encyclopedia of the Internet", 1999, Artech House Inc., Norwood, MA, all pages.
"Outsourcing the ATM business," Abstract, Electronic Payments International No. 102 (1995): 6; ref. 5, EDS (Electronic Data Systems)—1994-1997. Lexis/Nexis Database.
PCT/US04/15658 IPRP, ISR and written opinion dated Jun. 22, 2005.
PCT/US05/43756 IPRP, ISR and Written Opinion dated Oct. 3, 2006.
PCT/US05/43705 IPRP, ISR and Written Opinion dated Aug. 10, 2006.
Piskora, Bth, "EDS" inroads into ATMs, Abstract, American Banker (1995): 18:1, ref. 8 EDS (Electronic Data Systems) 1994-1997. Lexis/Nexis Database.
Qcomm International, Inc. Website—Oxpress Prepaid Services Pont-of-Sale Activation (2000).
Splendore, Maurizio et al., A New Ion Ejection Method Employing and Asymmetric Trapping Field to Improve the Mass Scanning Performance of an Electrodynamic Ion Trap, International Journal of Mass Spectrometry 190/191 (1999), p. 129-143.
U.S. Appl. No. 10/316,603 Non-Final Rejection dated Sep. 15, 2005.
U.S. Appl. No. 10/316,603 Non-Final Rejection dated Jun. 20, 2006.
U.S. Appl. No. 10/316,603 Non-Final Rejection dated May 21, 2007.
U.S. Appl. No. 10/316,603 Final Rejection dated Aug. 15, 2008.
U.S. Appl. No. 10/316,603 Notice of Allowance dated Dec. 9, 2008.
U.S. Appl. No. 10/821,405 Non-Final Rejection dated Jan. 14, 2009.
U.S. Appl. No. 10/821,405 Final Rejection dated Nov. 23, 2009.
U.S. Appl. No. 10/821,815 Final Rejection dated Feb. 4, 2009.
U.S. Appl. No. 10/821,815 Non-Final Rejection dated Aug. 5, 2009.
U.S. Appl. No. 10/821,815 Non-Final Rejection dated Jun. 19, 2010.
U.S. Appl. No. 10/821,815 Non-Final Rejection dated Aug. 4, 2010.
U.S. Appl. No. 11/007,663 Non-Final Rejection dated Jun. 12, 2008.
U.S. Appl. No. 11/007,663 Ex Party Quale mailed Jul. 16, 2009.
U.S. Appl. No. 11/007,663 Notice of Allowance dated Oct. 30, 2009.
U.S. Appl. No. 10/846,529 Notice of Allowance dated Jul. 27, 2005.
U.S. Appl. No. 10/925,218 Non-Final Rejection dated Oct. 4, 2005.
U.S. Appl. No. 10/925,218 Non-Final Rejection dated Jun. 14, 2006.
U.S. Appl. No. 10/984,363 Non-Final Rejection dated Sep. 22, 2006.
U.S. Appl. No. 10/984,363 Final Rejection dated Apr. 17, 2007.
U.S. Appl. No. 11/552,915 Non-Final Rejection dated May 25, 2010.
U.S. Appl. No. 11/939,327 Non-Final Rejection dated Sep. 19, 2008.
U.S. Appl. No. 11/939,327 Notice of Allowance dated Jun. 19, 2009.
U.S. Appl. No. 11/007,662 Non-Final Rejection dated Jul. 14, 2006.
U.S. Appl. No. 11/007,662 Notice of Allowance dated Jun. 6, 2007.
U.S. Appl. No. 11/851,337 Notice of Allowance dated Sep. 9, 2008.
U.S. West Communications, Abstract, "US West Launches Christmas Prepaid Calling Card With Card Pioneer Innovative Telecom;— Sixty Minute Holiday Card Available Now—," PR Newswire, (1997) Section: Financial News, ref. 1, Innovative Telecom—1994-1997. Lexis/Nexis Database.
Vendapin Website—www.vendapin.com/5008.html, "Vendapin Model 5004 Four Selection Cellular and IP, Phone Calling Card, Lottery or Admissions Ticket Printer Vending Machine With Optional Two Selection Cellular Phone Dispenser Console", Apr. 3, 2000, pp. 1-4.
White, "How Computers Work", Millennium Edition, 1999, Que Corporation, Indianapolis, IN, all pages.
www.carkleen.co.nz/Products/Codax "Codax Activation System" Car Kleen—Leaders in Vehicle Wash Technology.

(56) References Cited

OTHER PUBLICATIONS

Office Action dated Mar. 7, 2014 (15 pages), U.S. Appl. No. 12/786,403, filed May 24, 2010.
Filing receipt and specification for patent application entitled "Systems and Methods for Personal Identification Number Distribution and Delivery," by Darren New, et al., filed Oct. 28, 2013 as U.S. Appl. No. 14/065,189.
Filing receipt and specification for patent application entitled "Transaction Processing Platform for Facilitating Electronic Distribution of Plural Prepaid Services," by Roni Dolev Tamari, et al., filed Dec. 13, 2013 as U.S. Appl. No. 14/106,494.
Foreign communication from a related counterpart application—Examination Report, New Zealand Application No. 605666, dated Aug. 9, 2013, 2 pages.
Foreign communication from a related counterpart application—Examination Report, New Zealand Application No. 607755, dated Dec. 4, 2013, 2 pages.
Office Action dated Oct. 23, 2013 (72 pages), U.S. Appl. No. 13/621,331, filed Sep. 17, 2012.
Office Action (Final) dated Dec. 27, 2013 (19 pages), U.S. Appl. No. 12/538,083, filed Aug. 7, 2009.
Office Action (Final) dated Feb. 7, 2014 (51 pages), U.S. Appl. No. 13/619,176, filed Sep. 14, 2012.
Office Action dated Feb. 19, 2014 (9 pages), U.S. Appl. No. 14/065,189, filed Oct. 28, 2013.
Office Action dated Mar. 3, 2014 (69 pages), U.S. Appl. No. 13/704,084, filed Dec. 13, 2012.
Office Action (Final) dated Dec. 6, 2013 (16 pages), U.S. Appl. No. 10/821,815, filed Apr. 9, 2004.
Advisory Action dated Mar. 10, 2014 (3 pages), U.S. Appl. No. 10/821,815, filed Apr. 9, 2004.
Office Action (Final) dated Feb. 20, 2014 (61 pages), U.S. Appl. No. 13/520,849, filed Jul. 6, 2012.
Office Action dated Mar. 10, 2014 (64 pages), U.S. Appl. No. 13/617,751, filed Sep. 14, 2012.
EP Application 05825880 European Extended Search Report dated Jun. 8, 2011.
U.S. Appl. No. 10/821,815 Non-Final Rejection dated May 9, 2011.
U.S. Appl. No. 12/786,403 Non-Final Rejection dated May 12, 2011.
Advisory Action dated Mar. 25, 2014 (3 pages), U.S. Appl. No. 12/538,083, filed Aug. 7, 2009.
Office Action (Final) dated Mar. 31, 2014 (31 pages), U.S. Appl. No. 13/621,331, filed Sep. 17, 2012.
Examiner's Answer dated Oct. 22, 2013 (12 pages), U.S. Appl. No. 13/495,986, filed Jun. 13, 2012.
Filing receipt and specification for International application entitled "System and Method for Providing a Security Code," filed Jan. 3, 2014 as International application No. PCT/US2014/010206.
Filing receipt and specification for patent application entitled "System and Method for Providing a Security Code," by Tushar Vaish, et al., filed Jan. 3, 2014 as U.S. Appl. No. 14/147,330.
Foreign communication from a related counterpart application—Examination Report, New Zealand Application No. 601208, dated Mar. 5, 2014, 2 pages.
Filing receipt and specification for patent application entitled "System for Processing, Activating and Redeeming Value Added Prepaid Cards," by Ted Llach, et al., filed Mar. 14, 2014 as U.S. Appl. No. 14/213,448.
Filing receipt and specification for provisional patent application entitled "Client Directed Pre-Paid Card," by J. DuWayne Milner, filed Mar. 14, 2013 as U.S. Appl. No. 61/781,667.
Cover sheet and specification for provisional patent application entitled "System and Method for Electronic Prepaid Account Replenishment," by Miles Paschini, et al., filed May 28, 2003 as U.S. Appl. No. 60/473,685.
Office Action dated May 9, 2014 (58 pages), U.S. Appl. No. 13/914,360, filed Jun. 10, 2013.
U.S. Appl. No. 10/821,815 Non-Final Rejection dated May 14, 2008.

\* cited by examiner

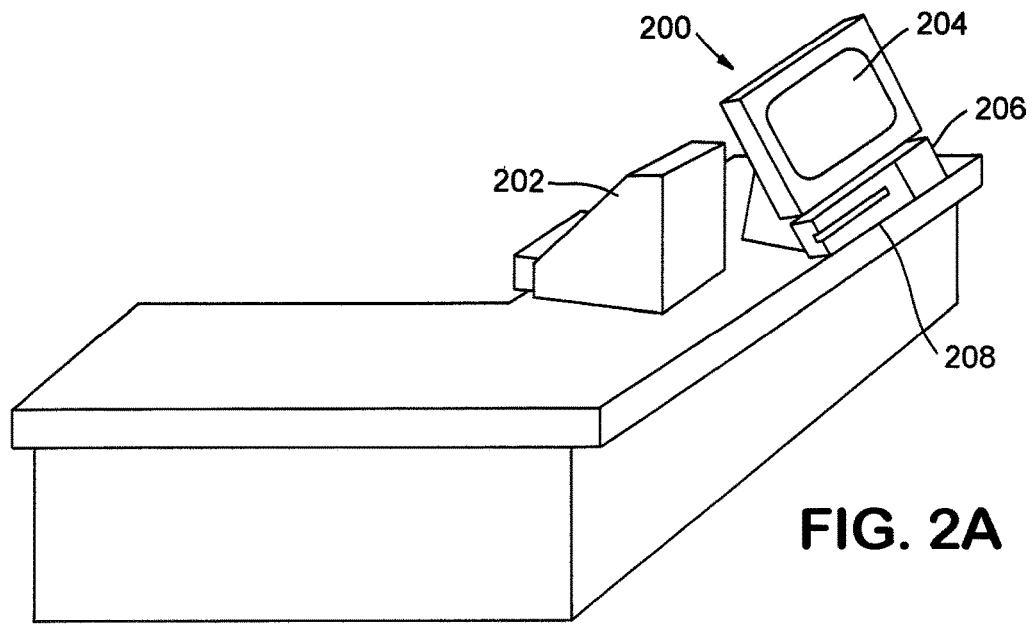
FIG. 2A
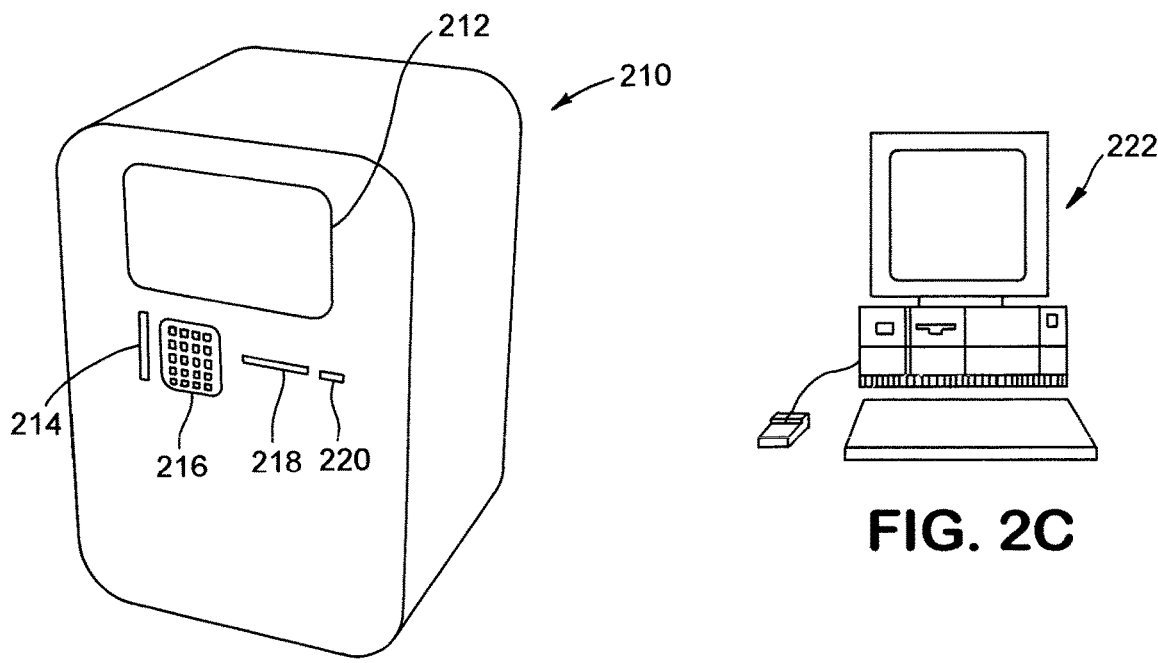
FIG. 2B
FIG. 2C

| PIN DATABASE 112 | | | | | | |
|---|---|---|---|---|---|---|
| | 301 GOOD/SERVICE | 302 PROVIDER | 304 $ VALUE | 306 PIN | 308 RATE | 310 EXPIRATION |
| 312a | Cellular Service | AT&T | $15 | 3456234523 | $0.60/min | 1 month |
| 312b | Cellular Service | AT&T | $15 | 2830525950 | $0.60/min | 1 month |
| 312c | Cellular Service | AT&T | $15 | 9823459754 | $0.60/min | 1 month |
| 312d | Cellular Service | AT&T | $30 | 4575626584 | $0.50/min | 6 months |
| 312e | Cellular Service | AT&T | $30 | 2894754598 | $0.50/min | 6 months |
| | . . . | . . . | . . . | . . . | . . . | . . . |
| 312f | Cellular Service | AIRTOUCH | $50 | 0948574995 | $0.40/min | 1 year |
| 312g | Cellular Service | AIRTOUCH | $50 | 9087423543 | $0.40/min | 1 year |
| 312h | Cellular Service | AIRTOUCH | $50 | 1358909658 | $0.40/min | 1 year |
| 312i | Cellular Service | AIRTOUCH | $100 | 8759187405 | $0.35/min | 1 year |
| 312j | Cellular Service | AIRTOUCH | $100 | 8648767465 | $0.35/min | 1 year |
| 312k | Cellular Service | AIRTOUCH | $100 | 3245105748 | $0.35/min | 1 year |
| | . . . | . . . | . . . | . . . | . . . | . . . |
| 312l | Cellular Service | SPRINT | $25 | 8275098427 | $0.55/min | 6 months |
| 312m | Cellular Service | SPRINT | $25 | 0987451455 | $0.55/min | 6 months |
| 312n | Cellular Service | SPRINT | $50 | 1234870987 | $0.39/min | 6 months |
| 312o | Cellular Service | SPRINT | $50 | 8765230058 | $0.39/min | 6 months |
| 312p | Cellular Service | SPRINT | $100 | 4545454892 | $0.36/min | 6 months |
| | . . . | . . . | . . . | . . . | . . . | . . . |
| 312q | Gasoline | MOBIL | $100 | 1231283950 | Pump Rate | 1 year |
| 312r | Gasoline | MOBIL | $100 | 3458432349 | Pump Rate | 1 year |

FIG. 3

PrePaid Airtime Purchase Ordering System

© 2000 by Powered By Easy Wireless, Inc.
http://www.easywireless.com

Purchase Ordering Model

Purchase Order Data Entry

| Dealer Information: | Payment Method: | Current Balance: |
|---|---|---|
| ABC Communications<br>123 ABC St.,<br>San Diego, CA 91941 | Credit Card: Visa<br>Exp: 02/2002<br>Cardholder Name: John Doe | None |

| Carrier | Region | Card Type | Qty | Wholesale | Totals | Add/Del |
|---|---|---|---|---|---|---|
| Verizon Wireless | Northwest | $30 Card | 5 | $ 25.00 | $ 250.00 | |
| <Select Carrier> | <Select Region> | <Select Card> | 1 | $ --.-- | $ --.-- | |
| | | | | Grand Total: | $ 250.00 | |

Instructions

1) Select a Carrier, Region, Card Type then Enter a Quantity.
2) Confirm your line item by clicking "ADD" at the end of the line.
3) Repeat the process until all the PINs that you wish to purchase are listed.
4) Click "Continue To Summary Screen" to review your order and payment methods.

You *must* click ADD to buy a line item.

To Remove a Line Item: Click "DEL" on the line item you wish to remove.

To Change a Quantity: Change the quantity field to the desired amount, then click "Update Order"

To Cancel the Entire Order: Click "Cancel Order"

If you are having any problems with the system, please send an email to prepaidservice@easywireless.com with a brief description of your problem.

See Next Screen

FIG. 14

Purchase Order Summary

| Dealer Information: | Payment Method: | Current Balance: |
|---|---|---|
| ABC Communications<br>123 ABC St.<br>San Diego, CA 91941 | ACH Maxium:<br>$2,000<br>ACH Min Refresh:<br>$200 | $ 1,000 |

Account Response Window
Previous Balance: $ 1000.00
Amount of Purchase Order: $ 240.00
New Balance: $ 760.00

Purchase Order Summary:

Please review your Purchase Order. If satisfactory, "Submit PO" and your order will be processed and your account charged.

| # | Carrier | Region | Card Type | Qty | Card Cost | Totals |
|---|---|---|---|---|---|---|
| 1 | MCI | Region ABC | $ 5 Card | 5 | $ 3.00 | $ 15.00 |
| 2 | MCI | Region XYZ | $ 30 Card | 3 | $ 20.00 | $ 60.00 |
| 3 | AT&T Wireless | Los Angeles, CA | $ 50 Card | 1 | $ 35.00 | $ 35.00 |
| 4 | AT&T Wireless | Los Angeles, CA | $ 100 Card | 2 | $ 60.00 | $120.00 |
| 5 | Verizon | Louisville, KY | $ 5 Card | 5 | $ 2.00 | $ 10.00 |
|   |   |   |   |   | Grand Total: | $ 240.00 |

1502  1508  1504  1506

If you are having any problems with the system, please send an email to prepaidservice@easywireless.com with a brief description of your problem.

View Alternate Payment Page | View Print Screen

FIG. 15

Purchase Order Summary

Alternate Credit Card Payment Screen

Please Fill In All Fields. Billing Address must match CardHolder name.

Billing Information

Cardholder Name: [          ]

Address Line 1: [          ]

Address Line 2: [          ]

City: [          ]

State/Province: [          ]

Zip Code: [     ]

Credit Card Type: [MasterCard]

Expiration: Month [01] - Year [2000]

Credit Card Number: [          ]

Purchase Order Summary:

Please review your Purchase Order. After you submit this order, the following screen will display your PINS and allow you to print them from your browser.

| # | Carrier | Region | Card Type | Qty | Card Cost | Totals |
|---|---|---|---|---|---|---|
| 1 | MCI | Region ABC | $ 5 Card | 5 | $ 3.00 | $ 15.00 |
| 2 | MCI | Region XYZ | $ 30 Card | 3 | $ 20.00 | $ 60.00 |
| 3 | AT&T Wireless | Los Angeles, CA | $ 50 Card | 1 | $ 35.00 | $ 35.00 |
| 4 | AT&T Wireless | Los Angeles, CA | $ 100 Card | 2 | $ 60.00 | $120.00 |
| 5 | Verizon | Louisville, KY | $ 5 Card | 5 | $ 2.00 | $ 10.00 |
|   |   |   |   |   | *Grand Total:* | *$ 240.00* |

FIG. 16

Purchase Receipt Summary

Thank You For Your Purchase!

PRINT THIS PAGE IMMEDIATELY FOR YOUR RECORDS.
A copy of this receipt WITHOUT PINS will be emailed to your account for your records.

Purchase Order Summary

Dealer Name: XYZ Wireless
Dealer ID: 515432
Payment Type Used: ACH
Previous Account Balance: $ 1,000.00
Total Amount of Purchase Order: $ 390.00
New Balance: *$ 610.00*
Transaction Date: 02/15/2000
Transaction Number: 1554987745234

The following list of PINS were purchased:

| Carrier | Region | Card Type | PINS |
|---|---|---|---|
| MCI | Region ABC | $ 5 Card | 2165498465132132 |
| MCI | Region ABC | $ 5 Card | 9815654198510522 |
| MCI | Region ABC | $ 5 Card | 6851096519865241 |
| MCI | Region ABC | $ 5 Card | 9854103541524854 |
| MCI | Region ABC | $ 5 Card | 9651068352741551 |
| MCI | Region XYZ | $ 30 Card | 1321319849515216 |
| MCI | Region XYZ | $ 30 Card | 9541687418524156 |
| MCI | Region XYZ | $ 30 Card | 3249864138787496 |
| AT&T Wireless | Los Angeles, CA | $ 50 Card | 2165165165135165 |
| AT&T Wireless | Los Angeles, CA | $ 100 Card | 8546165165165165 |
| AT&T Wireless | Los Angeles, CA | $ 100 Card | 3549818743184945 |
| Verizon | Louisville, KY | $ 5 Card | 9816519819851565 |
| Verizon | Louisville, KY | $ 5 Card | 6549806541635241 |
| Verizon | Louisville, KY | $ 5 Card | 8541216854210556 |
| Verizon | Louisville, KY | $ 5 Card | 1354135054198604 |
| Verizon | Louisville, KY | $ 5 Card | 8754040567418653 |

If you are having any problems with the system, please send an email to prepaidservice@easywireless.com with a brief description of your problem.

FIG. 17

Prepaid Cellular PIN Ticket

Carrier: AT&T Wireless

Region: National

PIN Number: 189465216548951

Card Type: $ 30 Card

Expiration: 60 Days from date of Ticket

Ticket Date: 06/05/2000

Long Distance Rate: $ 0.12 per minute

Roaming Rate: $ 0.59 per minute

| 1916 | | 1918 | | 1920 | | 1922 | | 1924 | |
|---|---|---|---|---|---|---|---|---|---|
| Sub/Kiosk ID | # | POS Type ID | # | Payment_Method ID | # | Credit Card ID | # | Employee ID | # |
| Kiosk_Name | an | Public Kiosk | an | Credit Card | an | Visa | an | Employee_First | an |
| Kiosk_Icon | an | Sub Dealer | an | ACH Wallet | an | Mastercard | an | Employee_Last | an |
| Kiosk_Contact_First | an | Counter Kiosk | an | Cash | an | AMEX | an | Internal ID Number | an |
| Kiosk_Contact_Last | an | | | Credit Account | an | Discover | an | Commission % | % |
| Kiosk_Contact_Phone1 | an | | | | | | | Quota | num |
| Kiosk_Contact_Phone2 | an | | | | | | | Bonus % | % |
| Kiosk_Contact_Fax | an | | | | | | | Bonus Rate | curr |
| Kiosk_Contact_Email | an | | | | | | | Bonus Quota | num |
| Kiosk_Mailing_Address1 | an | | | | | | | | |
| Kiosk_Mailing_Address2 | an | | | | | | | | |
| Kiosk_Mailing_City | an | | | | | | | | |
| Kiosk_Mailing_State | an | | | | | | | | |
| Kiosk_Mailing_ZIP | an | | | | | | | | |
| Kiosk_Mailing_Province | an | | | | | | | | |
| Kiosk_Mailing_Country | an | | | | | | | | |
| Kiosk_Billing_Contact_First | an | | | | | | | | |
| Kiosk_Billing_Contact_Last | an | | | | | | | | |
| Kiosk_Billing_Contact_Phone1 | an | | | | | | | | |
| Kiosk_Billing_Contact_Phone2 | an | | | | | | | | |
| Kiosk_Billing_Contact_Fax | an | | | | | | | | |
| Kiosk_Billing_Contact_Email | an | | | | | | | | |
| Kiosk_Billing_Mailing_Address1 | an | | | | | | | | |
| Kiosk_Billing_Mailing_Address2 | an | | | | | | | | |
| Kiosk_Billing_Mailing_City | an | | | | | | | | |
| Kiosk_Billing_Mailing_State | an | | | | | | | | |
| Kiosk_Billing_Mailing_ZIP | an | | | | | | | | |
| Kiosk_Billing_Mailing_Province | an | | | | | | | | |
| Kiosk_Billing_Mailing_Country | an | | | | | | | | |
| Kiosk_Markup_Percent | % | | | | | | | | |
| Kiosk_Federal_Tax_ID | num | | | | | | | | |
| Kiosk_SSN | num | | | | | | | | |
| Kiosk_Credit_Card_Number | # | | | | | | | | |
| Credit_Card ID | date | | | | | | | | |
| Kiosk_Credit_Card_Exp | an | | | | | | | | |
| Kiosk_Credit_Card_Cardholder_Billing_First | an | | | | | | | | |
| Kiosk_Credit_Card_Cardholder_Billing_Last | an | | | | | | | | |
| Kiosk_Credit_Card_Cardholder_Billing_Address1 | an | | | | | | | | |
| Kiosk_Credit_Card_Cardholder_Billing_Address2 | an | | | | | | | | |
| Kiosk_Credit_Card_Cardholder_Billing_City | an | | | | | | | | |
| Kiosk_Credit_Card_Cardholder_Billing_State | an | | | | | | | | |
| Kiosk_Credit_Card_Cardholder_Billing_ZIP | an | | | | | | | | |
| Kiosk_Wallet_Balance | curr | | | | | | | | |
| Kiosk_Wallet_Refresh | curr | | | | | | | | |
| Kiosk_Wallet_Max | curr | | | | | | | | |
| Kiosk_Bank_Routing_Number | curr | | | | | | | | |
| Kiosk_Bank_Account_Number | curr | | | | | | | | |
| Kiosk_Credit_Account_Limit | curr | | | | | | | | |
| Kiosk_Credit_Account_Balance | curr | | | | | | | | |
| Kiosk_Approved_Carriers | list | | | | | | | | |
| Kiosk_Approved_Regions | list | | | | | | | | |
| Kiosk_Approved_Denominations | list | | | | | | | | |
| Kiosk_UserName | an | | | | | | | | |
| Kiosk_Password | an | | | | | | | | |
| Payment_Method ID | # | | | | | | | | |
| Dealer ID | # | | | | | | | | |
| POS Type ID | # | | | | | | | | |

FIG. 19B

SYSTEM AND METHOD FOR DISTRIBUTING PERSONAL IDENTIFICATION NUMBERS OVER A COMPUTER NETWORK

CROSS-REFERENCE TO RELATED APPLICATIONS

This application is a continuation of and claims priority to U.S. patent application Ser. No. 10/821,405 filed Apr. 4, 2004, entitled SYSTEM AND METHOD FOR DISTRIBUTING PERSONAL IDENTIFICATION NUMBERS OVER A COMPUTER NETWORK, which is a continuation-in-part of U.S. patent application Ser. No. 10/316,603, entitled SYSTEM AND METHOD FOR DISTRIBUTING PERSONAL IDENTIFICATION NUMBERS OVER A COMPUTER NETWORK (filed Dec. 10, 2002), which is a continuation of U.S. patent application Ser. No. 09/619,392, filed on Jul. 19, 2000, entitled SYSTEM AND METHOD FOR DISTRIBUTING PERSONAL IDENTIFICATION NUMBERS OVER A COMPUTER NETWORK. This application is also related to co-pending U.S. patent application Ser. No. 10/821,815 entitled SYSTEM AND METHOD FOR DISTRIBUTING PERSONAL IDENTIFICATION NUMBERS OVER A COMPUTER NETWORK. The content of each of these applications is hereby incorporated by reference herein in its entirety for all purposes.

FIELD OF THE INVENTION

The present invention generally relates to a system and method for allowing customers and businesses to purchase pre-paid goods and services. The present invention more specifically relates to a system and method for distributing personal identification numbers (PINS) for access to pre-paid goods and services to users over a computer network.

BACKGROUND OF THE INVENTION

There currently exist "pre-paid" telephone cards that allow a customer to purchase a desired amount of long-distance telephone time from a particular telephone service provider. These pre-paid telephone cards are often sold by dealers such as convenience stores or wireless phone stores. Pre-paid telephone cards are also often sold in airports. Vending machines for selling pre-paid telephone cards also have been developed. Each of these pre-paid telephone cards has a specific monetary denomination. For example, a customer could purchase a $10 card, a $20 card, or a $100 card. These pre-paid telephone cards are sold by particular telephone service providers such as AT&T, MCI, Sprint, etc. A customer could, for example, buy a $20 MCI card, which would entitle him or her to $20 worth of long-distance calling service provided by MCI. These cards are referred to as "pre-paid" because the customer purchases the long-distance time before he or she actually places the call. This is in contrast to the more typical post-pay service that most telephone customers use with the telephone in their residence or office. With post-pay service, customers are sent a bill on a periodic basis. The customer pays for calls that have already been made, rather than calls that will be made in the future.

Frequently, the pre-paid telephone cards that are sold by dealers or vending machines are of the "scratch-off" type. After the customer purchases a card, he or she can scratch off a layer of material, which reveals a personal identification number (PIN). The layer of scratch-off material hides the PIN from customers browsing in the store who have not purchased the card. After a customer purchases a card and scratches off the layer of material, the customer can then use the card to place a long-distance call. When the customer wishes to place a long-distance call, he or she dials a special number provided by the telephone service provider. The customer then enters the PIN written on the card. The long distance provider automatically debits the charge of the call from an account associated with the PIN.

As an example, a customer could purchase a $10 MCI card. After the customer rubs off the layer of material, a PIN number 129384348764 is revealed. When the customer wishes to place a long-distance call, the customer dials an MCI access number. The customer then enters PIN 129384348764. The long-distance carrier, MCI, identifies the PIN and recognizes that there is $10 worth of credit in this account. If the customer places a call which lasts 5 minutes and costs 4$, MCI will debit the account so that $6 remains. The next time the customer places a call using that PIN number, the system will find that $6 remains in the account associated with that PIN.

One problem with these pre-paid phone cards is that the cards present a major inventory headache for dealers. There is a lot of work and expense associated with maintaining a filled inventory of cards. First, the dealer or vending machine operator has to predict which cards will be in demand and determine how many cards of each denomination to order for each of various providers. The dealer then has to pay for the desired inventory of cards up front, which requires a significant cash outlay. The dealer then has to keep track of how many cards are left in stock for each service provider and of each different monetary denomination, and determine when to order a new batch of cards. All of these costs associated with filled inventory can be time consuming and expensive for dealers.

Another problem is that these pre-paid telephone cards are especially vulnerable to theft, loss, and other inventory "shrinkage." Because the cards are small, it is easy for a shoplifter to pocket a card unnoticed. Since these cards have a high value to them and are so easy to pocket, dealers, which sell these cards, are extremely vulnerable to inventory shrinkage.

Vending card machines have been proposed which store personal identification numbers (PINs) in a memory in the machine. A customer can then purchase a pre-paid telephone PIN by inserting cash into the machine. The machine can replenish its stock of PINs when the memory runs out of PINs or on a periodic basis by accessing a remote store of PINs via a modem.

The problem with these vending machines is that there are still significant costs associated with inventorying the PINS. The PINs are retained in a memory in the machine, which has a similar effect to storing cards. Once a PIN has been stored in the memory of a particular machine, that PIN becomes unavailable to be used by any other dealer, even if the PIN is never purchased. Additionally, if the machine were to break, or the memory were to be erased, there is a problem determining who is responsible for paying for the PINs that were contained in the memory. Additionally, decisions must still be made how many PINs to store in memory, what monetary denominations to store in memory, and for which providers to store PINs in memory. Therefore, there are still significant inventory costs associated with storing the PINs in the vending machine. Additionally, these proposed vending machines do not provide consumers the ability to obtain a PIN from the convenience of their homes or offices.

Another system, which has been proposed, is a web site, which is accessed over the Internet. A customer can go to this web site and purchase pre-paid telephone service. A PIN is then e-mailed to the customer's e-mail address. The problem with this service is that a customer must be able to access his or her e-mail account in order to obtain the PIN. Additionally, e-mail is often unsecure. If a computer hacker is "listening in" on an individual's email, then the hacker can steal the PIN and use it for his own purposes. Additionally, if a customer is purchasing a PIN in a convenience store or an airport, the customer will probably not have access to his or her e-mail account. The customer may have to wait to return to his or her home or office to access the PIN. Additionally, e-mail can sometimes be slow and it may take hours or days to retrieve the message from the customers Internet Service Provider (ISP).

What is needed is a secure system that provides PINs for pre-paid goods and services conveniently to customers. What is also needed is a system that relieves dealers such as convenience stores and vending machine operators from the costs associated with maintaining a filled inventory of pre-paid cards and PINs. What is also needed is a system that allows consumers to select from a wide-range of providers and monetary denominations without requiring the dealer to maintain a large filled inventory of cards or predict which type of cards or PINs to order. What is also needed is a secure system for selling pre-paid goods and services, which is less vulnerable to theft and other inventory shrinkage. What is also needed is a system that can perform real-time distribution and accounting of personal identification numbers.

SUMMARY

In one embodiment, the invention can be characterized as a system for distributing personal identification numbers (PINs). The system includes a plurality of client terminals, each of said plurality of client terminals being capable of requesting and receiving PINs, and the system includes a plurality of servers operatively coupled to said plurality of client terminals, each of said servers including a corresponding one of a plurality of PIN inventories, wherein each of said servers is capable of sending PINs to at least one of said plurality of client terminals. The system also includes a hub operatively coupled to each of said servers, wherein said hub is configured to send PINs to each of said plurality of servers for inclusion within said PIN inventories.

In another embodiment, the invention can be characterized as a method for distributing personal identification numbers (PINs) through a distribution network including a plurality of servers, each of said servers being operatively coupled to at least one of a plurality of client terminals. The method including: receiving at a hub, from one of said plurality of servers, a request for a quantity of PINs; sending from said hub said quantity of PINs to said one of said plurality of servers wherein each of said plurality of servers is configured to send PINs to at least one of said plurality of client terminals; requesting another quantity of PINs from another one of said plurality of servers; and receiving at said hub said other quantity of PINs from said other one of said plurality of servers.

In a further embodiment, the invention may be characterized as a method, and means for carrying out the method, for managing an inventory of PINs in a PIN distribution network. The distribution network includes a hub coupled to a plurality of servers, and each of the servers is coupled to at least one of a plurality of client terminals, the method comprising: dynamically allocating PINs of said inventory of PINs among said plurality of servers so as to substantially maintain a quantity of PINs at each server at a desired level for each server; and acquiring additional PINs at the hub in response to at least one PIN in said inventory being distributed to at least one user from at least one of said plurality of client terminals.

In yet another embodiment, the invention may be characterized as a method of distributing a personal identification number (PIN) through a client terminal. The method including: generating, at a server, a request for a PIN; transmitting said request for said PIN from the server to a hub; receiving said PIN at said server from said hub; receiving, at said server, a client request for said PIN, wherein said client request is generated at said client terminal and transmitted to said server; and sending said PIN to said client terminal in response to said client request.

BRIEF DESCRIPTION OF THE DRAWINGS

FIG. 2A depicts a picture of a dealer-located embodiment of a client terminal;

FIG. 2B depicts an automated kiosk embodiment of a client terminal;

FIG. 2C depicts a personal computer embodiment of a client terminal;

FIG. 3 depicts a simplified example of a database record;

FIG. 14 depicts an example of a display screen shown to a user for entering data into a purchase order;

FIG. 15 depicts an example of a purchase order summary screen;

FIG. 16 depicts an example of a screen shown to a user for entering alternate credit card information;

FIG. 17 depicts an example of a purchase receipt summary screen for the purchase ordering system;

FIG. 18 shows an example of a prepaid cellular PIN receipt/ticket;

FIGS. 19A and 19B shows an example of a more detailed database record;

DETAILED DESCRIPTION

Figure 1:
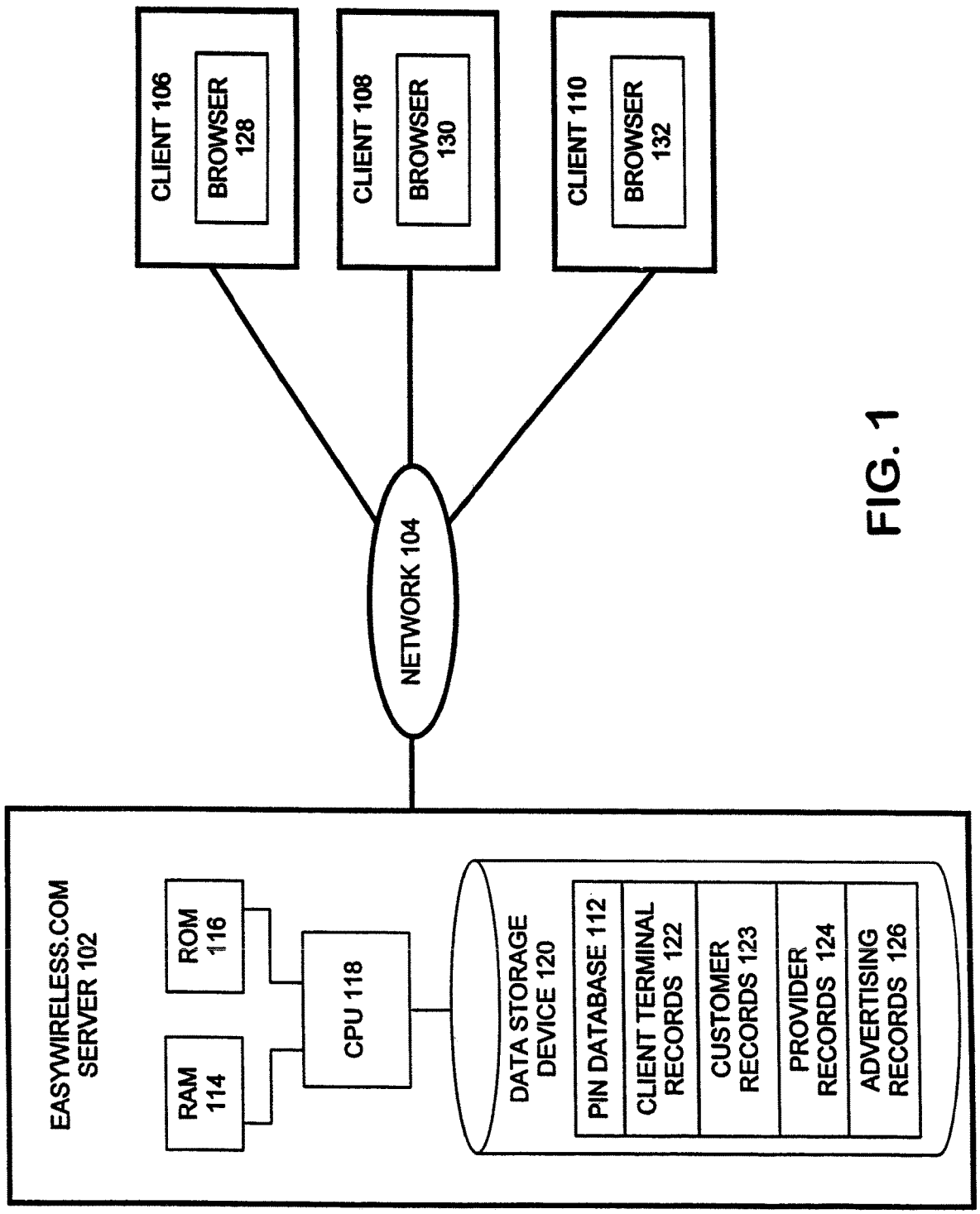
FIG. 1 depicts a block diagram of a system architecture suitable for implementing a method of distributing PINS.

The present invention may be best understood in light of the subject matter of co-pending U.S. application Ser. No. 10/316,603 entitled: SYSTEM AND METHOD FOR DISTRIBUTING PERSONAL IDENTIFICATION NUMBERS OVER A COMPUTER NETWORK, which is described herein with reference to FIGS. 1-19 and incorporated by reference. As one of ordinary skill in the art will recognize, many of the aspects of the systems and methods described with reference to FIGS. 1-19 are capable of being incorporated into the embodiments of the present invention.

This co-pending application describes a system and method which allows a customer to purchase pre-paid amounts of any good or service, such as telephone service, gasoline, electricity, dry-cleaning, bus service, subway service, magazines, newspapers, or bundled goods and services. After the customer purchases a pre-paid amount of a good or service, the customer receives a personal identification number (PIN), which is downloaded in real-time over a network such as the Internet. The PIN is provided over the network "on-demand," meaning that the PIN is downloaded over the network immediately or very soon after receiving a request and payment from the customer. The PIN is downloaded over a network in response to the customer's request, not delivered to the customer hours or days after the request. The PIN is not stored locally at the client terminal used by the customer, but is downloaded over the Internet, thus eliminating any inventory tasks or costs associated with maintaining a filled inventory for the dealer. After the customer receives the PIN, the customer can then use this PIN at any convenient time to access the desired good or service.

The above-identified co-pending application thus provides "virtual inventory" of pre-paid cards because it removes all the burdens of inventorying pre-paid cards from the dealer. Additionally, it provides "virtual distribution" of telephone cards, because the service providers no longer have to manufacture pre-paid cards and distribute them to the dealers. Because the PINS are delivered on-demand, there is a real-time distribution and accounting. Additionally, there is an elimination of the inventory shrinkage problem created by the loss, and theft of pre-paid cards.

Moreover, the above-identified co-pending application describes a system and method for providing a personal identification number (PIN) to a client terminal over a computer network. The described system and method eliminates all costs associated with filled inventory for dealers selling PINs. For example, a server receives a request for a PIN over a network, the request originating from a user at a client terminal. The request is associated with a requested monetary unit and a requested provider. The server retrieves from a database a PIN associated with the requested monetary unit and requested provider. The server transmits the retrieved PIN to the client terminal over the network, wherein the PIN is transmitted to the client terminal on-demand in response to the customer's request. No inventory of PINs is stored at the client terminal. All transmissions between the client terminal and the server are by secure transmission to prevent an eavesdropper from stealing the PIN(s).

The PIN can be used for accessing pre-paid telephone service. Alternatively, the PIN can be used for accessing other pre-paid goods and services such as gasoline, magazines, subway service, etc.

The server can transmit to the client terminal a plurality of products or services available. The server then receives from a user at the client terminal a selection of one of the available products or services. The server transmits to the client terminal a plurality of provider names for the requested product or service. The server receives from a customer at the client terminal a selection of one of the available provider names. The server transmits to the client terminal a plurality of monetary denominations available for the requested provider. The server receives from the client terminal a selection of one of the available monetary denominations. The server transits to the client terminal a plurality of regions available for the requested provider. The server receives from the client terminal a selection of the one of the available regions. The server can receive a request from the client terminal to view rate information. The server then transmits rate information to the client terminal.

The user is then prompted at the client terminal to enter payment for the requested PIN. The user can enter payment a) inserting cash into a receptacle at the client terminal, or b) entering credit card or debit card or smart card information or swiping a card through a receptacle, or c) paying cash to an operator associated with the client terminal. If the user pays a dealer, the dealer remits a portion of the payment to an account associated with the server by a) transferring funds from a dealer's account into the account associated with the server by an electronic funds transfer, or b) charging a portion of the payment to a dealer's credit account, or c) charging a portion of the payment to a dealer's credit card.

After the user pays for one or more PINs, the client terminal prints a receipt for the customer, the receipt including the requested PIN number and instructions for using the PIN. Additionally, a purchase ordering method is described in the above-identified pending application whereby a dealer can buy PINs in bulk and receive a wholesale discount. The dealer can place multiple individual purchase orders at once, each individual purchase order associated with a requested provider, a requested monetary denomination, and a requested number of PINs.

The system of the above-identified co-pending application allows a customer to purchase pre-paid amounts of any good or service, such as telephone service, gasoline, electricity, dry-cleaning, bus service, subway service, magazines, newspapers, or bundled goods and services. After the customer purchases a pre-paid amount of a good or service, the customer receives a personal identification number (PIN), which is downloaded in real-time over a network such as the Internet. The PIN is provided over the network "on-demand," meaning that the PIN is downloaded over the network immediately or very soon after receiving a request and payment from the customer. The PIN is downloaded over a network in response to the customer's request, not delivered to the customer hours or days after the request. The PIN is not stored locally at the client terminal used by the customer, but is downloaded over the Internet, thus eliminating any inventory tasks or costs associated with maintaining a filled inventory for the dealer. After the customer receives the PIN, the customer can then use this PIN at any convenient time to access the desired good or service.

The system of the above-identified co-pending application thus provides "virtual inventory" of pre-paid cards because it removes all the burdens of inventorying pre-paid cards from the dealer. Additionally, it provides "virtual distribution" of telephone cards, because the service providers no longer have to manufacture pre-paid cards and distribute them to the dealers. Additionally, there is an elimination of the inventory shrinkage problem created by the loss and theft of pre-paid cards.

FIG. 1 depicts a block diagram of a system for distributing PIN numbers. Easywireless.com server 102 is coupled to network 104. Server 102 can be any large computer or network device. The name "Easywireless.com" used herein in conjunction with server 102 is used by way of example only, and is not intended to in any way limit the range of servers that can be used. For purposes of example only, "Easywireless.com" server 102 refers to a server associated with the company Easywireless, Inc.

Network 104 can be any network connecting computers such as the Internet. Client terminals 106, 108, and 110 are running browser programs 128, 130 and 132, respectively. Browsers 128, 130, and 132 are any program that allows client terminals 106, 108, and 110 to access Easywireless.com server 102 over network 104.

Easywireless.com server 102 contains RAM 114, ROM 116, CPU 118, and data storage device 120. CPU 188 runs the software, which is operating the method depicted in FIG. 2. Data storage device 120 contains a personal identification number (PIN) database 112. PIN database 112 stores PINs, which are available for purchase by customers. The PIN provides access to a pre-paid amount of a good or a service. PIN database 112 is described in more detail with respect to FIG. 3.

Data storage device 120 also includes client terminal records 122. Client terminal records store information concerning where client terminals are located. Client terminal records 122 can store any information specific to specific client terminals, such as previous purchase history, payment and account information, and terminal preferences.

Data storage device also includes customer records 123. Customer records 123 provide information unique to individual customers. For example, as will be discussed later with respect to FIG. 2C, customers can access Easywireless.com server 102 through a home personal computer. Customers can identify themselves and provide identifying information. Easywireless.com 102 can use this information to provide better service to the customer, to target advertising to the customer, or to store payment or credit accounts. When a customer accesses Easywireless.com server 102 from a client terminal in a retail store, in most instances the customer will prefer to remain anonymous. In this case, Easywireless.com server 102 will not store any customer information in customer records 123.

Data storage device 120 also contains provider records 124. These records contain information pertinent to providers who are providing PINs for PIN database 112. For example, these records can contain addresses, billing information, and telephone numbers. Data storage device 120 also contains advertising records 126. Advertising records 126 contain information about advertising banners and links that can be provided to client terminals 106, 108 and 110 as an additional source of revenue.

Because the PINs are valuable and could be subject to theft and copying by electronic piracy, communications network 104 between Easywireless.com server 102 and client terminals 106, 108 and 110 is protected by the use of encrypted communications and well-known security techniques. Client. terminals 106, 108, and 110 can provide security certificates to Easywireless.com server 102 to authenticate their transmissions.

FIGS. 2A-2C depict three alternative physical embodiments of client terminals 106, 108 and 110. FIG. 2A depicts a physical embodiment, which is used in a typical checkout counter of a store, such as a convenience store. Client terminal 200 of this embodiment includes a touch-screen 204. Various options appear on touch-screen 204, which a customer may activate by touching an appropriate location on touch-screen 204. A customer makes payment by paying cash to a store clerk operating cash register 202. Alternatively, a customer can pay with a credit card by swiping a credit card through credit card slot 208. Buttons 206 can be used by the customer in addition to touch-screen 204 to make additional selections, such as choosing a particular type of credit card.

FIG. 2B depicts an alternative physical embodiment for the client terminal, automated kiosk 210. Automated kiosk 210 includes a touch-screen 212. Credit card receptor 214 allows a consumer to submit payment by inserting a credit card. Alternatively, the customer can insert bills into bill receptor 218, or coins into coin receptor 220. The customer can optionally make selections by entering data on keypad 216 in addition to making selections with touch-screen 212.

FIG. 2C depicts another alternative physical embodiment for a client terminal. Personal computer 222 can be used in the convenience of a customer's home or office to access the Easywireless.com web server, by entering an appropriate URL in the customer's browser (for example, http://www.Easywireless.com). The customer can then purchase PIN (s) from Easywireless.com from the customer's personal computer 222.

FIG. 3 depicts a simplified example of records within PIN database 112. Another, more detailed example of records within PIN database 112 is described later with respect to FIGS. 19A and 19B. PIN database 112 stores PINs, which are available for purchase by customers. PIN database 112 contains records 312. Good/Service field 301 specifies the name of a good or service, which is available for pre-paid purchase. For example, records 312a-312p shown in FIG. 3 contain PINs, which provide access to pre-paid cellular service. Records 312q-r shown in FIG. 3 contain PINs, which provide access to pre-paid gasoline. Other goods and services can be also be included in PIN database 112 such as electricity, cable service, satellite TV, etc.

Provider field 302 contains the name of the particular good or service provider associated with the record. For example, FIG. 3 shows records for AT&T, AIRTOUCH, SPRINT, and MOBIL. Value field 304 specifies the dollar value associated with each record. For example, record 312h provides a customer with $50 of pre-paid cellular service from AIRTOUCH. PIN field 306 specifies the PIN, which is provided to the customer and allows access to the good or service. Rate field 308 specifies a rate associated for each record. For example, for cellular telephone service rate field 308 specifies the calling rate associated with the record. In the example PIN database 112 shown in FIG. 3, rate field 308 is not used for gasoline records 312q and 312r, since the gasoline rate is determined at the pump.

Expiration field 310 contains an expiration date beyond which the PIN for that record will no longer be valid. Other fields may also be added. Some fields may be particular to a specific good or service. For example, if gasoline is being sold then there may be a field for "Octane" which specifies the octane level of gasoline being purchased.

Figure 4A:
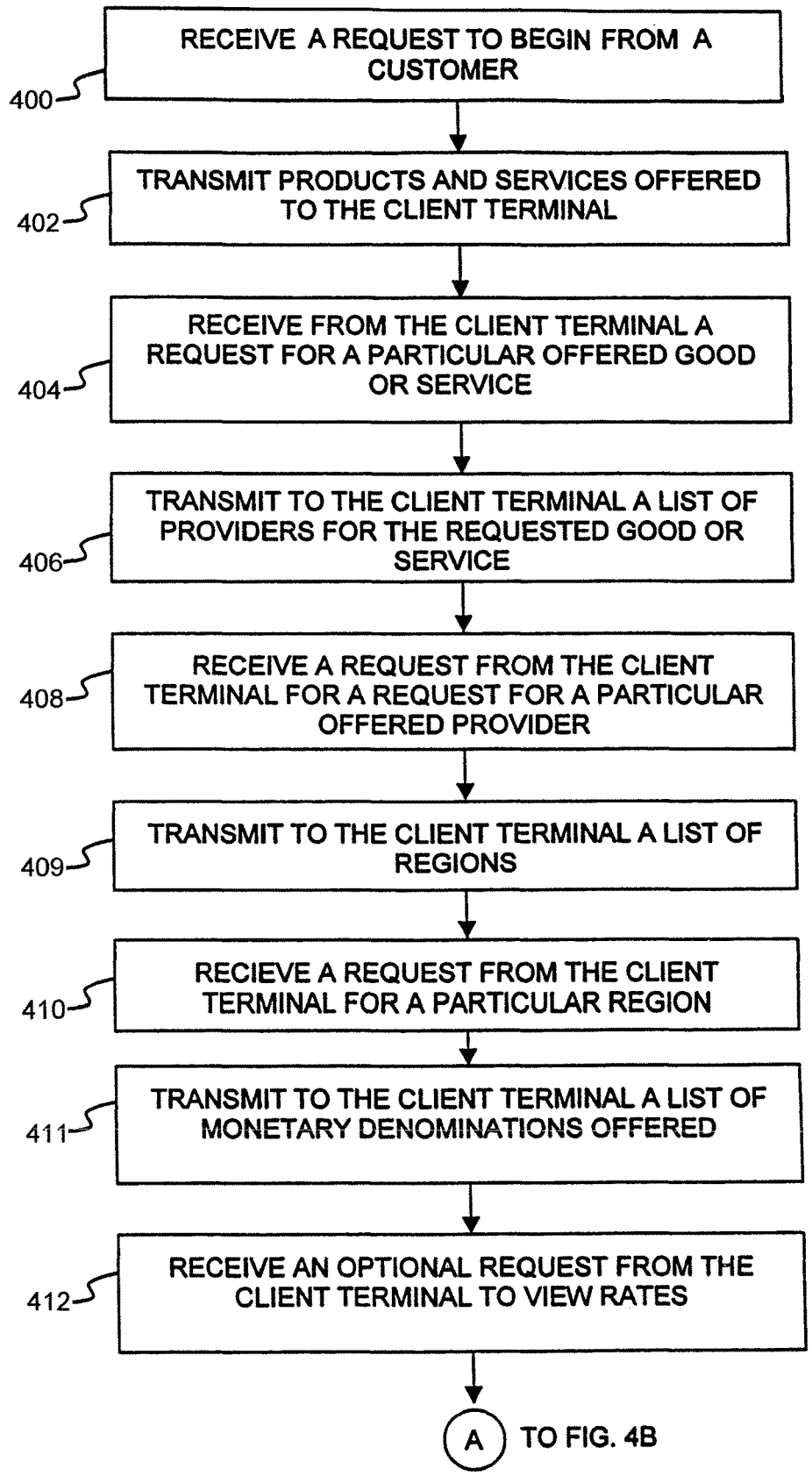
FIGS. 4A and 4B depict a flowchart illustrating a method of purchasing one or more PINs.
Figure 4B:
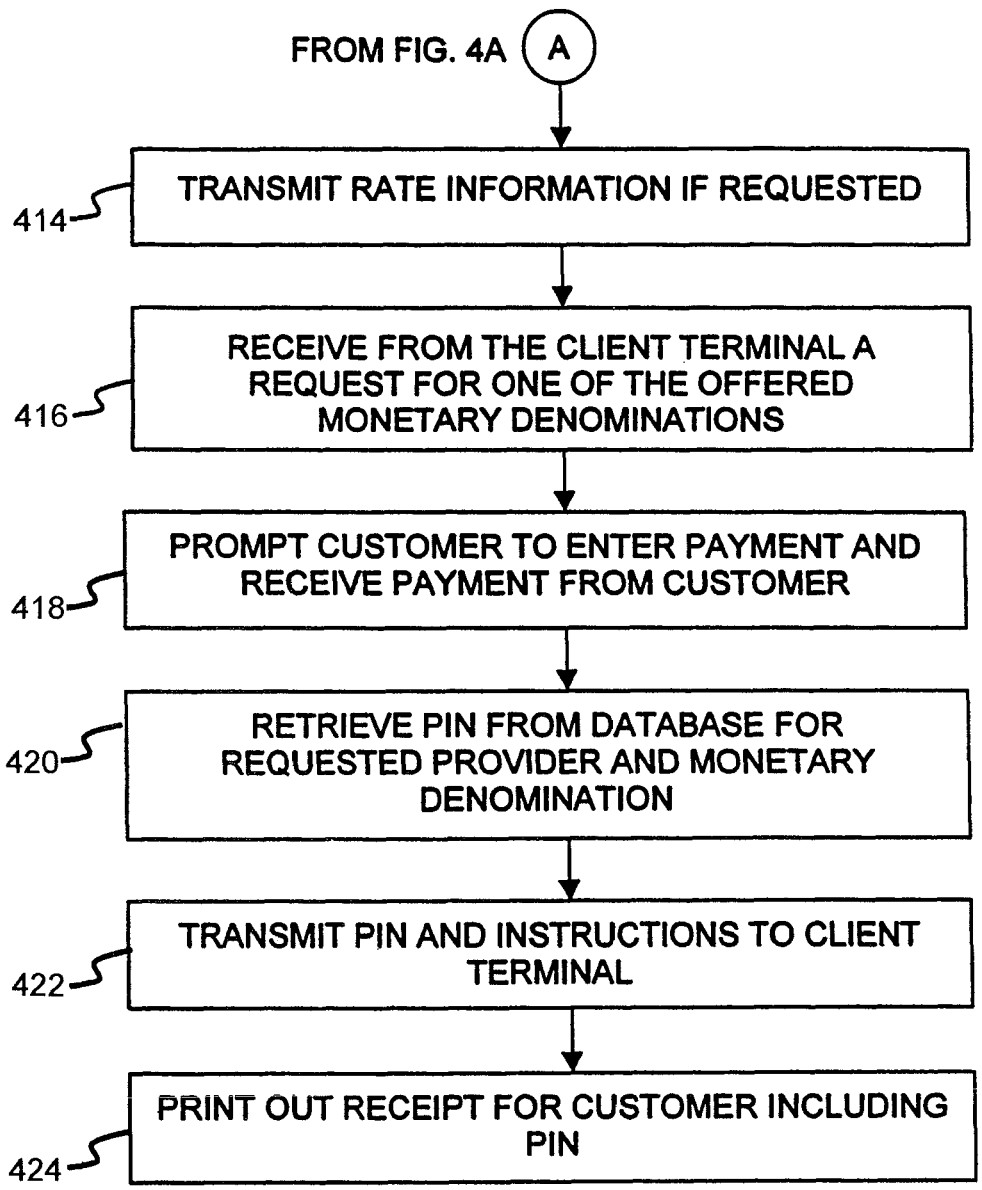

FIG. 4A depicts a flowchart illustrating a method of operating Easywireless.com server 102. Initially, in step 400, the Easywireless.com server receives a request from a customer to begin. For example, a customer entering a retail store approaches client terminal 200 shown in FIG. 2A. A "BEGIN" Window displayed on touch-screen 204 reads "Touch here to begin." The customer approaches the touch-screen 204 and touches the BEGIN Window. This sends a request to begin to Easywireless.com server 102. In step 402, in response to receiving a request to begin, Easywireless.com server 102 transmits to the client terminal a list of products and services offered. For example, Easywireless.com server 102 could transmit: 1) cellular telephone service, 2) long-distance telephone service, 3) electricity, 4) gasoline, and so on. All of these goods and services would be available to the customer to purchase on a pre-paid basis. The list of products and services transmitted to the client terminal appears, for example, on touch-screen 204 shown in FIG. 2A. The customer then touches a desired good or service on touch-screen 204. This sends a request for the chosen good or service back to Easywireless.com server 102. For example, the customer selects "cellular telephone service."

In step 404, Easywireless.com server 102 receives the request from the client terminal for the chosen good or service. In this example, Easywireless.com server 102 receives a request for cellular telephone service. In step 406, the Easywireless.com server 102 transmits to the client terminal a list of providers for the requested good or service. For example, if the customer has requested cellular telephone service, Easywireless.com server 102 transmits a list of: AT&T, AIR TOUCH, and SPRINT. The customer then selects one of these offered providers by touching an option on touch-screen 204. This would send a request back to Easywireless.com server 102 for a particular requested provider. For example, the customer could select "AIR-TOUCH."

In step 408, Easywireless.com server 102 receives the customer's request for the particular provider requested.

In step 409, Easywireless.com server 102 transmits to the client terminal a list of regions for the requested good or service. For example, if the customer requested "AIR-TOUCH" in step 408, then Easywireless.com server 102 would transmit a list of regions such as "AIRTOUCH NORTHEASTERN U.S.," or "AIRTOUCH NEW YORK CITY METROPOLITAN REGION," OR "AIRTOUCH PACIFIC REGION," etc. In step 410, Easywireless.com server 102 receives the customer's request for a particular region.

In step 411, Easywireless.com server transmits a list of pre-paid monetary denominations offered. For example, if a request for "AIRTOUCH" is received, Easywireless.com might offer pre-paid cellular service for AIRTOUCH in the following monetary denominations: $10, $20, $50, and $100. Thus, a customer could choose to buy a $50 "virtual" phone card, which would provide him or her with $50 of pre-paid cellular service.

The Easywireless.com server 102 can determine what monetary denominations are available by one of the following methods. As a first method, Easywireless.com server 102 checks provider records 124, and looks up the record corresponding to the chosen provider (for example, AIR-TOUCH). Easywireless.com 102 then checks a field of the provider record to determine what monetary values are offered. As a second method, Easywireless.com server 102 checks PIN database 112, and determines what types of monetary denominations are available. For example, Easywireless.com server 102 can determine that it is presently out of stock of $50 AIRTOUCH PINs, but Easywireless.com server 102 has available $10 PINs, $20 PINs, and $100 PINs.

As an example, the customer could choose to purchase a $50 PIN from AIRTOUCH. The customer would receive a PIN, which would allow him or her to purchase $50 of cellular telephone service. As an alternative to transmitting a list of offered monetary denominations, in step 410, the customer could alternatively be allowed to simply type in at a keypad a desired amount of service that he or she desires. For example, a message would appear on touch-screen, 204 stating "TYPE IN AN AMOUNT OF PRE-PAID SERVICE YOU WISH TO PURCHASE." The customer could then type in, for example, $50. Easywireless.com server 102 could then check PIN database 112 to see if it had any $50 PIN denominations available. If there was no $50 PINs available, Easywireless.com server 102 could, for example, transmit a message stating, "THERE ARE NO $50 PINS AVAILABLE. WOULD YOU LIKE TO PURCHASE A $40 PIN OR A $75 PIN?" Alternatively, Easywireless.com server 102 could transmit a message stating "THERE ARE NO $50 PINS AVAILABLE FOR AIRTOUCH. HOWEVER, SPRINT AND MCI OFFER $50 PINS FOR CELLULAR TELEPHONE SERVICE. WOULD YOU LIKE TO PURCHASE FROM ONE OF THESE PROVIDERS?"

The customer can also be given an option to "View Rates." If the customer chooses this option, then a request to view rates is sent to the Easywireless.com server 102. In step 412, the request is received by Easywireless.com server 102. In step 414, Easywireless.com server 102 transmits rate information to the client terminal. For example, the rate information could specify that a $100 "virtual" pre-paid phone card purchased from AIRTOUCH has a cellular calling rate of $0.35 per minute, and the PIN expires in 6 months. A $5& virtual pre-paid phone card purchased from AIRTOUCH has a cellular calling rate of $0.40 per minute, and the PIN expires in 8 months. Providers may choose to offer lower rates for larger pre-paid purchases as a high volume discount. Further information can also be requested and provided to the customer depending on the particular product or service purchased. For example, if the customer is purchasing gasoline, the customer could request current price per gallons at various gas station locations for various octane levels.

In step 416, Easywireless.com server 102 receives from the client terminal a request for one of the available monetary denominations. For example, the customer could select an option to purchase a $50 PIN from AIRTOUCH by touching the appropriate option on touch-screen 204.

In step 418, Easywireless.com prompts the customer at the client terminal to make payment for the requested PIN. Payment can be made by the customer in a number of ways. In the embodiment shown in FIG. 2A, the customer can pay the dealer by cash, credit card, debit card, smart card or any similar method (the customer pays a cashier behind cash register 202). Once the customer pays the dealer, then the dealer must transfer a portion of the payment to Easywireless.com Payment can be apportioned and transferred between the dealer and Easywireless.com by a number of methods. Some example methods:

First method "ACH WALLET": The dealer has a special account set up with Easywireless.com. The dealer stores money in the account before the PIN is purchased. Immediately before a customer purchases one or more PINs, the dealer pays a portion of the payment to Easywireless.com by transferring money from the dealer's account to Easywireless.com by ACH (automated clearing house) electronic funds transfer. This method of payment is referred to as "ACH wallet."

Second method "CREDIT ACCOUNT": The dealer has a credit account with Easywireless.com. The dealer is allowed a predetermined amount of credit based on the creditworthiness of the dealer. When a customer pays for one or more PINs, a portion of the payment is charged to the dealer's credit account. The dealer is then billed later for the amount charged.

Third method: The dealer simply provides credit card information to Easywireless.com. When customer purchases one or more PINs, a portion of the payment is charged to the dealer's credit card.

Fourth method: The customer's credit card information (or debit card, or smart card) is sent directly to Easywireless.com. Easywireless.com then charges the customer's credit card and sends a portion of the payment back to the dealer.

As will be understood by one skilled in the art, the above methods are by example only and there are a multitude of ways that payment can be arranged between the dealer and Easywireless.com. All of these methods do have one thing in common, however. The PIN is sent by Easywireless.com right after a payment is made (either by cash or credit). This makes the delivery of the PIN "on demand" and eliminates costs associated with filled inventory. Because the PIN is sent right after payment is made, the dealer has no costs associated with filled inventory. For example, the dealer does not have to contact Easywireless.com at the beginning of each month and order $10,000 worth of cards. The dealer does not have to predict which cards will be popular, and how many cards to order of each type. Payment for the PIN is charged at the time of each transaction, and thus the dealer has no filled inventory costs.

In the automated kiosk embodiment shown in FIG. 2B, the customer can enter payment by swiping a credit card through credit card receptor 214, or inserting cash into bill receptacle 218 or coin receptacle 220. Using the personal computer of FIG. 2C, the customer can enter payment by typing in his or her credit card information.

After payment has been received and verified in step 418, then in step 420 Easywireless.com server retrieves a PIN from the database having the appropriate characteristics selected by the customer. For example, if the customer chose to purchase a $50 virtual pre-paid phone card for pre-paid cellular telephone service from AIRTOUCH, then Easywireless.com server 102 could retrieve record 312f shown in FIG. 3. In step 422, Easywireless.com web server transmits PIN 0948574995 (this PIN is shown in PIN field 306 of exemplary record 312f in FIG. 3) to the customer at the client terminal. Once a PIN has been retrieved from PIN database 112 and transmitted to the customer, the PIN record is marked as sold and unavailable from PIN database 112 so that it will not be sent to another customer. Alternatively, the PIN record can be marked as used, so that it will not be retrieved for another customer.

Easywireless.com web server 102 also transmits any instructions necessary to use the PIN. For example, Easywireless.com can transmit a telephone access number, which the customer needs to dial before placing a cellular telephone call and entering the PIN. The telephone access number and other instructions will be unique for each provider. These instructions can either be stored in each individual record 312 in PIN database 112, or the instructions can be stored in provider records 124.

The customer could also request to receive multiple PINs. For example, the customer could purchase 3 $50 PINs for AIRTOUCH cellular telephone service. After the customer enters $150 in payment, Easywireless.com server 102 transmits 3 $50 PINs to the customer at the client terminal.

At step 424, the client terminal prints out a receipt for the customer. The receipt includes the requested PIN(s) purchased by the customer, and any instructions for using the PIN such as a telephone access number. The receipt can also contain advertisements. Advertisers pay Easywireless.com for the opportunity to have their ads displayed on receipts. The receipt is a printed piece of paper. Alternatively, the receipt could be in the form of a plastic card. Easywireless.com server 102 then returns back to the first step 400, waiting for the next customer to request to "BEGIN".

Figure 5:
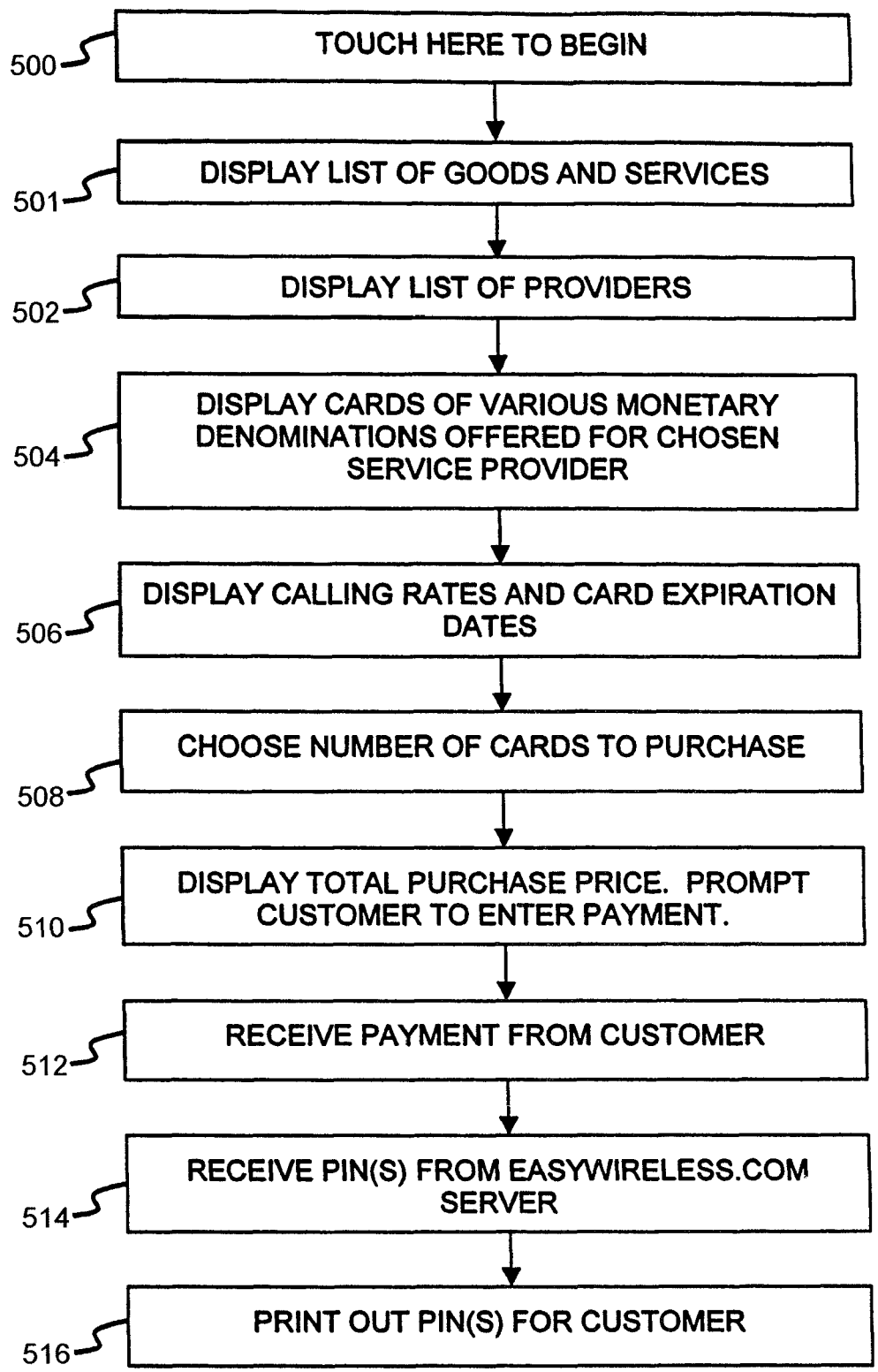
FIG. 5 depicts a flowchart illustrating a method of operating a client terminal.

FIG. 5 depicts a flowchart illustrating a method of operation of client terminals 106, 108, 110 (shown in FIG. 1), 200, 210, and 222 (shown in FIG. 2). FIGS. 6-10 show exemplary displays to be shown on the screen of the client terminal. The method of operation will now be described with reference to the flowchart of FIG. 5 and the screens shown in FIGS. 6-10.

In step 500, a window appears which states "TOUCH HERE TO BEGIN." The customer can begin by touching the touch-screen 204 or 212 in the appropriate location. If the customer has accessed the Easywireless.com web server 102 by using personal computer 222, the customer can begin by entering an appropriate URL into the browser (such as http://www.easywireless.com). This would bring the customer to the Easywireless.com web page running on Easywireless.com server 102. The customer could click on a link labeled "BEGIN" to begin the purchase process.

Figure 6:
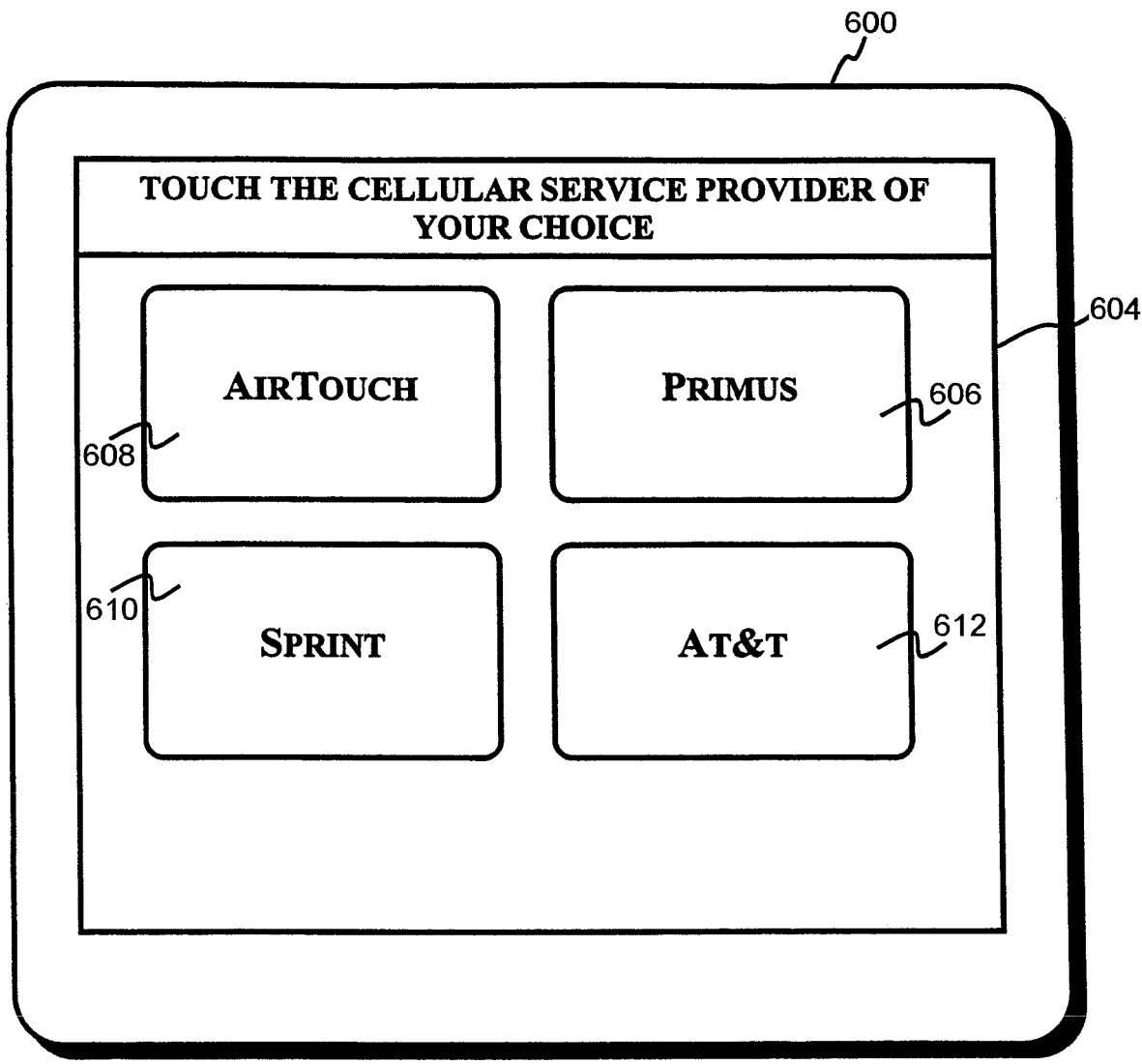
FIG. 6 depicts an example of a display allowing the user to choose a provider.

In step 501, the client terminal displays list of offered goods and services, such as cellular telephone service, gasoline, electricity, dry-cleaning, etc. The customer can then choose one of these goods or services to purchase. Assume, for this example, that the customer has selects "cellular telephone service". In step 502, the customer is provided with a list of providers for the chosen good or service and asked to choose a provider. FIG. 6 shows an exemplary screen corresponding to step 502 (assuming that the customer has selected "cellular telephone service"). Touch-screen 600 displays browser window 604. Four service provider options are shown: AIR TOUCH option 608, PRIMUS option 606, SPRINT option 610 and AT&T option 612. For the purposes of this example, assume that a customer touches AIRTOUCH option 608.

Figure 7:
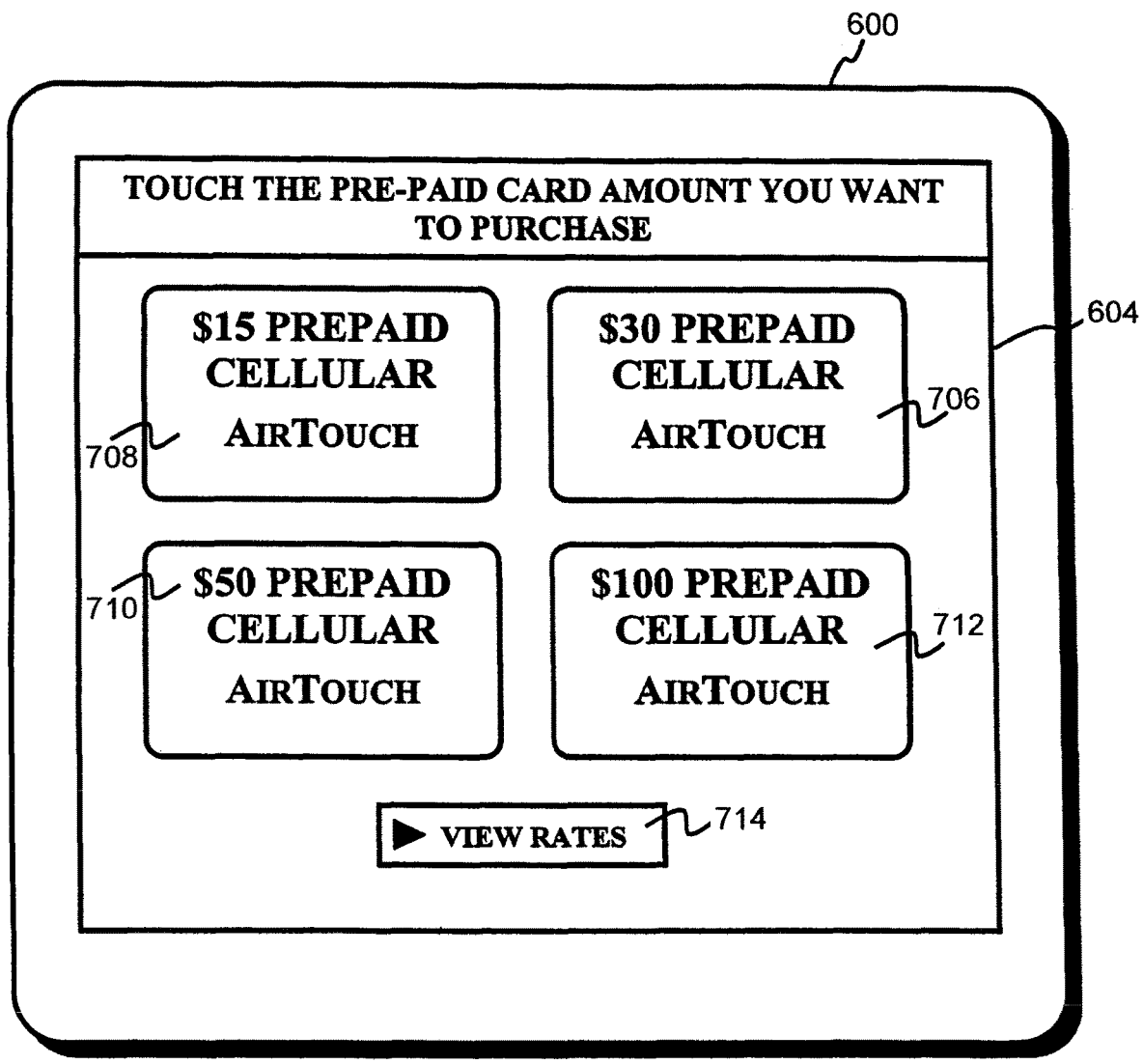
FIG. 7 depicts an example of a display allowing the user to choose a monetary denomination.

In step 504, the display screen displays virtual cards of various monetary options, which are offered, for the chosen good or service provider (which in this example is AIRTOUCH). FIG. 7 shows an exemplary display screen corresponding to step 504. Four possible monetary denominations may be selected. The customer can choose the $15 option 708, $30 option 706, $50 option 710, or $100 option 712.

Figure 8:
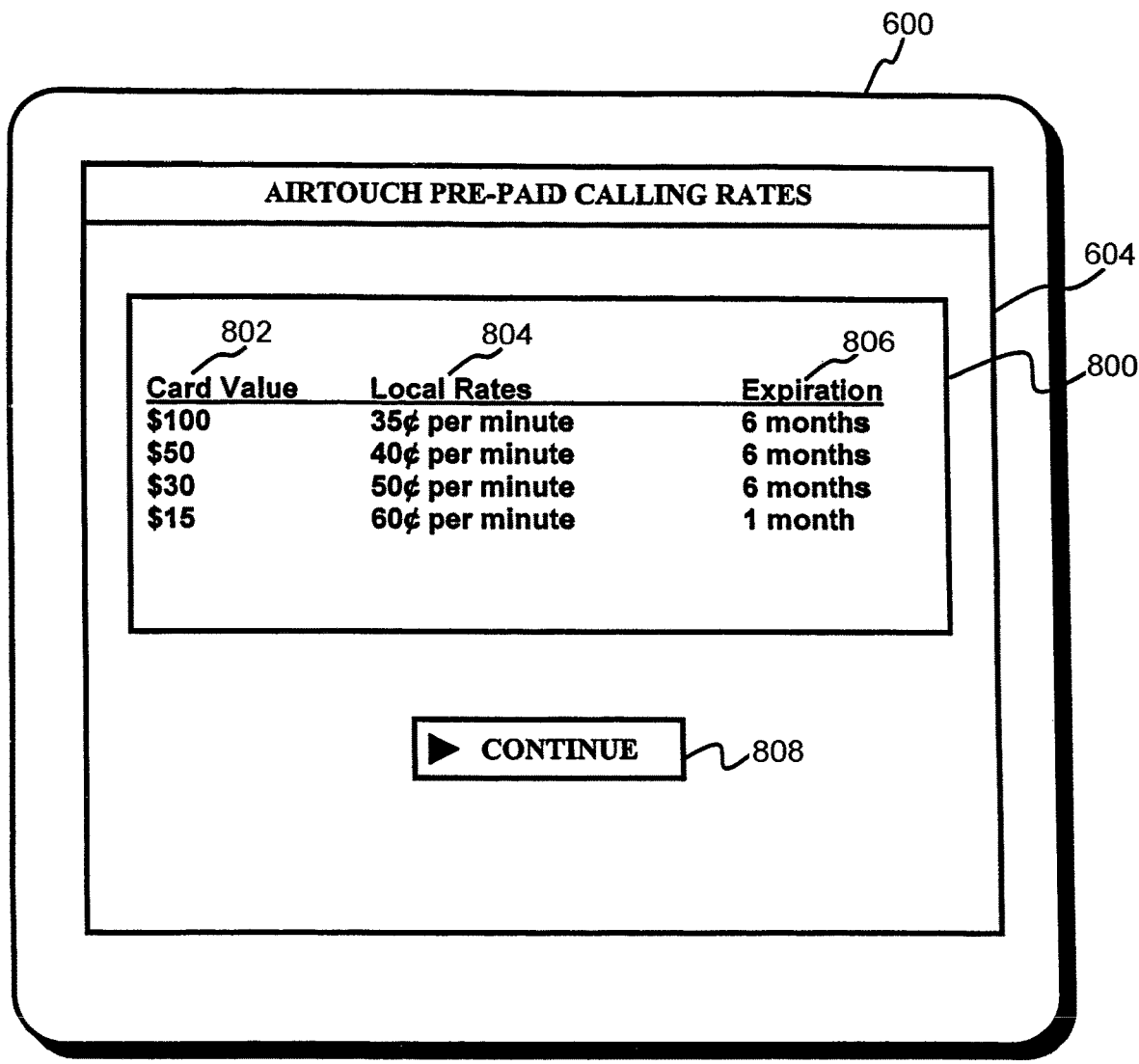
FIG. 8 depicts an example of a display showing the user rate and expiration information.
Figure 9:
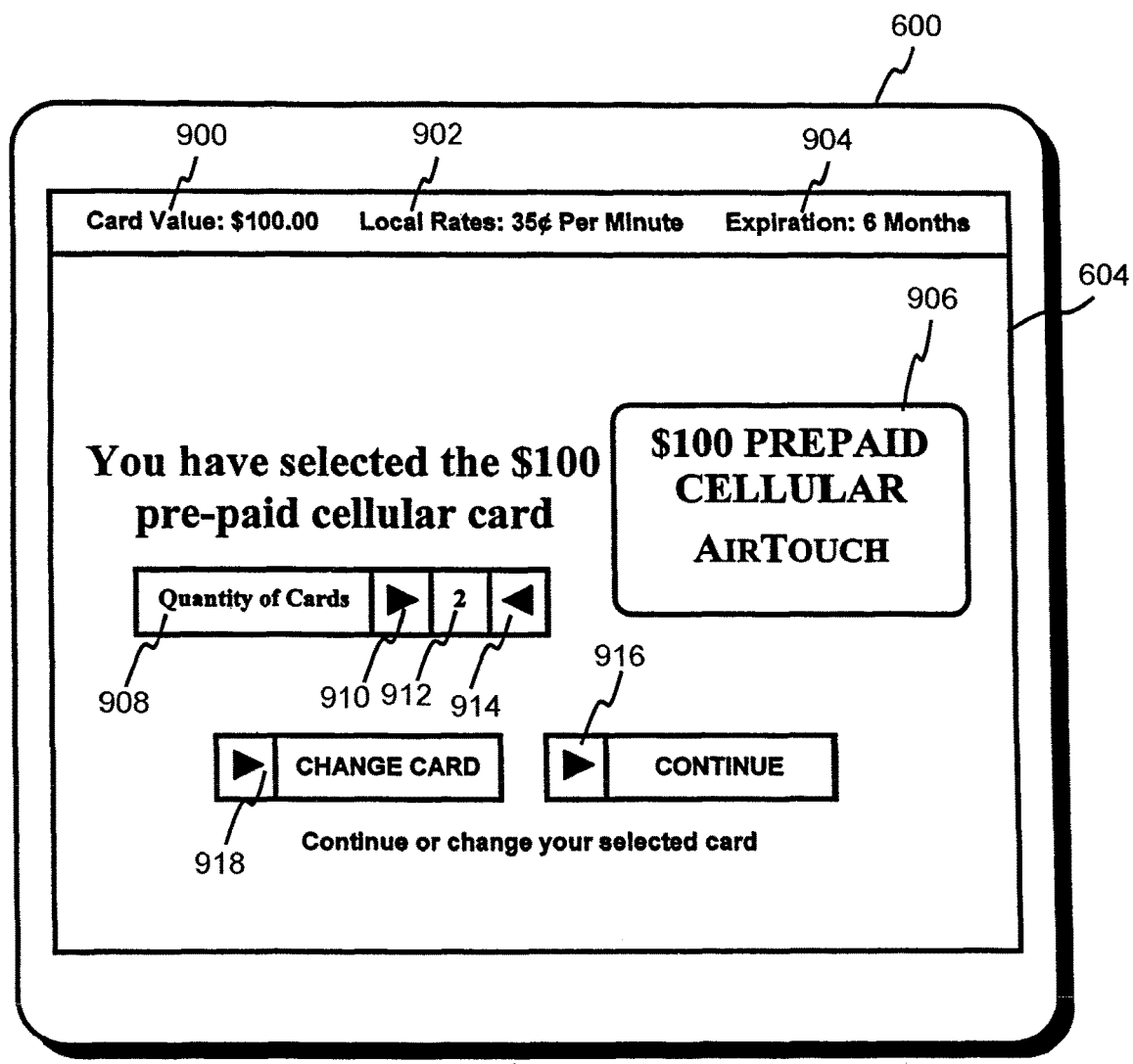
FIG. 9 depicts an example of a display allowing the user to choose a quantity of cards.

In step 506, the display screen displays rate information, if desired by the customer. The customer is given the option of viewing rates by touching the VIEW RATES option 714 shown in FIG. 7. If the customer decides to touch VIEW RATES option 714, then in step 506, the screen displays calling rates, card expiration dates, or any other information applicable to the chosen good or service, or specific to the particular good or service provider chosen. For example, if the customer who has chosen to purchase AIRTOUCH cellular service, touches the VIEW RATES option 714, then FIG. 8 shows an exemplary screen. Information window 800 provides a number of information fields. Card value field 802 displays the various virtual card monetary values offered. Local rates field 804 displays the calling rate per minute for each card value. Expiration field 806 displays the expiration date beyond which the PIN is no longer usable. As shown in FIG. 8, AIRTOUCH offers a discount for higher value card purchases. In other words, the calling rate goes down for higher card value purchases. By touching the continue field 808, the customer can return to the screen shown in FIG. 7.

In FIG. 7, the customer selects a particular monetary denomination offered by touching the screen in an appropriate location. In this example, assume that the customer has chosen the $100 virtual card option 712. This brings up the display shown in FIG. 9. In step 508, the customer is given the choice of how many cards he or she wishes to purchase. The quantity of cards window 908 in FIG. 9 displays the number of virtual cards to be purchased. The customer can touch arrow 910 to increment the number of virtual cards to be purchased. The number of cards to be purchased is shown in box 912. The customer can touch arrow 914 to decrement the number of virtual cards to be purchased. Field 900 and virtual card 906 display the monetary value of the virtual card that was chosen by the customer. Local rates field 902 displays the calling rate for the chosen virtual card. Expiration field 904 displays when the virtual card will expire.

If the customer changes his or her mind, and wishes to purchase a card with a different value, the customer can return to the screen shown in FIG. 7 by touching the CHANGE CARD field 918. Otherwise, the customer can proceed by touching the CONTINUE field 916. This brings up the display shown in FIG. 10A, corresponding to step 510. Field 1000 displays the total purchase price. Since the customer has requested to purchase two pre-paid virtual $100 cards from AIR TOUCH, the total purchase price is $200. Field 1002 instructs the customer to insert payment. This message could alternatively tell the customer to enter credit card information, swipe a credit card, a debit card, a smart card, or pay cash to a cashier depending on the particular client terminal being used and/or a chosen method of payment.

Figure 10A:
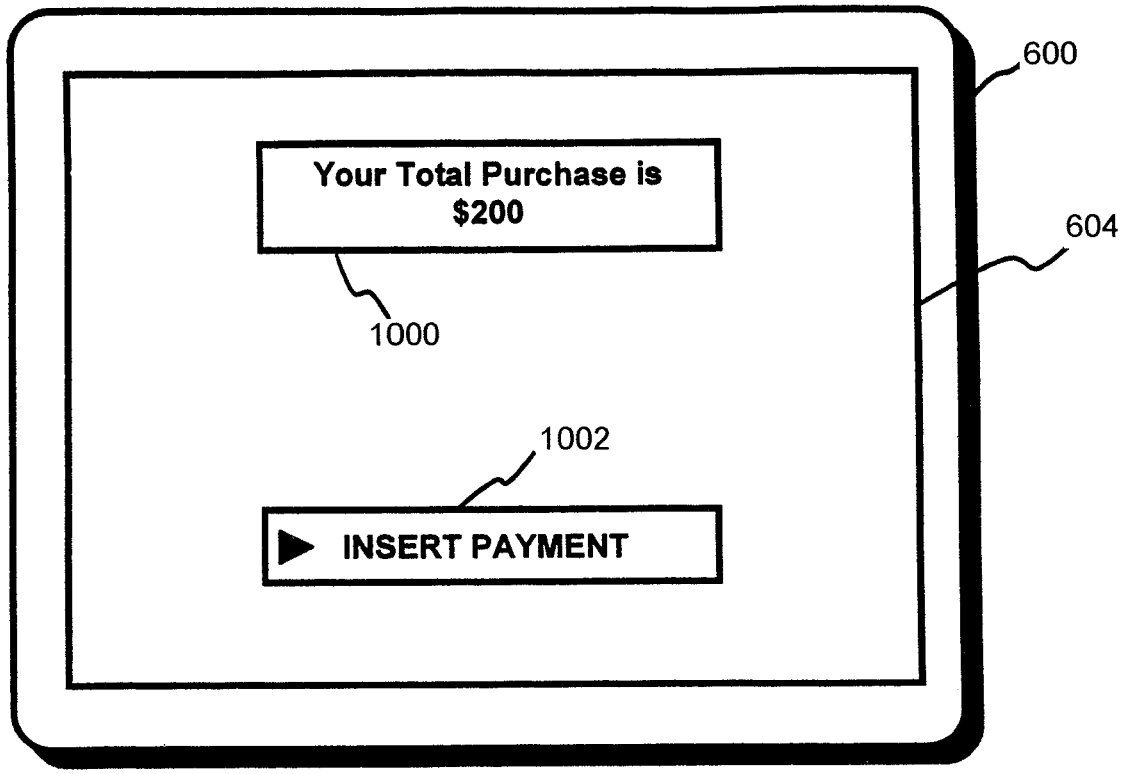
FIG. 10A depicts an example of a display screen requesting payment from the user.
Figure 10B:
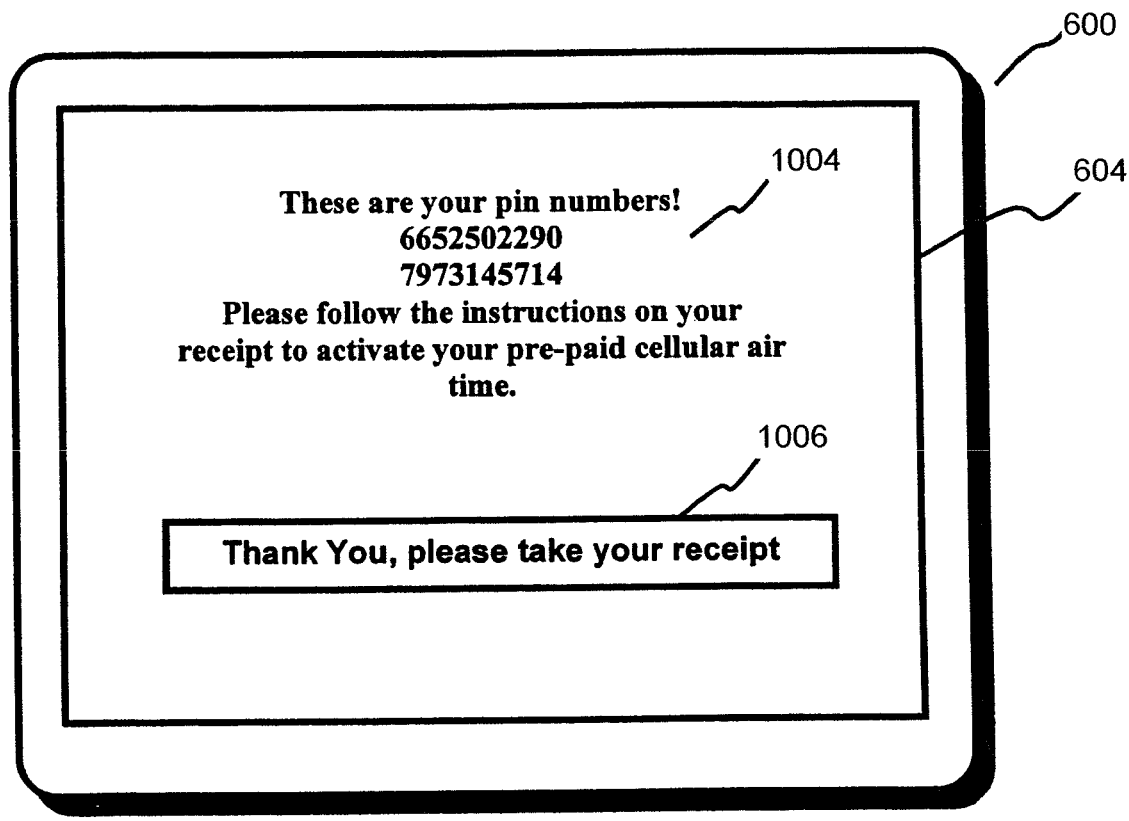
FIG. 10B depicts an example of a display screen showing the user his or her purchased PIN(s)

In step 512, payment is received from the customer. After payment has been received and verified, Easywireless.com server 102 retrieves the requested PIN(s) from PIN database 112 and transmits the requested PIN(s) to the client terminal in step 514. The PIN(s) can be displayed on the screen as shown in FIG. 10b, field 1004. Message 1006 informs the customer to take a receipt. A receipt is printed out in step 516. The receipt will contain the requested PIN(s) and any instructions necessary for using the PIN such as an access number to call. If privacy is a concern, it might be preferable not to display the PINs on the screen, but instead to only print the PINs on the receipt.

Figure 11:
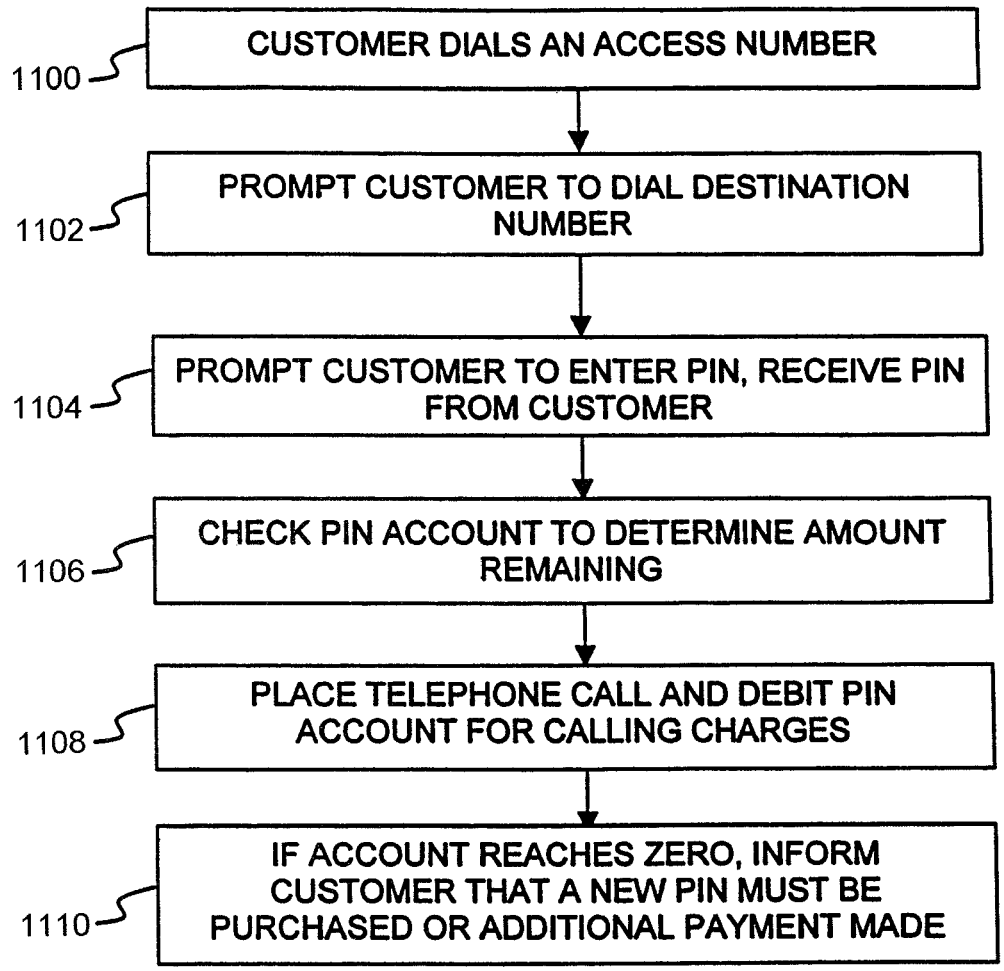
FIG. 11 depicts a flowchart illustrating a method of using a PIN to access telephone service.
Figure 12:
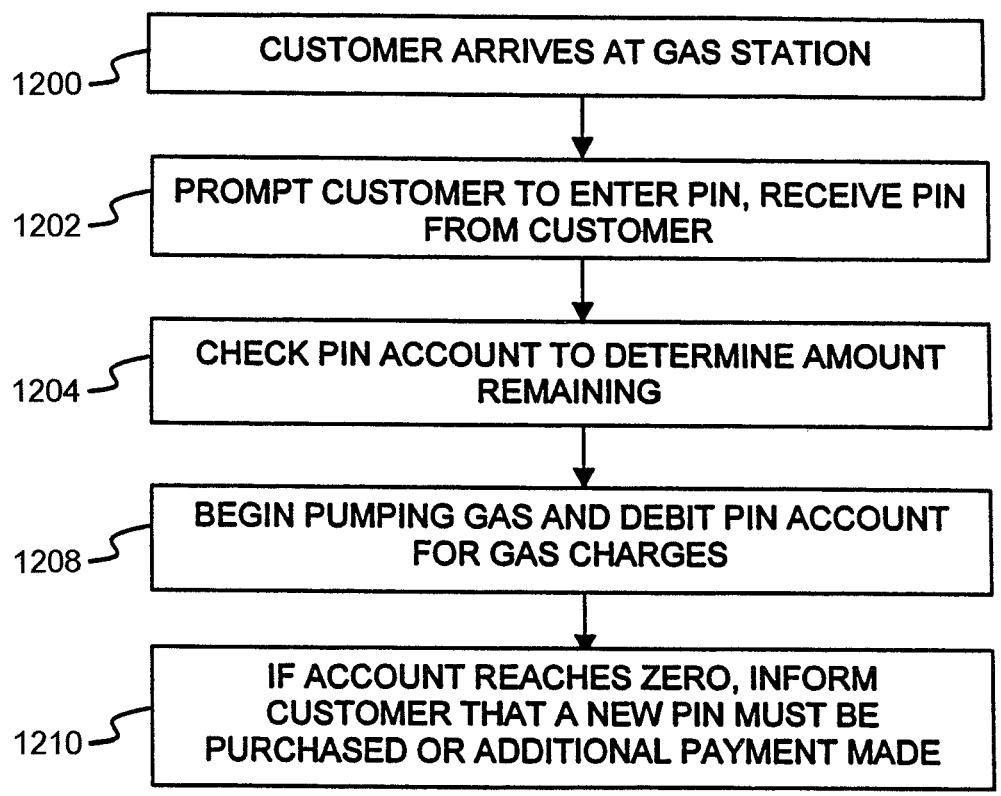
FIG. 12 depicts a flowchart illustrating a method of using a PIN at a gas station.

FIGS. 11 and 12 depict a flowchart illustrating a method of using the PIN once the customer has received the PIN from Easywireless.com server 102. FIG. 11 shows an exemplary method, which assumes that the customer has purchased pre-paid telephone service. As an example, assume that a customer has purchased $50 of pre-paid telephone service. A receipt was printed out for the customer providing a PIN and a telephone access number. In step 1100, the customer dials the access number, which was provided on the receipt. Typically, the access number is specific to the chosen service provider. For example, if the customer has previously purchased $50 of pre-paid telephone service from AIRTOUCH, the customer will be given an AIRTOUCH access number. When the customer dials the access number, the customer's call will be routed to a switch operated by AIRTOUCH. The access number is preferably a toll-free 1-800 number or a local number. In step 1102, the customer is prompted to dial the destination number that he or she wishes to call. In step 1104, the customer is prompted to enter a PIN, which was printed out, on the receipt. The customer then dials in his or her PIN. An AIRTOUCH server then checks a PIN account for the entered PIN. In step 1106, the AIRTOUCH server checks to see how much money is remaining in the account. If there is enough money left in the pre-paid account to place the desired call, then the call to the destination number is placed in step 1108. While the call is continuing, the PIN account is debited in accordance with the calling charges. In step 1110, if the account value reaches zero, the customer is informed that a new PIN must be purchased or additional payment must be made. As an option, the customer can be allowed to dial in a credit card number to continue with the call.

FIG. 12 depicts a flowchart illustrating a similar method to FIG. 11. However, FIG. 12 depicts an example where the customer has purchased pre-paid gasoline. For this example, assume that a customer has previously purchased $50 of pre-paid MOBIL gasoline. A receipt was printed out for the customer providing a PIN. In step 1200, the customer arrives at a local MOBIL gas station. The customer uses a keypad and display screen at a self-service pump. The customer pushes a button indicating that he or she wishes to pay with a pre-paid PIN account. In step 102, the customer is prompted to enter a PIN. The customer enters the PIN for which he or she pre-paid. The PIN is sent to a server operated by MOBIL. The server checks a PIN account for that PIN to determine how much money is remaining in the account. If there is money left in the pre-paid account, then the customer is told to begin pumping. The pre-paid PIN account is then debited in accordance with charges for the gasoline pumped. If the account reaches zero, the customer is informed that additional payment must be made.

Easywireless.com server 102 essentially serves as a PIN warehouse. The operators of Easywireless.com server 102 can obtain PINs from various providers in two ways. A first method of obtaining PINs from providers is as follows. PINs are purchased by Easywireless.com directly from the providers. For example, a $10 pre-paid PIN could be purchased from AIRTOUCH at a wholesale price of $8 and then stored in PIN database 112. In other words, AIRTOUCH sells the PIN to Easywireless.com for $8, and Easywireless.com resells the PIN to the customer for $10. Thus, Easywireless.com would make a $2 profit on the sale of the PIN.

A second method of obtaining and selling PINs is as follows. The PINs are received from various providers at no cost to Easywireless.com. Easywireless.com serves as a warehouse for the PINs. After a PIN is sold to a customer, the payment received from the customer is forwarded to the appropriate provider, minus a commission for Easywireless.com.

Another feature of the system is the ability to offer discounts. Easywireless.com server 102 can send advertisements and discount offers to the client terminals. Service providers can offer discounts such as "PRE-PAID CELLULAR SERVICE AT 30 CENTS PER MINUTE. 10 CENTS PER MINUTE CHEAPER THAN NORMAL RATE!" Providers will be happy to provide such discounts for pre-paid purchase because there are many advantages to selling pre-paid service. The provider does not have to worry that the customer won't pay his bills, because the calls are pre-paid. The provider does not have to keep track of billing addresses and mailing bills to the customer. The provider gets the money before the call is even made, and thus earns interest on the money. Because of these advantages of pre-paid service, it is often advantageous to providers to offer a discount for pre-paid purchases.

FIGS. 13-16 depicts a purchase-ordering feature. The purchase ordering feature is intended to be used by dealers who wish to purchase a batch of various types of PINs, for the purpose of reselling these PINs to individual customers. The purchase order feature allows a dealer to order a desired assortment of PINs from different providers of different denominations.

Figure 13:
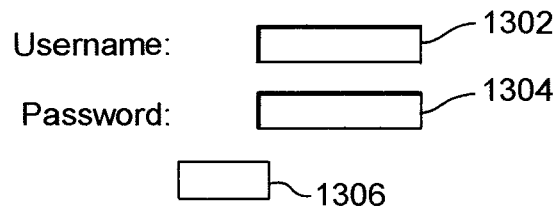
FIG. 13 depicts an example display screen for allowing a user to log-in to a purchase ordering system.

FIG. 13 depicts an example of a login screen for allowing a user to enter the purchase ordering system. To enter the purchase ordering system, the user must be a registered user. Typically, users of the purchase ordering system will be dealers who resell the PINs to other customers. The dealers can buy PINs in bulk, and thus receive a special wholesale discount. As an option, in addition to dealers, preferred customers could be allowed to use the purchase ordering system. A user enters his or her user name in username field 1302 and enters a password in password field 1304. The user then hits the Enter button 1306.

If the user's username and password is recognized as being a registered user, then the purchase order data entry screen is displayed as shown in FIG. 14. Dealer Information field 1402 displays the name, address, and any other pertinent identifying information of the dealer who has logged in to the purchase order data entry system. If other customers besides dealers are allowed to log in to the purchase order data entry system, then field 1402 can be labeled "customer information" or "user information."

Payment method field 1404 displays the payment method and details, such as credit card information, or ACH wallet, etc. Current balance field 1406 displays whether the user has an outstanding balance: i.e. either the dealer owes money to Easywireless.com or has a certain amount of credit remaining.

Table 1407 allows the dealer to many individual purchase orders. Each row of the table represents one individual purchase order. For example, the dealer can order ten $50 cards from AT&T, and 20 $100 cards from Sprint, and 15 $75 cards from Verizon Wireless, etc.

Carrier column 1408 allows the user to select a unique carrier for each purchase order of PINs. Region column 1410 allows the user to select a particular region for each separate purchase order of PINs. Card type column 1412 allows the user to select a particular card monetary denomination for each separate purchase order of PINs. Qty column 1414 allows the user to select a quantity of cards to purchase for each separate purchase order of PINs. Wholesale column 1416 displays the wholesale per-PIN price for each separate purchase order of PINs.

Totals column 1418 displays the total price paid for each purchase order. Totals column 1418 field is simply the wholesale column price 1416 multiplied by the Qty column 1414. Add/Del column 1420 allows the dealer to confirm the addition of each individual purchase order, or to change his mind and delete an entered order. Grand total field 1421 displays the sum of all the individual totals from each individual purchase order.

As an example of an individual purchase order, the first row shown in FIG. 14 indicates that the user has selected one order of Verizon Wireless PINs for the Northwest region. The dealer has ordered five $30 PINs. The dealer is getting a discount, so the dealer only has to pay $25 for the $30 PIN. The total paid for the dealer for that individual purchase order is $250.00. If the dealer changes his mind, and wishes to erase this order, he can do so by clicking "DEL."

If the user wishes to cancel his or her order, the user can click Cancel Order button 1426. If the user wishes to update the price totals shown in column 1418 and field 1421, the user can hit the Update Order button 1422. If the user is satisfied with what he or she has entered, then the user can proceed with the order by clicking the Update Order button 1426. This brings up the Purchase Order Summary screen displayed in FIG. 15.

The Purchase Order Summary screen shown in FIG. 15 allows the user to review his or her entire purchase order and check that everything has been entered correctly. If the user wishes to change something, the user can click Change Purchase Order button 1502. This will take the user back to the Purchase Order Data Entry screen displayed in FIG. 14.

If the user is satisfied with the purchase order summary displayed in FIG. 15, then the user can click Submit P.O. button 1506. The user will automatically be charged by whatever payment method was previously selected (e.g. charged to an on-file credit card, ACH funds transfer, etc.). The user will then get a printed out receipt. A typical receipt is shown in FIG. 17 and will be discussed later.

If the user wishes to pay by an alternate credit card, he or she can click Pay With Alternate Credit Card 1504. This takes the user to the Alternate Credit Card Payment screen shown in FIG. 16. The user can then enter credit card information in. the Billing Information fields.

FIG. 18 shows an example of a Prepaid cellular PIN ticket 1800. Ticket 1800 is the receipt that is printed out when an individual user orders a single PIN from Easywireless.com from one of the embodiments shown in FIG. 2 (this receipt is not from the purchase ordering system which has a more elaborate printout shown in FIG. 17).

Figure 19A:
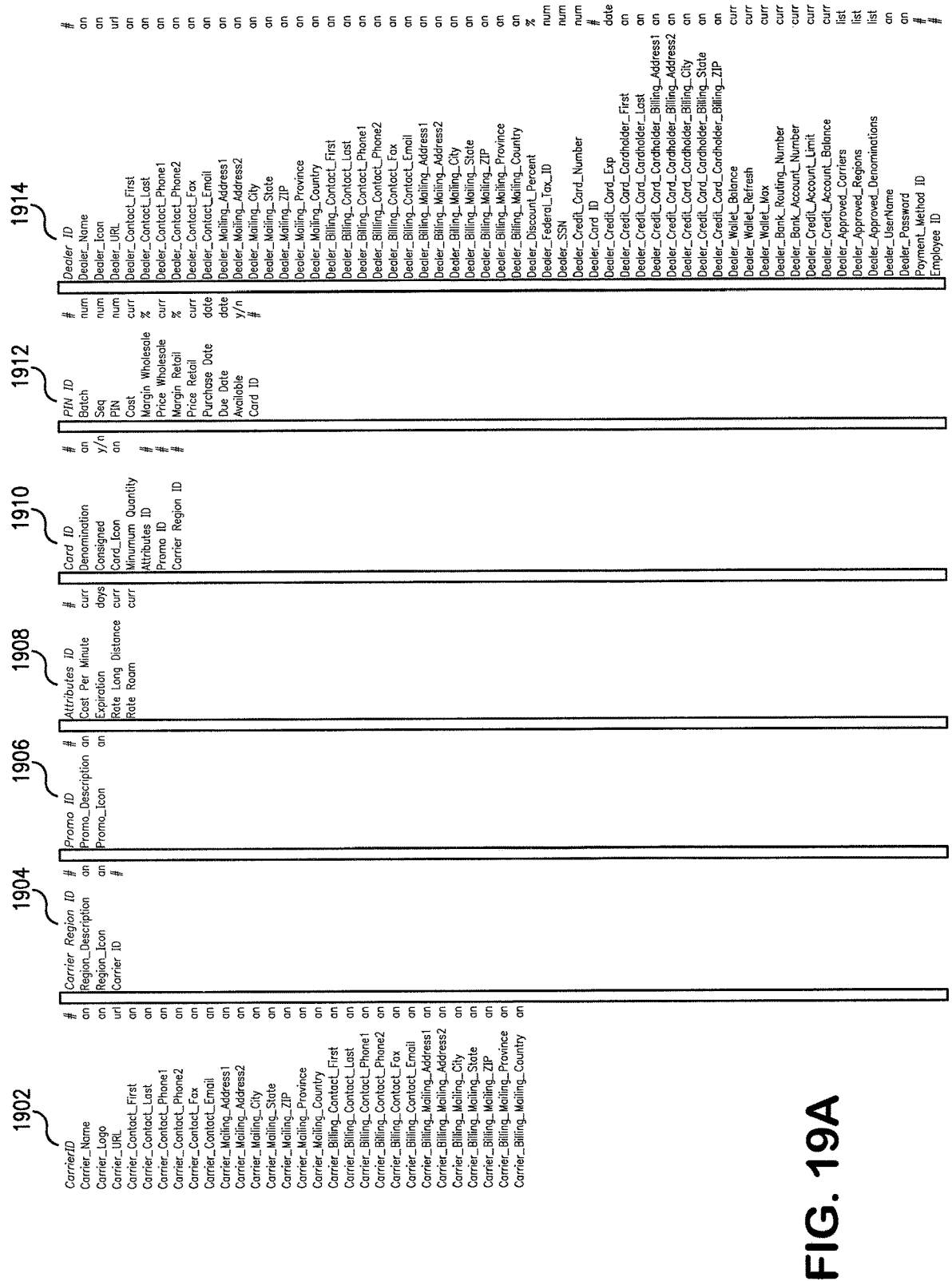

FIGS. 19A and 19B depict another example of a database record in PIN database 112. This example shows a more detailed record than the example record shown in FIG. 3. Carrier ID fields 1902 contains fields providing information pertaining to the individual carrier selected. Carrier region fields 1904 contains fields providing information pertaining to the carrier region selected. Promo ID fields 1906 contains information pertaining to any promotional program(s) that the PIN was purchased under. Attributes fields 1908 contains information pertaining to the PIN attributes such as the calling cost per minute, PIN expiration, long distance rate, and roaming rate. Card ID fields 1910 contains various identification fields associated with the PIN. PIN ID fields 1912 contain fields providing information pertaining to PIN identification. Dealer ID fields 1914 contain information pertaining to the dealer where the PIN is purchased. When a PIN is purchased at a dealer, Dealer ID fields 1914 gets filled in with the corresponding dealer information. Sub/kiosk ID fields 1916 contain information pertaining to a kiosk where the PIN is purchased. When a PIN is purchased, these fields get filled in with the kiosk information associated with the kiosk where the PIN was purchased. POS Type ID fields 1918 contain additional information pertaining to kiosk identification. Payment_method ID fields 1920 contain information pertaining to the method of payment. Credit Card ID fields 1922 contain credit card information, if the PIN was purchased by credit card. Lastly, Employee ID fields 1924 contain information pertaining to an Easywireless.com employee who may have made the PIN sale, and any commission, which the employee receives for the sale.

Every PIN in PIN database 112 has its own associated record, as shown in FIGS. 19A and 19B. The records shown in FIGS. 19A and 19B are directed towards wireless telephone service. However, different types of records can be used which are tailored to the product or service being sold, such as gasoline. Each PIN has its own associated record as shown in FIGS. 19A and 19B, even before the PIN is purchased. Every time a new PIN is created in the system, a new record is made. When the PIN is purchased by a customer or dealer, the information about the sale is filled in to the appropriate fields in the record, and the record is marked as sold so that the PIN is not resold to another customer or dealer.

Another alternative feature is selling PINs for bundled goods and services. Instead of buying a PIN for a specific service, such as cellular telephone service, the customer buys a PIN for general bundled account. This PIN could allow the customer to purchase magazines, newspapers, place telephone calls, or ride the subway all using the same PIN.

In addition to selling individual pre-paid goods and services, Easywireless.com could sell bundled pre-paid goods and services.

Figure 20:
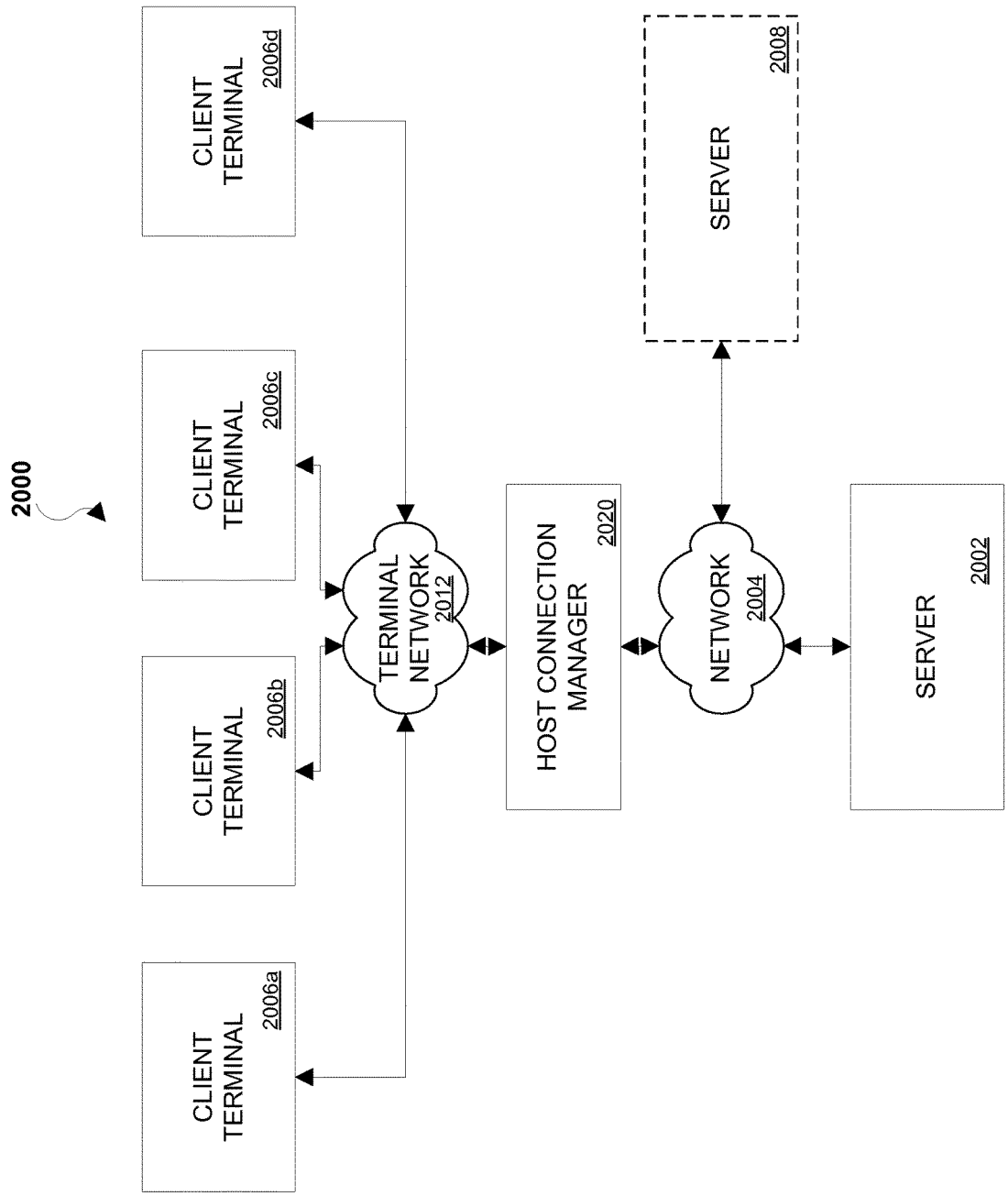
FIG. 20 is an overview of a system architecture incorporating a host connection manager.

Referring next to FIG. 20, shown is an overview of a system architecture incorporating a host connection manager 2020 according to one embodiment of the present invention. As shown, the host connection manager 2020 is communicatively coupled to the client terminals $2006_{a-d}$ via a terminal network 2012, and the host connection manager 2020 communicates with the server 2002 via network 2004. Also shown is a balancing server 2008, which is optionally coupled to the network 2004 to provide a load balancing to the server 2002 as described further herein.

The client terminals $2006_{a-d}$ are configured to operate in much the same way as the client terminals 106, 108, 110 described with reference to FIG. 1, however, the client terminals $2006_{a-d}$ in the present embodiment, communicate with host connection manager 2020 in the same way the client terminals 106, 108, 110 communicate with the server 102 as described with reference to FIG. 1. Similarly, the server 2002 is configured to operate in much the same way as the server 102, but the server 2002 in the present embodiment interacts with the host connection manager 2020 in the same way as the server 102 communicates with the client terminals 106, 108, 110 in the embodiments described with reference to FIG. 1. As one of ordinary skill in the art will appreciate, any of the client terminals described herein may be realized by a combination of hardware and software which may be implemented in a variety of programmable devices including cell phones and programmable digital assistants (PDAs).

From the perspective of the server 2002, the host connection manager 2020 appears as a client terminal (e.g., as one of the client terminals 106, 108, 110). As a consequence, the host connection manager 2020, according to some embodiments, interacts directly with the server 2002 to retrieve prepaid PIN information on demand in the same way as the client terminals 106, 108, 110 interact with the server 102. Although certainly not required, in one embodiment, the server 2002 replenishes its inventory by receiving PINs from service providers, which may be carried out in an automated manner (e.g., whenever the inventory falls below a low-watermark).

The host connection manager 2020, however, does not interact with clerks or sales personnel. Instead, personnel access the client terminals $2006_{a-d}$, and the client terminals $2006_{a-d}$ interact with the host connection manager 2020 in order to initiate the retrieval of PIN information.

In an exemplary embodiment, the terminal network 2012 is a private network (e.g., a local area network LAN or wide area network (WAN)), which is indirectly coupled to the network 2004 via the host connection manager 2020, but this is certainly not required. In other embodiments for example, the terminal network 2012 and the network 2004 may be parts of a larger network such as the Internet.

Advantageously, the system architecture of the present embodiment accommodates client terminals $2006_{a-d}$, which communicate according to legacy communication protocols that are incompatible with the communication protocols utilized by the server 2002. Specifically, the host connection manager 2020 may be configured to communicate with the client terminals $2006_{a-d}$ according to the communication protocol utilized by the client terminals $2006_{a-d}$, and communicate with the server 2002 according to the communication protocol utilized by the server 2002. As a consequence, a merchant with a collection of legacy client terminals may implement a single host connection manager instead of upgrading the legacy client terminals and/or the infrastructure of the associated terminal network.

As one of ordinary skill in the art will appreciate, another host connection manager may be implemented in parallel with the host connection manager 2020 to provide redundancy in the event the host connection manager 2020 fails.

As shown in FIG. 20, the optional balancing server 2008 is disposed to communicate with the server 2002 via the network 2004. The balancing server 2008 is coupled to another set of client terminals (not shown) either directly or through another host connection manager (not shown). In several embodiments, the balancing server 2008 operates a separate PIN database from the server 2002 and may be geographically separated from the server 2002 (e.g., in another city), but that is certainly not required. In some embodiments, the balancing server 2008 is configured to act as either a client or a server with respect to the server 2002. Similarly, the server 2002 is configured to appear as either a client or a server from the perspective of the balancing server 2008. In this way, the server 2002 and the balancing server 2008 are able to load balance each other.

Specifically, if the server 2002, is unable to fulfill a request for a PIN originating from one of the client terminals $2006_{a-d}$ (e.g., because it has insufficient inventory), the server 2002 acts as a client and requests the PIN from the balancing server 2008. If the balancing server has the requested PIN, it sends it to the server 2002. Similarly, if the balancing server 2008 is unable to fulfill a request for a PIN originating from the other client terminals it supports, the balancing server acts as a client and requests the PIN from the server 2002. If the server 2002 has the requested PIN, it sends it to the balancing server 2008. It should be recognized that PINs may also be sent and received in batches instead of a single PIN at a time.

In an alternative embodiment, in advance of (or asynchronous with) any requests for PINs from client terminals (or host connection managers), the servers 2002, 2008 will contact each other if their respective inventory of PINs (e.g. an inventory of PINs corresponding to a particular offering of a product/service) falls below a low watermark and each respective server will send PINs to the other server in response if it has an inventory of PINs above a high watermark. The quantity of PINs that differentiates the low watermark from the high watermark may vary depending upon the profile of each server (e.g., the historical volume of PINs each server moves).

The present invention additionally contemplates that there may be several merchants with legacy infrastructure, and to accommodate such an occurrence, a separate host connection manager may be implemented to communicate with such legacy devices and/or networks.

Figure 21:
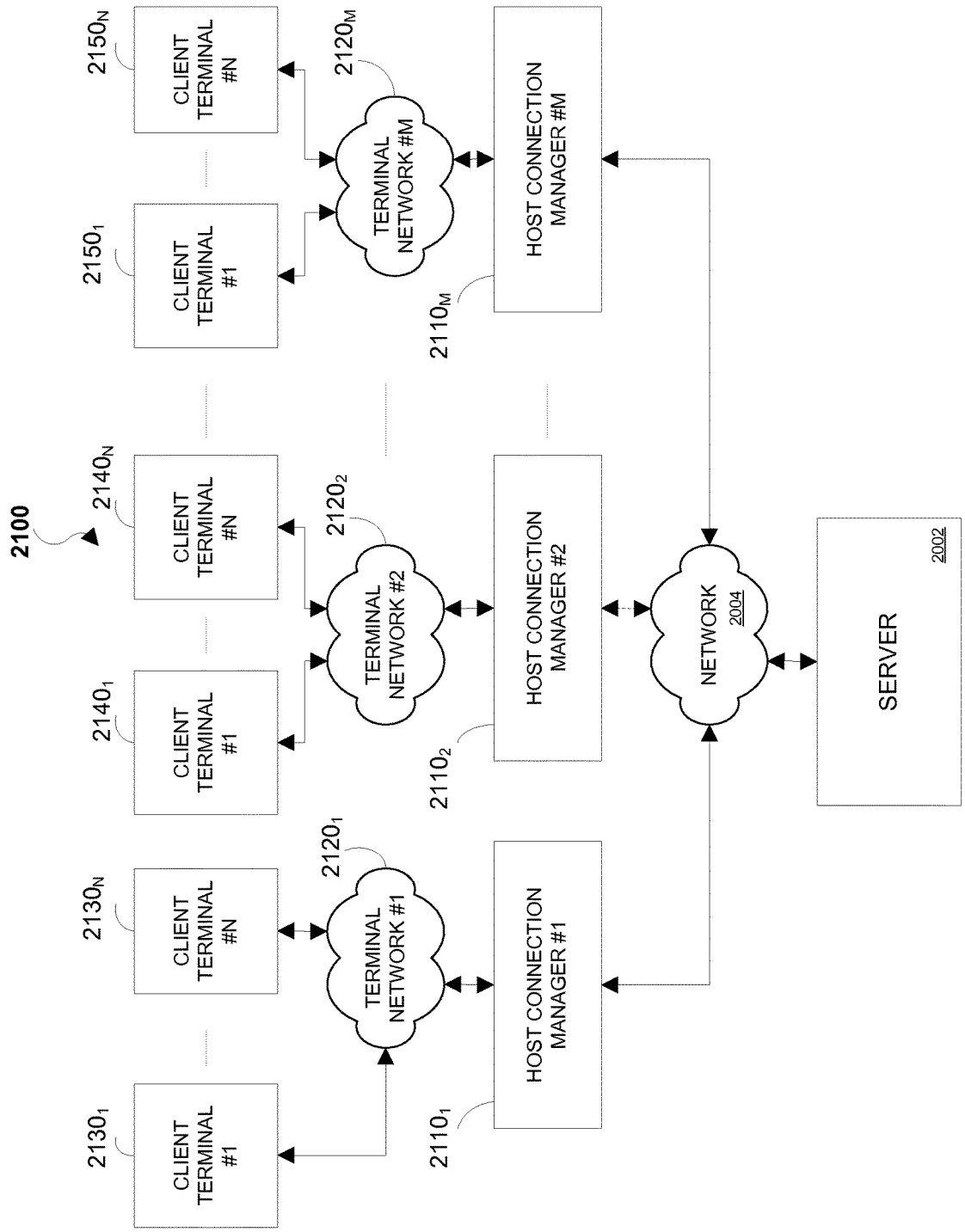
FIG. 21 is an overview of another system architecture incorporating host connection managers.

As shown in FIG. 21 for example, M host connection managers $2110_{1-M}$ are coupled with M respective terminal networks $2120_{1-M}$, and each of the M terminal networks $2120_{1-M}$ is coupled to a respective set of N client terminals $2130_{1-N}$, $1240_{1-N}$, $1250_{1-N}$. As a consequence, the system architecture of the present embodiment allows each set of the N client terminals $2130_{1-N}$, $1240_{1-N}$, $1250_{1-N}$ (associated with each of the M terminal networks $2120_{1-M}$) to communicate according to a different (e.g., proprietary) communication protocol with each of the M respective host connection managers $2110_{1-M}$. As shown, each of the M host connection managers $2110_{1-M}$ is configured to communicate (via the network 2004) with the server 2002 according to the same communication protocol utilized by the server 2002.

Figure 22:
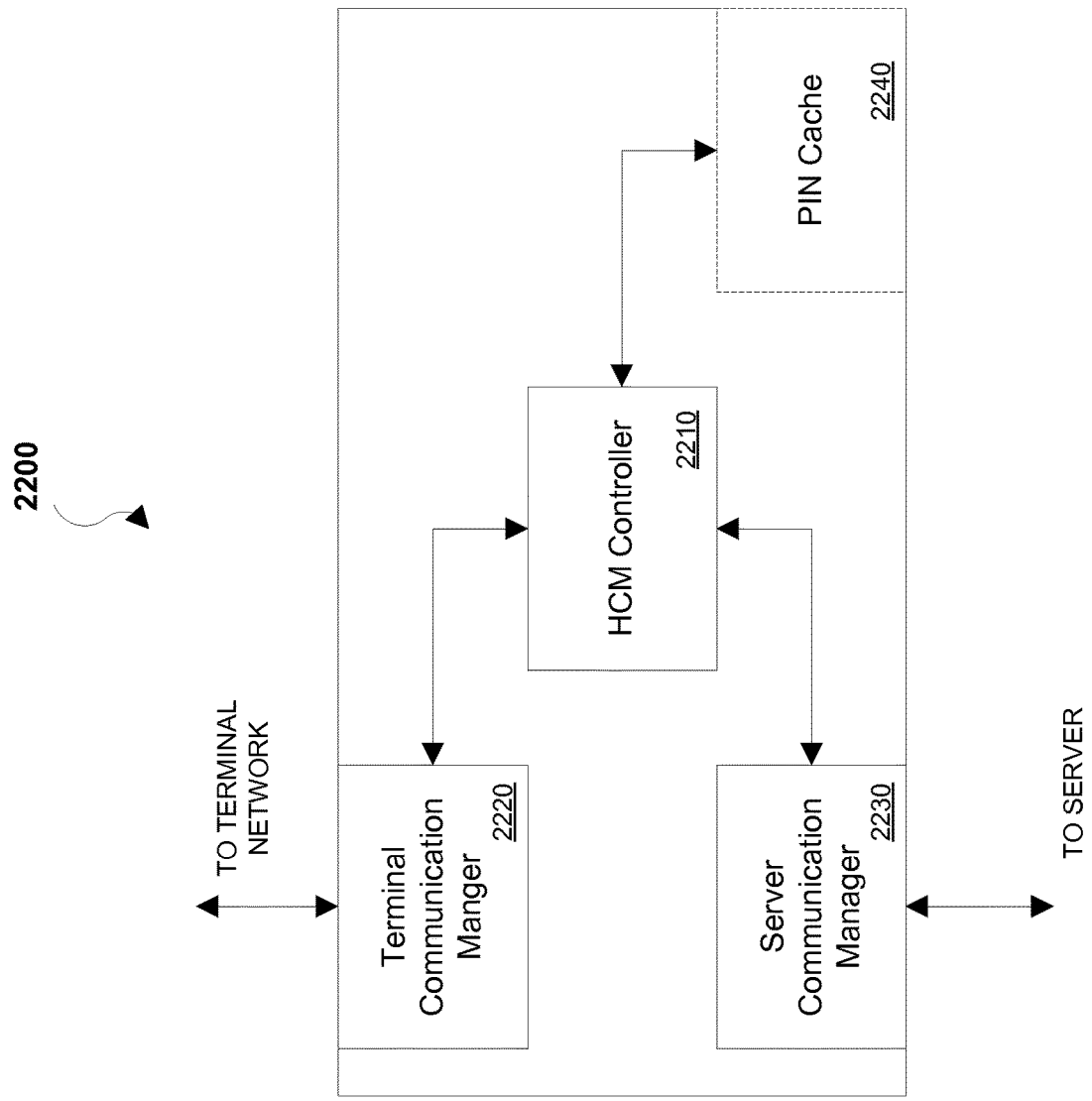
FIG. 22 is a schematic diagram of the structure of one embodiment of the host connection managers described with reference to FIGS. 20 and 21.

Referring next to FIG. 22, shown is a schematic diagram of the structure of one embodiment of the host connection managers 2020, $2110_{1-M}$ described with reference to FIGS. 20 and 21. As shown, the host connection manager (HCM) 2200 includes an HCM controller 2210, which is coupled to a terminal communication manager 2220, a server communication manager 2230 and a PIN cache 2240. In general, the HCM controller 2210 controls the operations of the host connection manager 2200, and as one of ordinary skill in the art will appreciate, the HCM controller 2210 may be realized by a combination of hardware and software (e.g., a processor which carries out executable code stored in a memory).

In general, the terminal communication manager 2220 is configured to communicate with (at the direction of the HCM controller 2210) client terminals (e.g., client terminals $2006_{a-d}$) according to the communication protocols utilized by the client terminals. Similarly, the server communication manager 2230 is configured to communicate with the server 2002 (at the direction of the HCM controller 2210) according to the communication protocols utilized by the server 2002.

According to an exemplary embodiment, the PIN cache 2240 is configured to store PINs for retrieval upon request by a client terminal (e.g., any of the client terminals described with reference to FIG. 20 or FIG. 21). In other embodiments, as discussed herein, the host connection manager 2200 neither includes a PIN cache 2240 nor stores PINs.

Figure 23:
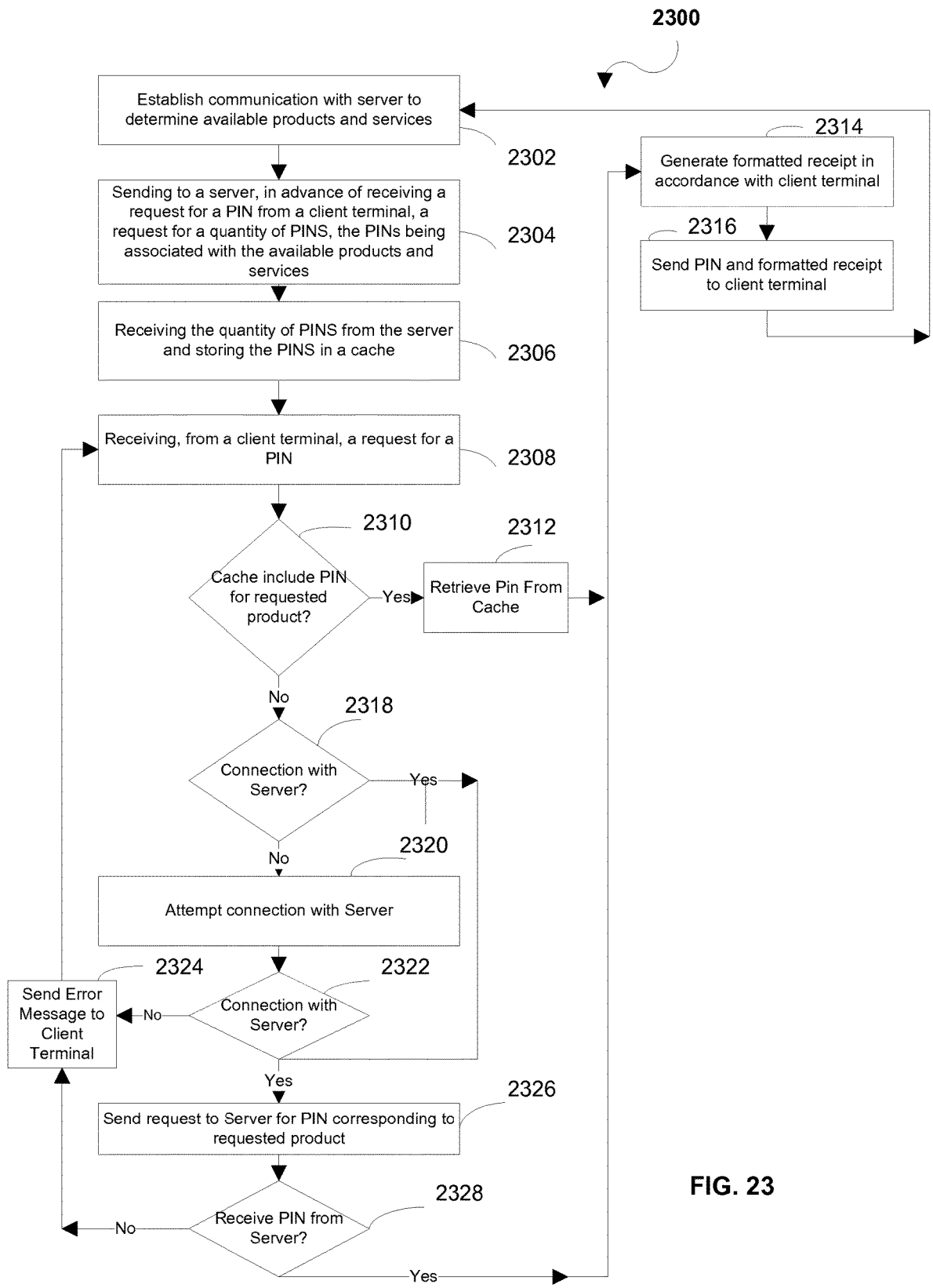
FIG. 23 is a flow chart depicting steps carried out by the host connection manager of FIG. 22.

The interoperation of the HCM controller 2210 with the terminal communication manager 2220, the PIN cache 2240 and the server communication manager 2230 is described with reference to FIG. 22, which is a flowchart depicting steps carried out by the host connection manager 2200 when interacting with client terminals (e.g., client terminals $2006_{a-d}$) and the server 2002. It should be recognized that the steps illustrated in FIG. 23 are for an exemplary embodiment in which the host connection manager 2100 communicates with the server 2002 asynchronously with respect to the interactions between client terminals and the host connection manager. However, this asynchronous communication aspect is certainly not required to be implemented within all embodiments (as discussed further herein).

As shown in FIG. 23, the host connection manager 2200 in the exemplary embodiment establishes communication with the server 2002, in advance of receiving a request for PINs from a client terminal, in order to determine what offerings (e.g., products and services) the server 2002 has available (Step 2302). When there are offerings at the server 2002 the host communication manager 2200 is "looking" for (e.g., because its PIN cache 2240 is low on PINs for the offerings), the host connection manager 2100 sends a request for a quantity of PINs corresponding to the offerings. In response to the request for PINs, the server 2002 sends the requested quantity of PINs to the host connection manager 2100. These PINS are received at the server communication manager 2230 and directed to the PIN cache 2240 by the HCM controller 2210 for storage (Step 2306).

As shown in FIG. 23, when a request for a PIN is received from a client terminal (Step 2308) and the HCM controller 2210 determines that the requested PIN is already in the PIN cache 2240 (Step 2310), the HCM controller 2210 retrieves the PIN from the PIN cache 2240, optionally generates a formatted receipt in accordance with formatting limitations of the client terminal (Step 2314), and sends the PIN and optional formatted receipt to the client terminal (Step 2316).

As one of ordinary skill in the art will appreciate, PINs may be associated with offerings (e.g., product/service, region, denomination) in a variety of ways, and hence, PINs may be requested in a variety of ways. In some embodiments, each PIN is identified and requested by a stock keeping unit (SKU) and/or universal product code (UPC), and each SKU or UPC summarizes an offering of a service/product, a region (i.e., that the service/product is available or applicable), the provider (e.g., carrier) of the product/service and/or the denomination (e.g., monetary value). As a consequence, a user's selection may include a particular product/service, a provider and/or denomination, and in the exemplary embodiment, the user's client terminal $2006_{a-d}$ associates an SKU or UPC with the user's selection. The client terminal $2006_{a-d}$ then requests a PIN by its corresponding SKU or UPC number.

Referring again to FIG. 23, if the PIN cache 2240 does not include the PIN for the requested product and/or service (Step 2310), and there is not a communication link between the host connection manager and the server 2002 (Step 2318), the HCM controller 2210, in cooperation with the server communication manager 2230, attempts to establish a communication link with the server 2002 (Step 2320). If the attempt to establish a communication link with the server 2002 is unsuccessful (Step 2322), an error message is sent to the client terminal indicating that the requested PIN is unavailable (Step 2324). The host communication manager 2200 then aborts the present request, and receives another request for a PIN from a client terminal (Step 2308).

If the attempt to establish a communication link with the server 2002 is successful (Step 2322), the HCM controller 2210 sends a request (via the server communication manager 2230) to the server 2002 for the PIN corresponding to the PIN requested by the client terminal (at Step 2308). If the host connection manager 2200 is unable to receive the PIN from the server 2002 (Step 2328), an error message is sent to the client terminal indicating that the requested PIN is unavailable (Step 2324). The host communication manager 2200 then aborts the present request and receives another request for a PIN from a client terminal (Step 2308).

If the host connection manager 2200 successfully receives the requested PIN from the server 2002 (Step 2328), the HCM controller 2210 optionally generates a formatted receipt in accordance with formatting limitations of the client terminal (Step 2314), and sends the PIN and optional formatted receipt (via the terminal communication manager 2220) to the client terminal (Step 2316).

One of ordinary skill in the art will appreciate that the host connection manager 2200 may be readily adapted to operate without a PIN cache 2240. In such an embodiment, when a request from a client terminal for an offering of a product and/or service (e.g., of a particular monetary value) is received at the host connection manager 2200, the host connection manager 2200 requests the PIN from the server 2002, and the server 2002 provides the PIN, on demand, to the host connection manager 2200. In turn, the host connection manager 2200 provides the PIN to the client terminal.

Figure 24:
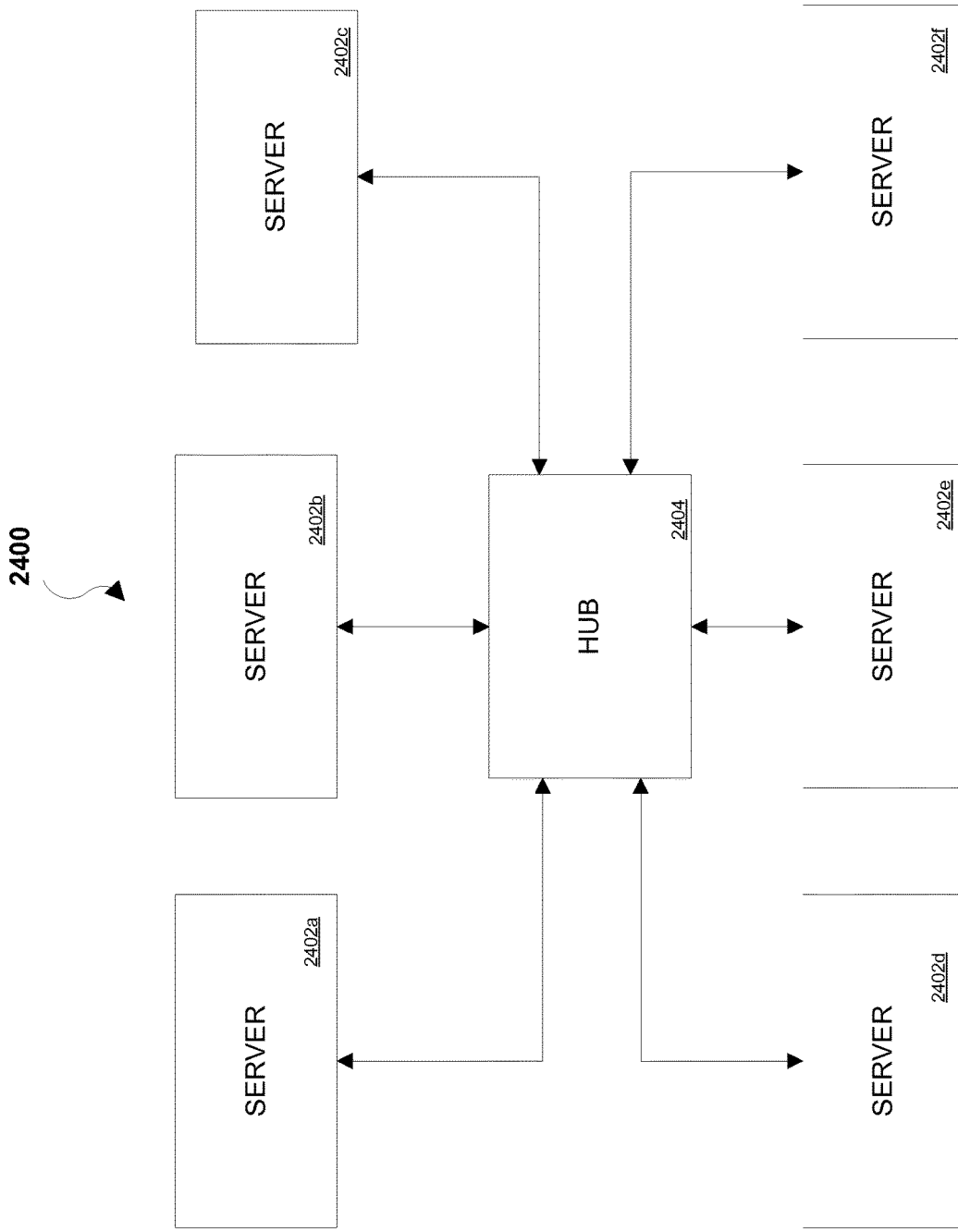
FIG. 24 is an overview of a cooperative inventory system incorporating a hub according to one embodiment of the present invention.

Referring next to FIG. 24, shown is an overview of a cooperative inventory system incorporating a hub 2404 according to one embodiment of the present invention. As shown, the hub 2404 is communicatively coupled to each of the servers $2402_{a-f}$ via separate connections. Each server and its respective connection is also referred to herein a spoke.

The servers $2402_{a-f}$ are configured to interoperate with client terminals 106, 108, 110, and/or the host connection managers $2110_{1-M}$ (not shown in FIG. 24) in much the same way as do the servers 102, 2002 described with reference to FIG. 1 and FIGS. 20 and 21. The servers $2402_{a-f}$ in the present embodiment, however, are configured to communicate with the hub 2404 to implement a cooperative inventory system in which the hub 2404 manages an inventory of PINs that is distributed among the servers $2402_{a-f}$ and the hub 2404.

In the exemplary embodiment, any client terminal 106, 108, 110, and/or any of the host connection managers 2020, $2110_{1-M}$ is able to request a PIN from any one of the servers $2402_{a-f}$. In this way, if one or more of the servers $2402_{a-f}$ go off-line (e.g., for maintenance or because of an event causing a failure), another one of the servers $2402_{a-f}$ is available to fulfill a request for a PIN. In one embodiment, each of the servers $2402_{a-f}$ is located in a different geographic location (e.g., mutually separated by more than a hundred miles) so that if a catastrophic event (e.g., earthquake, tornado, hurricane or blizzard) occurs at one or more locations, servers remotely located from the event are available to fulfill client terminal transaction requests. Such spatial separation, however, is not required to provide an increase in reliability over other architectures.

In addition to providing an increase in reliability over single-server systems, the exemplary cooperative inventory system is also configured to reduce the cost of maintaining an inventory over one or more servers. Specifically, the hub 2404 coordinates the total inventory of PINs so that each of the servers $2402_{a-f}$ has a sufficient, but not an excess amount, of PINs. In this way, the total cost of maintaining an inventory to meet demands of users is reduced. For example, in a system with independently operated servers (i.e., without a hub), each server has to maintain an amount of float (i.e., an extra amount of PINs to prevent inventory depletion) to assure the server is able to effect sales (e.g., when there is an unexpected peak period). With the exemplary system, the overall amount of float, and hence, cost of goods, is reduced.

In addition, the exemplary system also reduces communication costs with respect to alternative multi-server embodiments without a hub 2402. Specifically, the amount of communication required in a multi-server system without a hub 2404 to synchronize PIN databases (e.g., so the same PIN does not get distributed to more than one user) and customer databases (e.g., so a merchant does not exceed their credit limit) is substantially higher than in the exemplary system. This is because the hub 2404, as described further herein, is able to operably synchronize its databases and databases of the servers $2402_{a-f}$ without each server having to communicate updates with each of the other servers.

Figure 25:
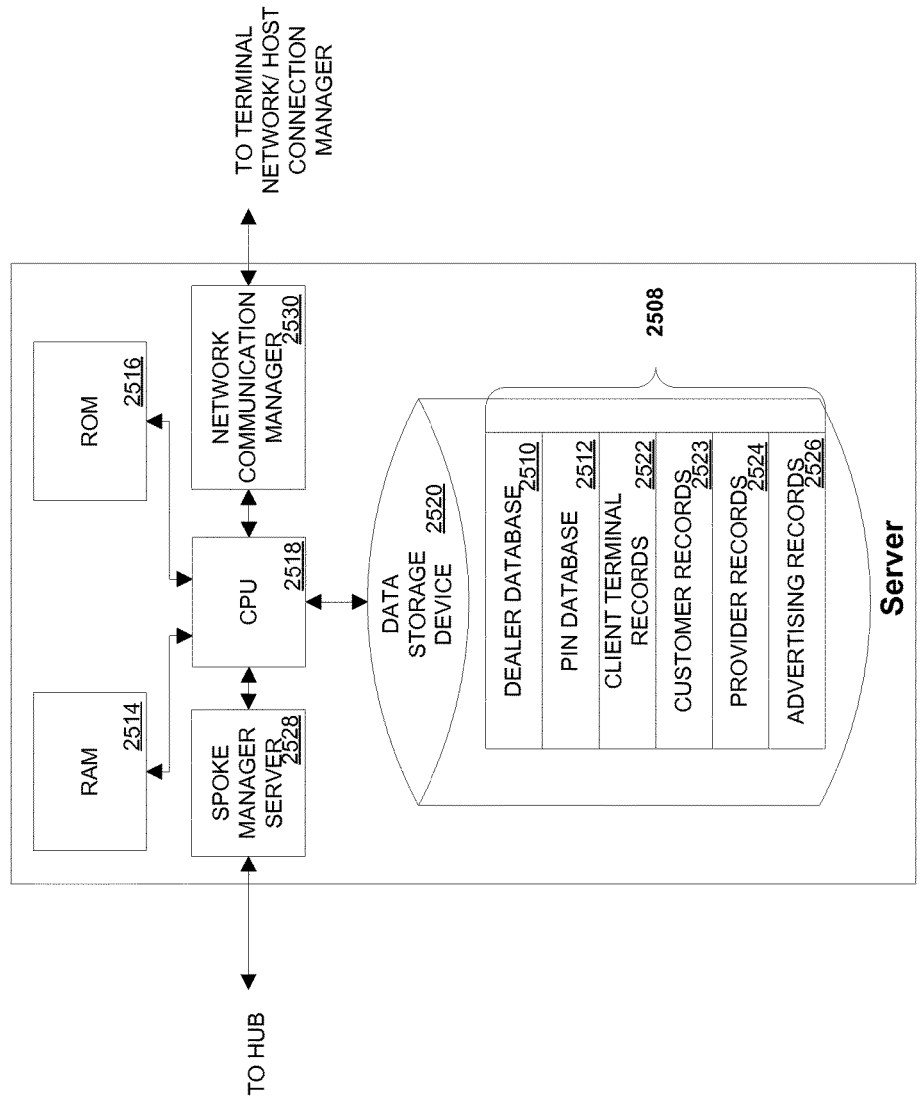
FIG. 25 is a schematic diagram of the structure of one embodiment of the servers described with reference to FIG. 24.

Referring next to FIG. 25, shown is a schematic diagram of the structure of one embodiment of the servers $2402_{a-f}$ described with reference to FIG. 24. As shown, the server 2402 includes many of the same components of the server 102 described with reference to FIG. 1 including RAM 2514, ROM 2516, CPU 2518, and a data storage device 2520. As shown, the data storage device 2520 contains a dealer database 2510, a personal identification number (PIN) database 2512, client terminal records 2522, customer records 2523, provider records 2524 and advertising records 2526.

The dealer database 2510 includes pertinent identifying information about the dealer and information about any accounts the dealer has established (e.g., debit and/or credit accounts). The server 2402 of the present embodiment includes a spoke manager server 2528 which is configured to request inventory from the hub 2404, return inventory to the hub 2404, synchronize database information between the server 2402 and the hub 2404 and inform the hub 2404 about transactions.

Also shown is a network communication manager 2530, which is configured to communicate with client terminals 106, 108, 110 and/or host connection managers 2020, $2110_{1-M}$ in order to provide PINs in response to PIN requests and receive other information including, for example, dealer information, client terminal information and advertising information as previously described.

Figure 26:
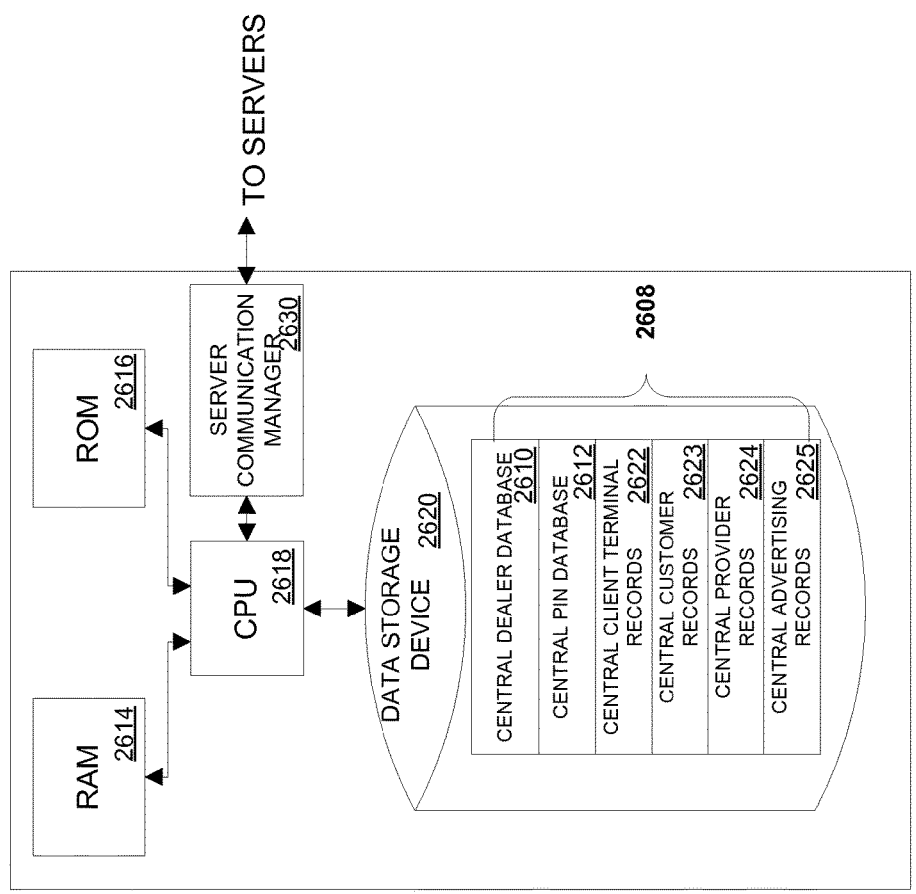
FIG. 26 is a schematic diagram of the structure of one embodiment of the hub described with reference to FIG. 24.

Referring next to FIG. 26, shown is a schematic diagram of the structure of one embodiment of the hub 2404 described with reference to FIG. 24. As shown, the hub 2404 includes RAM 2614, ROM 2616, a CPU 2618, and a data storage device 2620. The data storage device 120 contains centralized databases 2608 including a central dealer database 2610, a central personal identification number (PIN) database 2612, central client terminal records 2622, central customer records 2623, central provider records 2624 and central advertising records 2626.

Also shown is a server communication manager 2630 which is configured to request inventory from the servers $2402_{a-f}$, send inventory to the servers, substantially synchronize databases of the hub 2404 and the servers $2402_{a-f}$ and send and receive other information as described further herein.

In the exemplary embodiment, the centralized databases 2608 in the hub 2404 are updated on an ongoing basis as the hub 2404 receives new information from each of the servers $2402_{a-f}$. For example, each of the servers $2402_{a-f}$ provides updates to the hub 2404 about any new sales to particular dealers, the particular PINs sold, client sales information, customer record information, provider records and advertising record information.

In addition, the hub 2404 periodically propagates at least a portion of the information it receives out to each of the servers $2402_{a-f}$. In this way, the databases at each of the servers $2402_{a-f}$ and the hub 2404 are at least loosely synchronized. It should be recognized that the databases at each of the servers $2402_{a-f}$ and the hub 2404 need not be perfectly synchronized for the system to operate, but it is beneficial to maintain a sufficient amount of synchronization to prevent system abuses (e.g., dealers exceeding purchasing limits by interacting with multiple servers in a short period of time).

One of ordinary skill in the art will appreciate that the server communication manager 2630 may be realized by a combination of hardware and software to carry out the operations described herein (e.g., the memory 2614 may contain executable code which is carried out by the CPU 2618 in connection with well-known hardware to provide input/output functionality).

Figure 27:
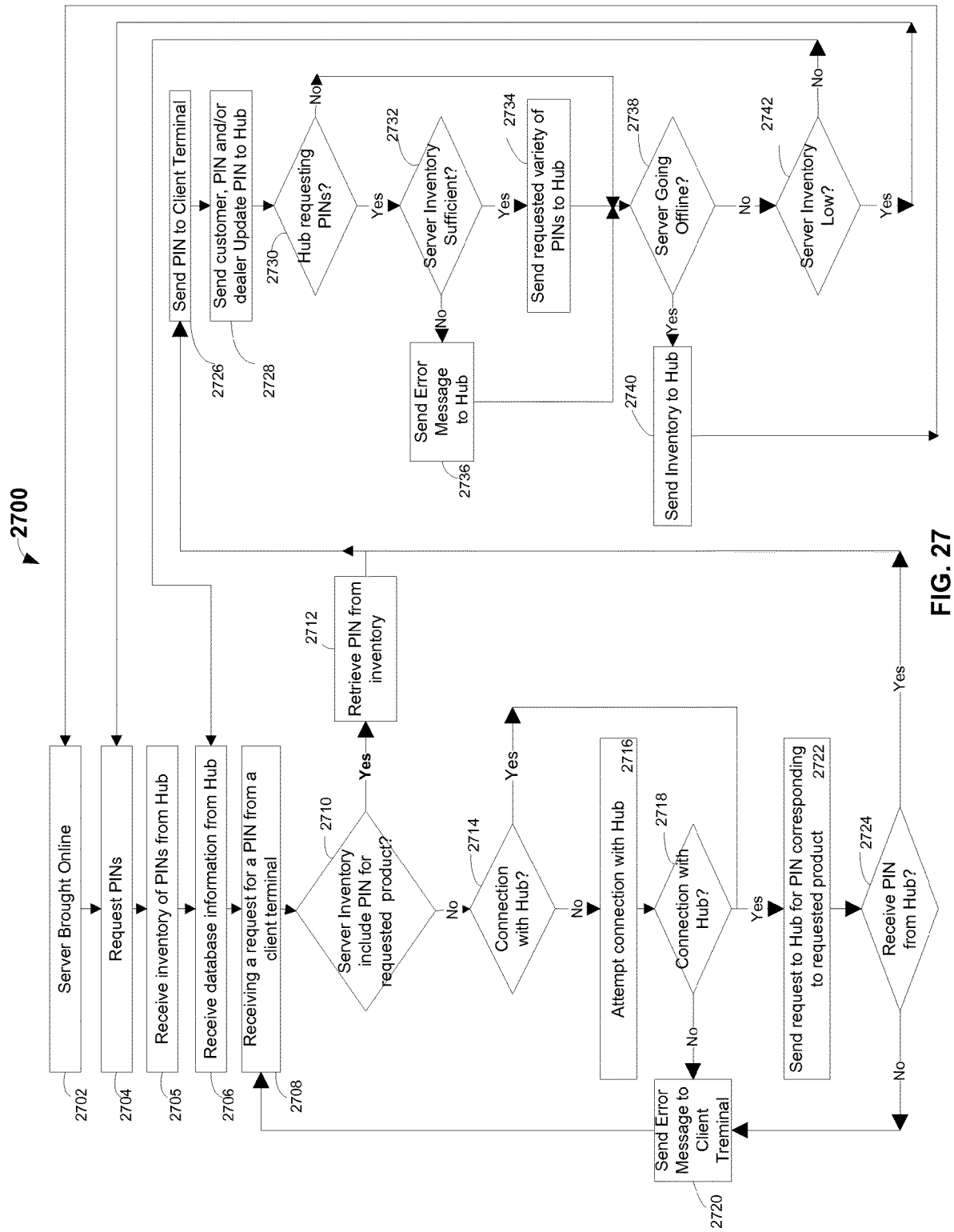
FIG. 27 is a flowchart depicting steps carried out by the server of FIG. 25 in accordance with one embodiment of the present invention.

Referring next to FIG. 27, shown is a flowchart 2700 depicting steps carried out by the server 2402 of FIG. 25 in accordance with one embodiment of the present invention. As shown, after the server 2402 is initially brought online (Step 2702), the server requests an inventory of PINs from the hub 2404 (Step 2704). Assuming the hub 2404 responds to the server's request for inventory, the server receives and stores the inventory of PINs in the PIN database 2512 (Step 2705). In addition, the server 2402 receives database information from the hub 2404 and populates the server databases 2508 (Step 2706).

Once the server 2402 is online, the server is able to receive a request for a PIN from a client terminal (or a host connection manager) (Step 2708). If the server's 2402 inventory of PINs includes the requested PIN (Step 2710), the PIN is retrieved from inventory and sent to the client terminal (Steps 2712, 2726). If the server 2402 does not have the requested PIN in its inventory (Step 2710), and the server 2402 has a communication link with the hub 2404 (Step 2714), the server 2402 sends a request to the hub 2404 for the requested PIN (Step 2722). If the server 2402 does not have a communication link with the hub 2404, the server 2402 attempts to make a connection with the hub 2404 (Step 2716).

If the server 2402 successfully establishes a communication link with the hub 2404 (Step 2718), then the server 2402 sends a request for the PIN to the hub 2404 (Step 2722). If the server 2402 is unable to establish a communication link with the hub 2404 (Step 2718), the server 2402 returns an error message to the client terminal to inform the user of the failed attempt to fulfill the user's request (Step 2720). If the server 2402 receives a PIN from the hub 2404 in response to its request (Step 2724), the server sends the PIN to the client terminal (Step 2726).

In the exemplary embodiment, the server 2402 periodically sends database information to the hub 2404 to update the hub's central databases 2608 (Step 2728). In this way, the hub 2404 is able to update its central databases 2608 and propagate the updated information to other servers.

As shown in FIG. 27, if the hub 2404 is requesting PINs from the server 2402 (Step 2730), and the server 2402 is able to fulfill the hub's request for the PINs from its inventory (Step 2732), the server 2402 sends the requested PINs to the hub 2404 (Step 2734). If the server 2402 does not have sufficient inventory to fulfill the hub's 2404 request (Step 2732), the server 2402 sends an error report to the hub 2404 (Step 2736). In one embodiment, a high-watermark is established for each of the PINs (e.g., for each SKU or UPC) at the server 2402, and the server 2402 only provides PINs above its high-watermark.

In the exemplary embodiment, if the server 2402 is going offline (e.g., for maintenance)(Step 2738), the server 2402 may send its inventory of PINs to the hub 2404 (Step 2740). As discussed, while the server 2402 is offline, client terminals are able to contact other servers that are online to receive PINs. When the server 2402 is brought back online (Step 2702), the server 2402 requests and receives PINs from the hub 2404 (Steps 2704, 2705) so that the server 2402 is again ready to receive requests for PINs from client terminals.

If the server's 2402 inventory is low (e.g., one more SKUs or UPC codes drops to a low-watermark)(Step 2742), the server 2402 requests additional PINs from the hub 2404 (Step 2704), and if the hub 2404 fulfills the request, the server 2402 receives and stores the PINs (Step 2706).

Figure 28:
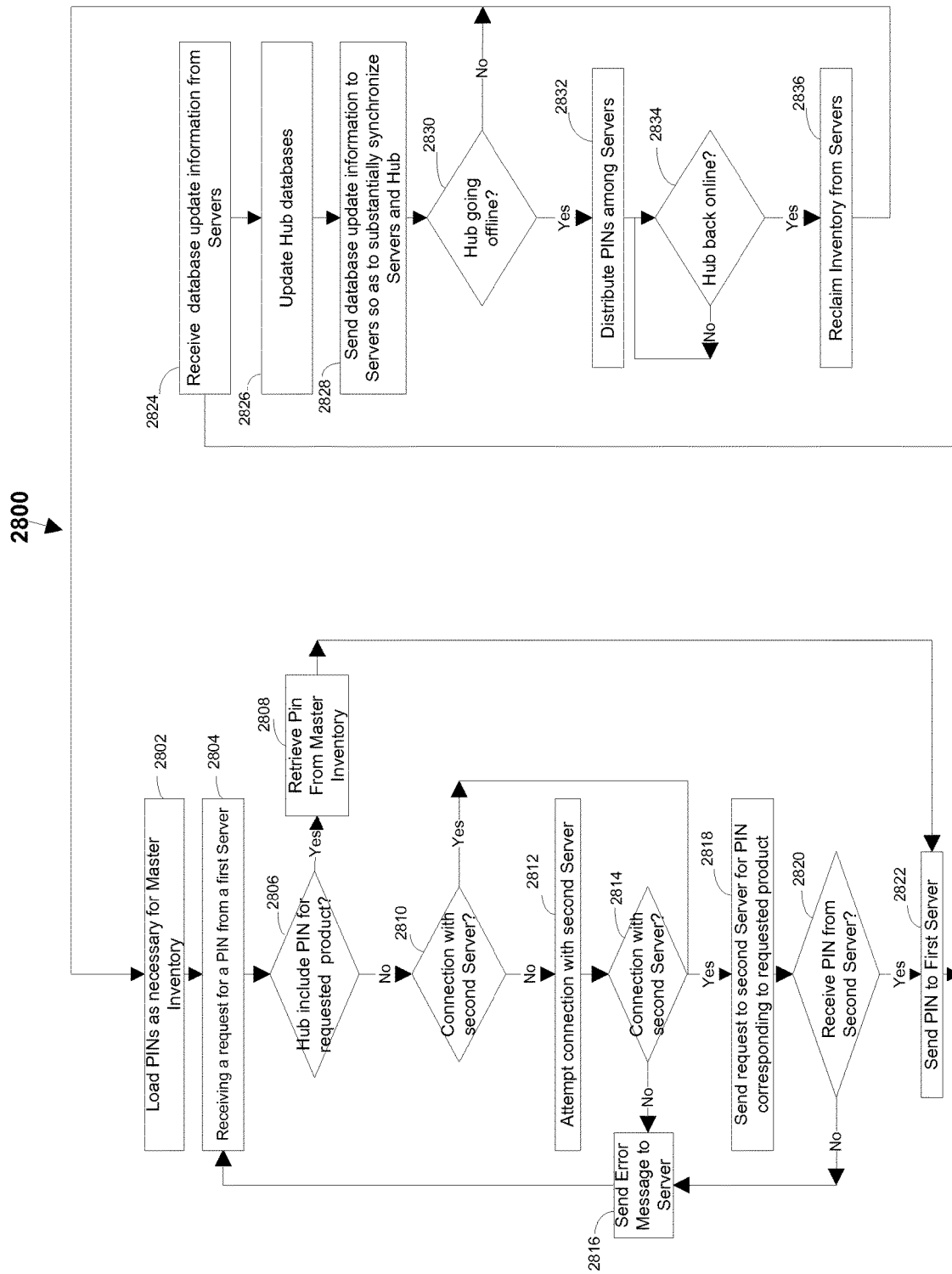
FIG. 28 is a flowchart depicting steps carried out by the hub of FIG. 26 according to an exemplary embodiment.

Referring next to FIG. 28, shown is a flowchart depicting steps carried out by the hub 2404 of FIG. 26 according to an exemplary embodiment. As shown in FIG. 28, the inventory of PINs is initially loaded into the PIN database 2612 of the hub 2404 (Step 2802). The hub 2404 is optionally linked (e.g., the Internet or other communication link) with one or more service providers. In such an embodiment, the hub 2404 may receive the inventory of PINS directly from service providers.

As previously discussed, when one of the servers' $2402_{a-f}$ inventory of a particular variety of PIN is low (e.g., below a low-watermark), the server sends a request for a PIN (e.g., a request for one or more PINs with a SKU or UPC matching the variety sought), which is received by the hub 2404 (Step 2804). If the hub 2404 has an inventory of PINs matching the requested variety in the central PIN database 2612 (Step 2806), the hub 2404 retrieves a quantity of the requested PINs from the central PIN database 2612 (Step 2808) and sends the quantity of PINs to the requesting server (Step 2822). If the hub 2404 has an insufficient inventory of PINs to fulfill the requesting server's request (Step 2806), and the hub 2404 does not have a communication link established with another server (Step 2810), the hub 2404 attempts to make a connection with another server (Step 2814). If the hub 2404 is unable to make a connection with one or more of the other servers (Step 2814), the hub 2404 sends a message back informing the requesting server that its request cannot be fulfilled (Step 2816).

If the hub 2404 successfully makes a connection with one or more other servers (Step 2814), the hub 2404 sends a request to the other server(s) for one or more PINs of the variety sought by the requesting server (Step 2818) (e.g., by requesting one or more PINs with the SKU number corresponding to the variety sought). If the hub 2404 does not receive PINs of the variety sought (e.g., because the other server(s) do not have available inventory of the variety of PIN sought or because communications fail), hub 2404 sends a message back informing the requesting server that its request cannot be fulfilled (Step 2816). When the hub 2404 receives PINs of the variety sought from one or more of the other servers (Step 2820), the hub 2404 provides at least a portion of the PINs it received to the requesting server (Step 2822).

It should be recognized that the hub 2404 may attempt to connect with just one server or any number of the servers $2402_{a-f}$ in parallel when it does not have an inventory of PINs matching the variety requested by another server. If several servers $2402_{a-f}$ are contacted in parallel, the hub 2404 may request that each of the servers $2402_{a-f}$ contribute a particular number of PINs (e.g., an excess number of PINs above their high-watermark) or a percentage of their inventory of the requested variety.

In the exemplary embodiment, the hub 2404 receives information on an ongoing basis from each the servers $2402_{a-f}$ (Step 2824). This information received from each of the servers 2402 is used by the hub 2404 to update its central databases 2608 (Step 2826). This information may include, without limitation, one or more of the following: the particular PINs distributed, number of PINs by variety (e.g., by SKU, UPC, provider and/or denomination) that each server has distributed, the number and type of advertisements presented (if any), as well as a summary and detail of transactions made with each dealer, each client terminal and each customer. It should be recognized that such information may be received from the each of the servers $2402_{a-f}$ asynchronously (i.e., each of the servers $2402_{a-f}$ may send batches of updates periodically based on a time or activity basis).

As the hub 2404 receives information and updates its central databases (Steps 2824, 2826), it periodically sends update information to the servers $2402_{a-f}$ (Step 2828). In the exemplary embodiment, the update information sent from the hub 2404 substantially synchronizes the central databases 2608 with the corresponding server databases 2508. As previously discussed, the server databases 2508 at each of the servers $2402_{a-f}$ and the central databases 2608 at the hub 2404 need not be perfectly synchronized for the system to operate, but it is beneficial to maintain a sufficient amount of synchronization to prevent system abuses.

If the hub 2404 is going offline (Step 2830) (e.g., for maintenance), in the exemplary embodiment, the hub 2404 distributes its inventory of PINs to one or more of the servers $2402_{a-f}$ (Step 2832). In one embodiment, when the hub is back online (Step 2834), the hub reclaims from the servers $2402_{a-f}$ at least a portion of the inventory it previously dispersed (Step 2836). For example, the hub 2404 may reclaim only the inventory from the servers $2402_{a-f}$ that is above each server's respective high-watermark. In other embodiments, however, the hub 2404 does not resynchronize the inventory of PINs when it is back online.

While the invention herein disclosed has been described by means of specific embodiments and applications thereof, numerous modifications and variations could be made thereto by those skilled in the art without departing from the scope of the invention set forth in the claims. For example, one of ordinary skill in the art will readily appreciate that the host connection manager 2200 and hub 2402 depicted in FIGS. 22 and 26 may be realized by a combination of hardware implemented according to a variety of architectures to carry out the functions and steps described with reference to FIGS. 22 and 23 and FIGS. 26, 27 and 28 respectively. Moreover, the inventive aspects of the present invention may be combined with many of the aspects of the above-identified co-pending application described with reference to FIGS. 1-19.

What is claimed is:

1. A method for electronic, real-time distribution of PINs in a PIN distribution network, the distribution network including a host connection manager, a client device, and a hub coupled to a plurality of servers, the method comprising:

synchronizing, the plurality of servers' individual databases, wherein the plurality of servers' individual databases are synchronized via the hub without the plurality of servers communicating with each other, and wherein the amount of communication required for database synchronization is reduced by the hub;

receiving, electronically by one of the plurality of servers, an inventory of PINs from the hub, wherein the plurality of servers required memory capacity for PIN inventory is reduced by the hub;

receiving, electronically by the one of the plurality of servers, a client device request for a PIN from the client device, wherein the client device request has been made compatible with a communication protocol of the one of the plurality of servers by the host connection manager converting a client device legacy communication protocol to the communication protocol of the one of the plurality of servers and wherein the client device is configured to provide the PIN to a customer;

determining, electronically by the one of the plurality of servers, that the PIN is not included within the inventory of PINs;

transmitting, by the one of the plurality of servers, a server request for the PIN to the hub;

requesting, by the hub from another one of the plurality of servers, the PIN; and receiving, electronically by the one of the plurality of servers, the PIN from the hub, wherein the hub received the PIN from the another one of the plurality of servers.

2. The method of claim 1 further including transmitting, by the one of the plurality of servers, prior to the receiving of the inventory of PINs, a request for PINs to the hub.

3. The method of claim 1 further including transmitting, by the one of the plurality of servers, the PIN to the client device.

4. A real-time PIN distribution network system comprising:

a host connection manager;
a plurality of servers;
a client device configured to request a PIN for a customer from one of the plurality of servers and provide the PIN to the customer;
a hub configured to reduce the plurality of servers' required memory capacity for PIN inventory and also configured to reduce the amount of communication required for database synchronization by synchronizing individual databases of the plurality of servers without the plurality of servers communicating with each other;
a first one of the plurality of servers' processors;
a first non-transitory computer readable memory for storing codes which when executed cause the first one of the plurality of servers' processors to (1) electronically receive an inventory of PINs from the hub, (2) receive a client device request for a PIN from the client device, wherein the client device request has been made compatible with a communication protocol of the first one of the plurality of servers' processors by the host connection manager converting a client device legacy communication protocol to the communication protocol of the first one of the plurality of servers' processors,
(3) determine that the PIN is not included within the inventory of PINs, (4) transmit a server request for the PIN to the hub, and (5) electronically receive the PIN from the hub;
a second one of the plurality of servers' processors;
a second non-transitory computer readable memory for storing codes which when executed cause the second one of the plurality of servers' processors to electronically receive a hub request for a PIN from the hub and transmit the PIN to the hub.

5. The real-time PIN distribution network system of claim 4 wherein the codes further include codes which when executed cause the a first one of the plurality of servers' processors to, prior to receiving the inventory of PINs, transmit a request for PINs to the hub.

6. The real-time PIN distribution network system of claim 4 wherein the codes further include codes which when executed cause the first one of the plurality of servers' processors to transmit the PIN to the client device.

* * * * *